United States Patent
Toma et al.

(10) Patent No.: US 7,756,205 B2
(45) Date of Patent: Jul. 13, 2010

(54) MOVING IMAGE ENCODING METHOD AND APPARATUS

(75) Inventors: Tadamasa Toma, Osaka (JP); Shinya Kadono, Hyogo (JP); Masayasu Iguchi, Hyogo (JP); Tomoyuki Okada, Nara (JP); Yoshinori Matsui, Nara (JP); Satoshi Kondo, Kyoto (JP); Hiroshi Yahata, Osaka (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 11/660,750

(22) PCT Filed: Aug. 30, 2005

(86) PCT No.: PCT/JP2005/015766

§ 371 (c)(1),
(2), (4) Date: Feb. 22, 2007

(87) PCT Pub. No.: WO2006/025388

PCT Pub. Date: Mar. 9, 2006

(65) Prior Publication Data

US 2007/0274393 A1 Nov. 29, 2007

(30) Foreign Application Priority Data

Aug. 31, 2004 (JP) .............................. 2004-251870

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.23

(58) Field of Classification Search ...................... None
See application file for complete search history.

(56) References Cited

U.S. PATENT DOCUMENTS

| 2004/0125204 A1 | 7/2004 | Yamada et al. |
| 2004/0213552 A1 | 10/2004 | Kato |
| 2005/0105888 A1 | 5/2005 | Hamada et al. |
| 2005/0207496 A1* | 9/2005 | Komiya et al. ......... 375/240.16 |

(Continued)

FOREIGN PATENT DOCUMENTS

CN 1496653 5/2004

(Continued)

OTHER PUBLICATIONS

S. Kadono et al., "H264/AVC Kyokasho", Aug. 11, 2004, pp. 97, 192, 193, 263 and its English translation.

(Continued)

*Primary Examiner*—Nhon T Diep
(74) *Attorney, Agent, or Firm*—Wenderoth, Lind & Ponack, L.L.P.

(57) ABSTRACT

A moving image encoding method of encoding a moving image while switching between variable-length encoding schemes. In this method, a continuous unit to be continuously reproduced is determined (S5201), a stream is generated by encoding the moving image without switching between variable-length encoding schemes in the continuous unit (S5202), and management information is generated that includes a first flag information indicating that a variable-length encoding scheme is fixed in the continuous unit (S5204, and S5205).

6 Claims, 53 Drawing Sheets

U.S. PATENT DOCUMENTS

| | | |
|---|---|---|
| 2008/0112685 A1 | 5/2008 | Kato |
| 2008/0307198 A1* | 12/2008 | Kataoka et al. ............... 712/28 |
| 2009/0148123 A1 | 6/2009 | Kato |

FOREIGN PATENT DOCUMENTS

| | | |
|---|---|---|
| EP | 1 370 087 | 12/2003 |
| JP | 2000-228656 | 8/2000 |
| JP | 2003-006979 | 1/2003 |
| JP | 2003-204550 | 7/2003 |
| WO | 03/058974 | 7/2003 |
| WO | 2004/030351 | 4/2004 |
| WO | 2004/034330 | 4/2004 |
| WO | 2004/049710 | 6/2004 |

OTHER PUBLICATIONS

Proposed SMPTE Standard for Television: VC-1 Compressed Video Bitstream Format and Decoding Process, Final Committee Draft 1, Revision 6, Jul. 13, 2005, pp. 123-124 and 192-198.

Supplemental European Search Report issued Oct. 31, 2008 in corresponding EP Patent Application No. 05 77 6931.

Gomila et al., "New Features and Applications of the H.264 Video Coding Standard," Information Technology: Research and Education, IEEE, Aug. 11, 2003, pp. 6-10.

\* cited by examiner

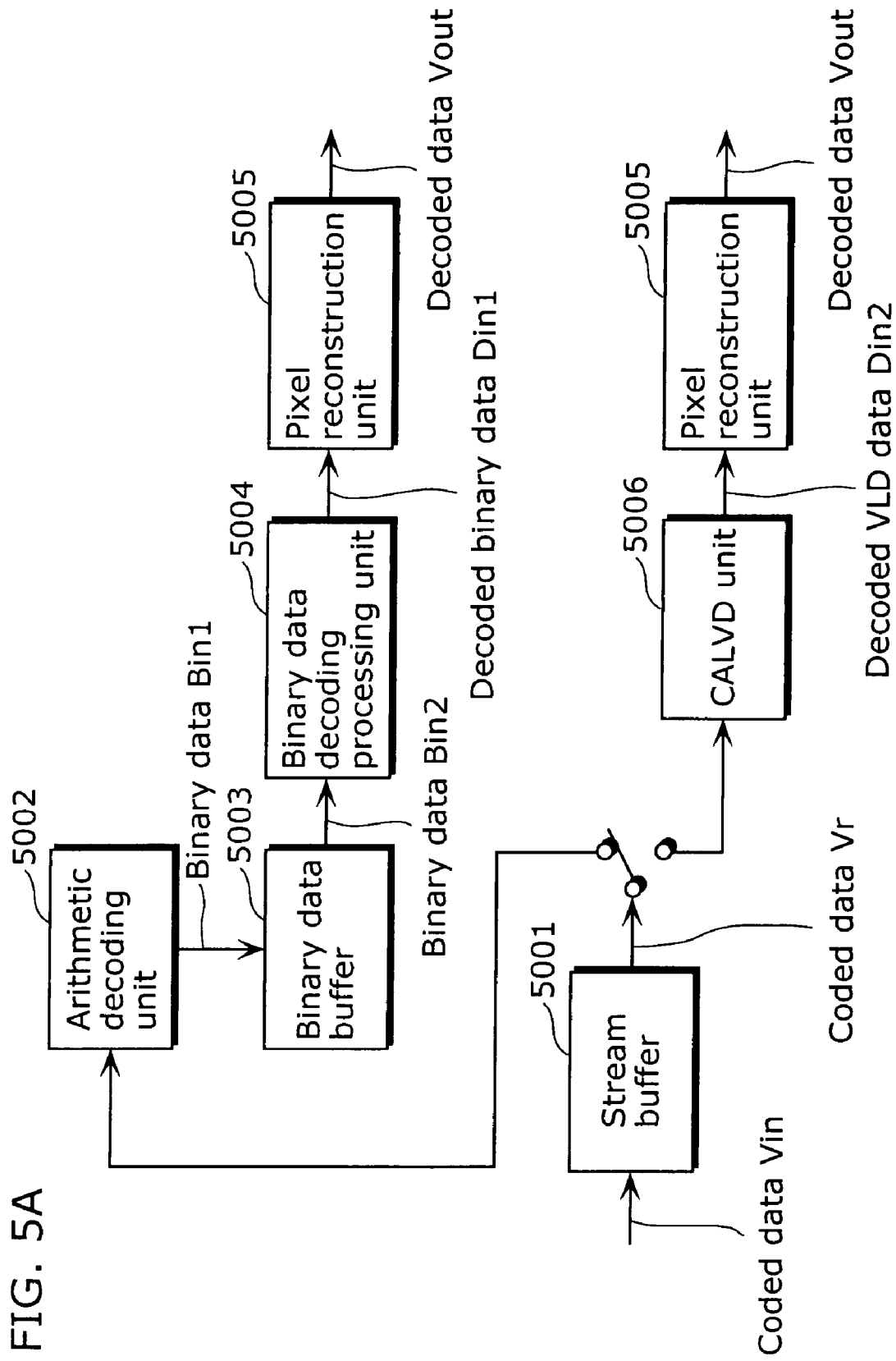

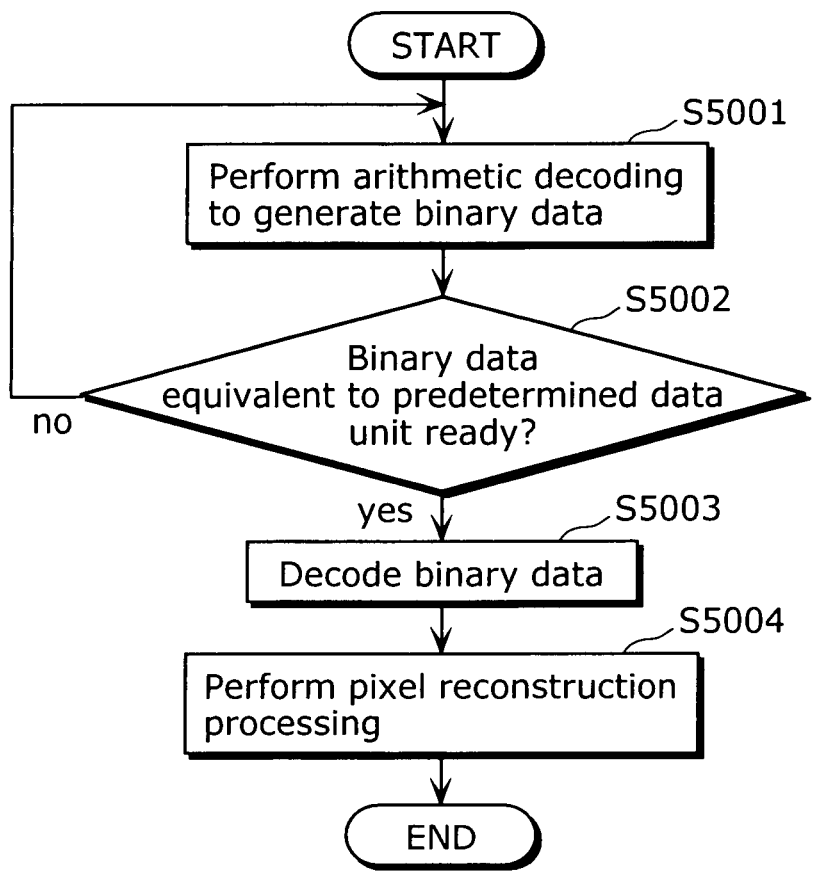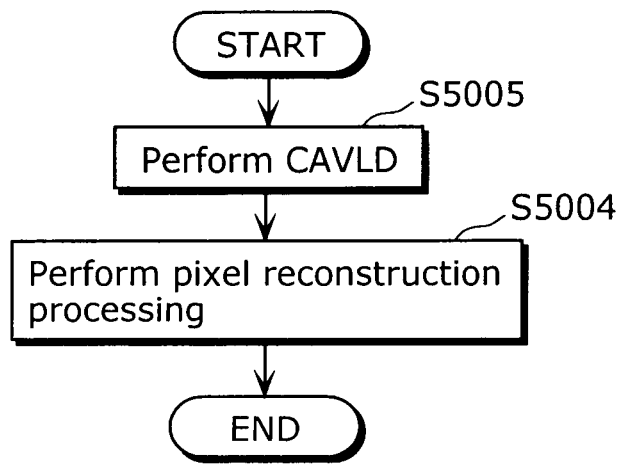

FIG. 35

| | Player variable (System parameter) | | | | | | |
|---|---|---|---|---|---|---|---|
| 0 | Language Code | 11 | Player audio mixing mode for Karaoke | 22 | reserved |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

FIG. 40

MOVING IMAGE ENCODING METHOD AND APPARATUS

BACKGROUND OF THE INVENTION

1. Field of Invention

The present invention relates to a moving image encoding method, an image encoding apparatus, and data for encoding a moving image while switching between variable-length encoding schemes.

2. Description of the Related Art

The following describes a DVD-Video disc (hereinafter simply referred to as a "DVD") of a conventional technology.

FIG. 1 is a diagram showing the structure of a DVD. As shown in the bottom of FIG. 1, the DVD disc includes a logical address space in between the lead-in area and the lead-out area. In the logical address space, volume information of the file system is stored at the top, and application data such as video and audio is stored in the subsequent areas.

The file system, which is a file system compliant with ISO9660 and the Universal Disc Format (UDF), is a mechanism for representing data on a disc by units called directories and files. Even in a personal computer (PC) for everyday use, data stored in the hard disk in the form of directories and files are represented on the computer via a file system called FAT or NTFS, as a result of which usability is enhanced.

Both UDF and ISO9660 (which are sometimes referred to collectively as "UDF Bridge") are used in DVDs, and data can be read out by the file system driver of any of UDF and ISO9660. In the case of DVD-RAM/R/RW, which are rewritable DVD discs, data reading, writing, and deletion are physically possible via these file systems.

Data stored on a DVD can be viewed, via the UDF bridge, as directories or files as shown in the upper left of FIG. 1. Immediately below the root directory ("ROOT" in FIG. 1), a directory called "VIDEO_TS" is placed, where application data of the DVD is stored. The application data is stored as plural files. The following are some of the major files:

VIDEO_TS. IFO disc reproduction control information file

VTS_01_0. IFO video title set#1 reproduction control information file

VTS_01_0. VOB video title set#1 stream file

...

There are two types of extensions specified. "IFO" indicates that the corresponding file stores reproduction control information. "VOB" indicates that the corresponding file stores an MPEG stream being AV data. The reproduction control information is information that includes information for realizing interactivity (technique for dynamically changing the state of reproduction according to a user operation) employed for the DVD as well as information, such as meta data, which is attached to a title or an AV stream. The reproduction control information of the DVD is called navigation information in general.

The reproduction control information files include "VIDEO_TS. IFO" intended for the management of the entire disc, and "VTS_01_0. IFO" being the reproduction control information of an individual video title set (a single DVD disc can store plural titles, that is, different movies and movies with different versions). "01" in the body of the filename indicates the number of the video title set. In the case where the number of a video title set is #2, for example, the filename is "VTS_02_0. IFO".

The upper right of FIG. 1 shows a DVD navigation space in the application layer of the DVD, i.e., a logical structure space where the above-described reproduction control information is shown. Information in "VIDEO_TS. IFO" is shown in the DVD navigation space as Video Manager Information (VMGI). Reproduction control information which exists for each "VTS_01_0. IFO" or for each video title set, is shown in the DVD navigation space as Video Title Set Information (VTSI).

VTSI describes Program Chain Information (PGCI) which is information about a reproduction sequence called a Program Chain (PGC). The PGCI is made up of a group of cells and a kind of programming information called a command. Each cell represents a part or the whole segments in a VOB (which is an abbreviation of Video Object and which includes an MPEG stream). The reproduction of a cell means to reproduce segments in the VOB that are specified by such cell.

A command, which is processed by a DVD-capable virtual machine, is similar to Java (registered trademark) Script executed on a browser. However, a DVD command is different from a Java (registered trademark) Script in that, while Java (registered trademark) Script performs window and browser controls (e.g., opens a new browser window) in addition to logical operations, a DVD command performs only the reproduction control of AV titles, such as the specification of a chapter to be reproduced, in addition to logical operations.

Each cell includes, as its internal information, the start address and end address (logical storage address on the disc) of a VOB stored on the disc. A player reads out data using such information described in the cell about the start address and end address of the VOB, and reproduces the read data.

FIG. 2 is a schematic diagram for describing the navigation information embedded in the AV stream. Interactivity, which is characteristics to a DVD, is not realized only by the navigation information stored in the above-described "VIDEO_TS. IFO" and "VTS_01_0. IFO"; several pieces of important information are multiplexed in the VOB together with video data and audio data, using dedicated carriers called navigation packs (hereinafter referred to as navi pack(s) or NV_PCK).

Here, a description is given of a menu as a simple example of interactivity. Several buttons appear on the menu screen. For each of such buttons, a process to be performed when such button is selected and activated, is defined. One button is selected on the menu (the fact that the button is selected is indicated to the user by a semitransparent color overlaid on such button in a highlighted manner). The user can shift to any of the buttons located above, below, right or left of the currently selected button, using the Up/Down/Right/Left key on the remote control. Using the Up/Down/Right/Left key on the remote control, the user moves the highlight to a button such user wishes to select and activate, and then determines (presses the Determination key). Accordingly, a program of the corresponding command is activated. In general, the reproduction of the corresponding title or chapter is activated by the command.

The upper left of FIG. 2 shows an overview of the control information stored in NV_PCK.

NV_PCK includes highlight color information and button information of each button. The highlight color information describes color palette information, which specifies a semitransparent color of a highlight to be overlaid. Each button information describes: rectangular area information that is information about the position of each button; shift information indicating a move from one button to another button (specification of a destination button corresponding to a user selection of the Up/Down/Right/Left key); and button command information (a command to be executed when such button is selected).

As shown in the upper right center of FIG. 2, a highlight on the menu is generated as an overlay image. The overlay image is an image generated by giving a color specified by the color palette information to the rectangular area information in the button information. Such overlay image is displayed on the screen, superimposed on the background image shown in the right of FIG. 2.

The menu of the DVD is realized in the above-described manner. The reason that a part of the navigation data is embedded in the stream using NV_PCK is to allow the menu information to be dynamically updated in synchronization with the stream (e.g., to allow the menu to be displayed only for five to ten minutes in the middle of movie reproduction), and to realize the menu of the DVD without any problems even for an application which is likely to have a problem of synchronization timing. Another major reason is to improve user operability by, for example, storing, in NV_PCK, information for supporting special reproduction, so as to smoothly decode and reproduce AV data even when a DVD is reproduced in a special manner such as fast-forward reproduction and rewind reproduction.

FIG. 3 is a conceptual diagram showing a VOB being a DVD stream. As shown in the drawing, data such as video, audio, and subtitles (as shown in A) are each packetized and packed (as shown in B), based on the MPEG system standard (ISO/IEC13818-1), and multiplexed to be a single MPEG program stream (as shown in C). NV_PCK including a button command for realizing interactivity as described above is multiplexed together.

Multiplexing in the MPEG system is characterized in that, while each data to be multiplexed forms a bit string based on its decoding order, data to be multiplexed, i.e., video data, audio data, and subtitle data do not necessarily form a bit string in order of reproduction. This is attributable to the fact that a decoder model for a multiplexed MPEG system stream (generally referred to as a System Target Decoder or an STD (shown in D in FIG. 3) has decoder buffers corresponding to the respective elementary streams obtained by demultiplexing the multiplexed data, and such demultiplexed data are temporarily stored in the respective decoder buffers until the time of decoding. The size of decoder buffers specified by the DVD-Video standard differs on an elementary stream basis. The size of the buffer for video data is 232 KB, the size of the buffer for audio data is 4 KB, and the size of the buffer for subtitle data is 52 KB.

In other words, the subtitle data that is multiplexed together with the video data is not necessarily decoded or reproduced at the same timing.

Meanwhile, there is the Blu-ray Disc (BD) standard as a next-generation DVD standard.

While a DVD is intended for the package distribution of video with standard image quality (standard-definition image quality) as well as the recording of analog broadcasting (the DVD Video Recording format), a BD is capable of recording digital broadcasting with high-definition image quality as it is (the Blu-ray Disc Rewritable format; hereinafter referred to as the BD-RE).

However, since the BD-RE format widely supports the recording of digital broadcasting, information that supports special reproduction or the like is not optimized. Considering that high-definition video will be distributed in the future by means of package distribution at the rate higher than that for digital broadcasting (the BD-ROM format), there will be the need for a mechanism that stresses out a user even at the time of special reproduction.

One of the schemes employed for the encoding of a moving image on a BD is MPEG-4 AVC (Advanced Video Coding).

MPEG-4 AVC is a next-generation encoding scheme with a high compression ratio which has been jointly developed by ISO/IEC (International Organization for Standardization/International Electrotechnical Commission) JTC1/SC29/WG11 and ITU-T (International Telecommunication Union-Telecommunication Standardization Sector).

In general, in encoding of a moving image, the amount of information is compressed by reducing redundancies in temporal and spatial directions. Therefore, in inter-picture predictive encoding aiming at reducing temporal redundancies, motion estimation and generation of a predictive image are carried out on a block-by-block basis with reference to forward or backward picture(s), and encoding is then performed on the difference value between the obtained predictive image and an image in the current picture to be encoded. Here, "picture" is a term denoting one screenful of image. In the case of a progressive image, a picture means a frame, whereas it means a frame or a field in the case of an interlaced image. Here, "interlaced image" is an image of a frame composed of two fields which are separated in capture time. In encoding and decoding of an interlaced image, it is possible to handle one frame as a frame as it is, as two fields, or in a frame structure or a field structure on a per-block basis within the frame.

A picture to be encoded using intra-picture prediction without reference to any reference images shall be referred to as an I picture. A picture to be encoded using inter-picture prediction with reference to only one reference picture shall be referred to as a P picture. A picture to be encoded using inter-picture prediction with reference to two reference pictures at the same time shall be referred to as a B picture. It is possible for a B picture to refer to two pictures which can be arbitrarily combined from forward/backward pictures in display time. Reference images (reference pictures) can be designated for each block serving as a basic unit of encoding and decoding. Distinction shall be made between such reference pictures by calling a reference picture to be described earlier in an encoded bitstream a first reference picture, and by calling a reference picture to be described later in the bitstream a second reference picture. Note that as a condition for encoding and decoding these types of pictures, pictures used for reference need to be already encoded and decoded.

A residual signal, which is obtained by subtracting, from an image to be encoded, a prediction signal obtained through intra-picture prediction or inter-picture prediction, is quantized through frequency transformation and then variable-length encoded to be outputted as an encoded stream. MPEG-4 AVC supports two kinds of variable-length encoding schemes, which can be switched on a picture-by-picture basis: Context-Adaptive Variable-length coding (CAVLC) and Context-Adaptive Binary Arithmetic Coding (CABAC). Context-adaptive scheme allows to adaptively select an efficient encoding scheme according to the surrounding situations.

FIG. 4 shows an example of variable-length encoding schemes to be applied to pictures that make up a randomly accessible unit in an MPEG-4 AVC stream. MPEG-4 AVC has no concept of a group of pictures (GOP) of the MPEG-2 Video standard. However, since it is possible to construct a randomly accessible unit corresponding to a GOP by dividing data into special picture units that can be decoded independently of other pictures, such an unit is referred to as a random access unit (RAU) here. As shown in FIG. 4, whether to apply CABAC or CAVLC as a variable-length encoding scheme is switched on a picture-by-picture basis.

Next, referring to FIGS. 5A to 5C, descriptions are given of the respective variable-length decoding processes of CABAC and CAVLC, which are different in processes at the time of variable-length decoding. FIG. 5A is a block diagram showing an image decoding apparatus that performs Context-Adaptive Binary Arithmetic Decoding (CABAD), which is decoding processing for data variable-length encoded through CABAC and that performs Context-Adaptive Variable-length decoding (CAVLD), which is decoding processing for data encoded through CAVLC.

Image decoding processing with CABAD is performed in the following manner: first, encoded data Vin applied with CABAC is inputted to a stream buffer 5001; next, an arithmetic decoding unit 502 reads encoded data Vr from the stream buffer to perform arithmetic decoding on it, and inputs binary data Bin1 to a binary data buffer 5003; a binary data decoding processing unit 5004 obtains binary data Bin2 from the binary data buffer 5003 to decode such binary data, and inputs the resulting decoded data Din1 to a pixel reconstruction unit 5005; and the pixel reconstruction unit 5005 performs inverse-quantization, inverse-transformation, motion compensation, and the like on the decoded binary data Din1 so as to reconstruct pixels, and outputs decoded data Vout.

FIG. 5B is a flowchart illustrating operations to be performed from when the decoding of encoded data applied with CABAC starts to when pixel reconstruction processing is performed. First, in Step 5001, the encoded data Vin applied with CABAC is arithmetic-decoded, so as to generate binary data. Next, in Step 5002, it is determined whether or not binary data equivalent to a predetermined data unit, such as one or more pictures, is ready. In the case where such binary data is ready, the process proceeds to Step S5003, whereas in the case where such binary data is not ready, the process of Step S5002 is repeated. The reason for buffering the binary data here is that CABAC sometimes results in a significant increase in the number of bits of binary data per picture or per macroblock, which consequently results in a significant increase also in processing load in arithmetic decoding. Thus, in order to achieve continuous reproduction without interruption even in the worst case scenario, it is necessary to perform a certain amount of arithmetic decoding processing in advance. In Step S5003, binary data is decoded, and in Step S5004, the pixel reconstruction processing is performed. In CABAD, as described above, a delay occurs at the start of decoding since it is not possible to start the pixel reconstruction processing until binary data equivalent to a predetermined data unit is ready in Step S5001 and Step S5002.

Image decoding processing with CAVLD is performed in the following manner: first, encoded data Vin applied with CAVLC is inputted to the stream buffer 5001; next, a CAVLD unit 5006 performs variable-length decoding on it, and inputs the resulting decoded VLD data Din2 into the pixel reconstruction unit 5005; the pixel reconstruction unit 5005 performs inverse-quantization, inverse-transformation, motion compensation, and the like so as to reconstruct pixels, and outputs decoded data Vout. FIG. 5C is a flowchart illustrating operations to be performed from when the decoding of encoded data applied with CAVLC starts to when pixel reconstruction processing is performed. First, in Step S5005, CAVLD is performed. Then, in Step S5004, the pixel reconstruction processing is performed. As described above, unlike CABAD, it is not necessary in CAVLD to wait for data equivalent to a predetermined data unit to be ready before the start of the pixel reconstruction processing or to have an intermediate buffer for variable-length decoding processing, such as the binary data buffer 5003.

FIG. 6 is a flowchart illustrating operations performed by a conventional decoding apparatus that decodes a stream in which variable-length encoding schemes are switched in the middle of the stream as in an example case of FIG. 4. First, in Step S5101, information indicating a variable-length encoding scheme applied to a picture is obtained, and the process proceeds to Step S5102. In Step S5102, it is determined whether or not the variable-length encoding scheme for the current picture is switched from that for the previous picture in decoding order. Methods of buffer management at the time of variable-length decoding processing are different between CABAD and CAVLD. Thus, in the case where the variable-length encoding schemes have been switched, the process proceeds to Step S5103 to perform a process of switching between buffer management methods, whereas in the case where the variable-length encoding scheme has not been switched, the process proceeds to Step S5104. In Step S5104, it is determined whether or not the variable-length encoding scheme is CAVLC. In the case where the variable-length encoding scheme is CAVLC, the process proceeds to Step S5105 to perform CAVLD processing, whereas in the case where the variable-length encoding scheme is CABAC, the process proceeds to Step S5106. In Step S5106, it is determined whether or not the variable-length encoding scheme for the current picture is switched from that for the previous picture in decoding order. In the case where the variable-length encoding schemes have been switched, the process proceeds to Step S5107, where arithmetic decoding is repeated until binary data equivalent to a predetermined data unit is ready, and such binary data is decoded, as shown in Step S5001 and Step S5002 in FIG. 5B. In the case where it is determined in Step S5106 that the variable-length encoding scheme has not been switched, the process proceeds to Step S5108 to perform regular CABAD processing. The regular CABAD processing here refers to processing that does not involve the buffering of binary data that is needed at the time when CAVLC is switched to CABAC or when the decoding of a stream applied with CABAC starts. Finally, in Step S5109, pixel reconstruction processing is performed.

Patent Document 1: Japanese Laid-Open Patent Application No. 2000-228656.

Non-patent Document 1: Proposed SMPTE Standard for Television: VC-1 Compressed Video Bitstream Format and Decoding Process, Final Committee Draft 1 Revision 6, Jul. 13, 2005.

BRIEF SUMMARY OF THE INVENTION

As described above, there is a first problem that a delay occurs due to the buffering of binary data when the switching from CAVLC to CABAC occurs, since a variable-length encoding scheme is switched on a picture-by-picture basis at the time of reproducing a conventional multiplexed MPEG-4 AVC stream from a conventional information storage medium. In particular, there will be cumulative delays if the variable-length encoding schemes are frequently switched, which may result in an interruption of reproduction. Furthermore, since the methods for buffer management are different between CABAC and CAVLC, there is a second problem that processing load at the time of decoding is increased due to the necessity to switch between the methods for buffer management every time variable-length encoding schemes are switched.

The present invention aims at providing an image encoding method that does not cause an interruption at the time of reproduction without an increase in processing load at the time of decoding.

The image encoding method that achieves the above object is a moving image encoding method for encoding a moving image while switching between variable-length encoding schemes, the method including: determining a continuous unit to be continuously reproduced; generating a stream by encoding the moving image without switching between variable-length encoding schemes in the continuous unit; and generating management information that includes a first flag information indicating that a variable-length encoding scheme is fixed in the continuous unit.

With the above structure, since a variable-length encoding scheme is fixed in a unit which is to be continuously reproduced, it is possible to eliminate a delay that is caused by switching between variable-length encoding schemes at the time of decoding and to improve the quality of reproduction at the time of decoding. It is further possible to reduce processing load incurred by switching between buffer management methods.

Here, the continuous unit may correspond to one stream and may be identified by a packet identifier of a transport stream.

Here, the stream that constitutes the continuous unit may be identified by a packet identifier of a transport stream.

The continuous unit may include streams to be seamlessly connected.

The continuous unit may include streams corresponding to respective angles making up a seamless multi-angle.

The continuous unit may include streams corresponding to respective angles making up a non-seamless multi-angle.

The moving image encoding method may further include inserting a second flag information for each predetermined unit in the encoded moving image, the second flag information indicating a variable-length encoding scheme.

Here, the management information may include a playlist which indicates a reproduction order for one or more reproduction segments, each reproduction segment being the whole or a part of a stream, the first flag information may be generated for each of the one or more reproduction segments indicated in the playlist, and the predetermined unit may be a unit in which a picture parameter set is added, the picture parameter set being included in a stream which has been encoded in compliance with MPEG-4 AVC.

With the above structure, it is possible to prevent an interruption in reproduction without an increase in the processing load at the time of decoding, by using encoding that enables to switch between variable-length encoding schemes within a stream such as an MPEG-4 AVC stream.

The management information may include a playlist which indicates a reproduction order for one or more reproduction segments, each reproduction segment being the whole or a part of a stream, the first flag information may be generated for each of the one or more reproduction segments indicated in the playlist, the second flag information may indicate the variable-length encoding scheme applied to information of each macroblock, the predetermined unit may be a picture unit in the stream, and the information of each macroblock may be added for each macroblock in the stream in the case where the variable-length encoding scheme is a first scheme in bitplane encoding, and may be added for each picture in the stream in the case where the variable-length encoding scheme is a second scheme in bitplane encoding, wherein in the second scheme, the second flag information corresponding to all macroblocks in a picture may be inserted to a head of the picture in the stream.

With the above structure, it is possible to prevent an interruption in reproduction without an increase in the processing load at the time of decoding, by using encoding that enables to switch between variable-length encoding schemes within a stream such as a VC-1 stream.

Here, the first flag information may indicate that the variable-length encoding scheme is fixed in the continuous unit and that the stream is to be seamlessly connected.

With the above structure, it is possible to reduce the amount of data of the management information.

The details of the image encoding apparatus of the present invention are not given since it includes the same units as those of the above-described image encoding method.

Also, data, of the present invention, having a computer-readable structure, includes management information and a stream representing an encoded moving image, wherein the management information includes a first flag information indicating that a variable-length encoding scheme is fixed in a continuous unit to be continuously reproduced, and the stream includes a second flag information for each predetermined unit in the encoded moving image, the second flag information indicating a variable-length encoding scheme.

With the above structure, since a variable-length encoding scheme is fixed in a unit which is to be continuously reproduced, it is possible to eliminate a delay that is caused by switching between variable-length encoding schemes at the time of decoding and to improve the quality of reproduction at the time of decoding. It is further possible to reduce processing load incurred by switching between buffer management methods.

Here, the management information may include a playlist which indicates a reproduction order for one or more reproduction segments, each reproduction segment being the whole or a part of a stream, the first flag information may correspond to each of the one or more reproduction segments indicated in the playlist, and the predetermined unit may be a unit in which a picture parameter set is added, the picture parameter set being included in a stream which has been encoded in compliance with MPEG-4 AVC.

Here, the management information may include a playlist which may indicate a reproduction order for one or more reproduction segments, each reproduction segment being the whole or a part of a stream, the first flag information may correspond to each stream indicated in the playlist, the second flag information may indicate the variable-length encoding scheme applied to each macroblock, the predetermined unit may be a macroblock unit in the case where the variable-length encoding scheme is the first scheme, whereas it may be a picture unit in the stream in the case where the variable-length encoding scheme is the second scheme, and in the case where the variable-length encoding scheme is the second scheme, the second flag information corresponding to all macroblocks in a picture may be inserted to a head of the picture in the stream.

As described above, according to the image encoding method of the present invention, by fixing a variable-length encoding scheme to be applied to encoded data of a moving image in a continuous unit, it is possible to eliminate a delay that is caused by switching between variable-length encoding schemes at the time of decoding and to reduce the processing load incurred by switching between buffer management methods. For example, it is possible to: improve the quality of reproduction of a packaged medium in which a stream is multiplexed which supports the switching of variable-length encoding schemes within a stream such as an MPEG-4 AVC stream and a VC-1 stream; and to reduce the processing load

BRIEF DESCRIPTION OF DRAWINGS

FIG. 5A is a block diagram showing a structure of a decoding apparatus that decodes an encoded stream applied with CABAC and CAVLC.

FIG. 5B is a flowchart illustrating operations for decoding an encoded stream applied with CABAC.

FIG. 5C is a flowchart illustrating operations for decoding an encoded stream applied with CAVLC.

FIG. 35 is a diagram showing a table of player variables.

FIG. 40 is a flowchart showing event processes.

FIG. 46 is a diagram for describing a flag that guarantees that all I pictures are referred to.

DETAILED DESCRIPTION OF THE INVENTION

The following describes embodiments of the present invention with reference to the drawings.

First Embodiment

First, the first embodiment is described.

The present embodiment describes an information storage medium and a reproduction apparatus therefor that are capable of suppressing the occurrence of a delay in a decoding operation which is caused by switching between variable-length encoding schemes as well as suppressing an increase in processing load incurred by switching between buffer management methods, which is required at the same time, at the time of decoding encoded data of a moving image in a packaged medium such as a BD-ROM. The following describes MPEG-4 AVC as a scheme for encoding a moving image, but another encoding scheme may be used that is capable of switching between variable-length encoding schemes in the middle of a stream.

In an MPEG-4 AVC stream stored on the information storage medium of the present embodiment, there is a restriction on a unit of switching between variable-length encoding schemes, and information that indicates that there is a restriction on a unit of switching or that indicates such restricted unit of switching, is stored in management information.

Figure 7:
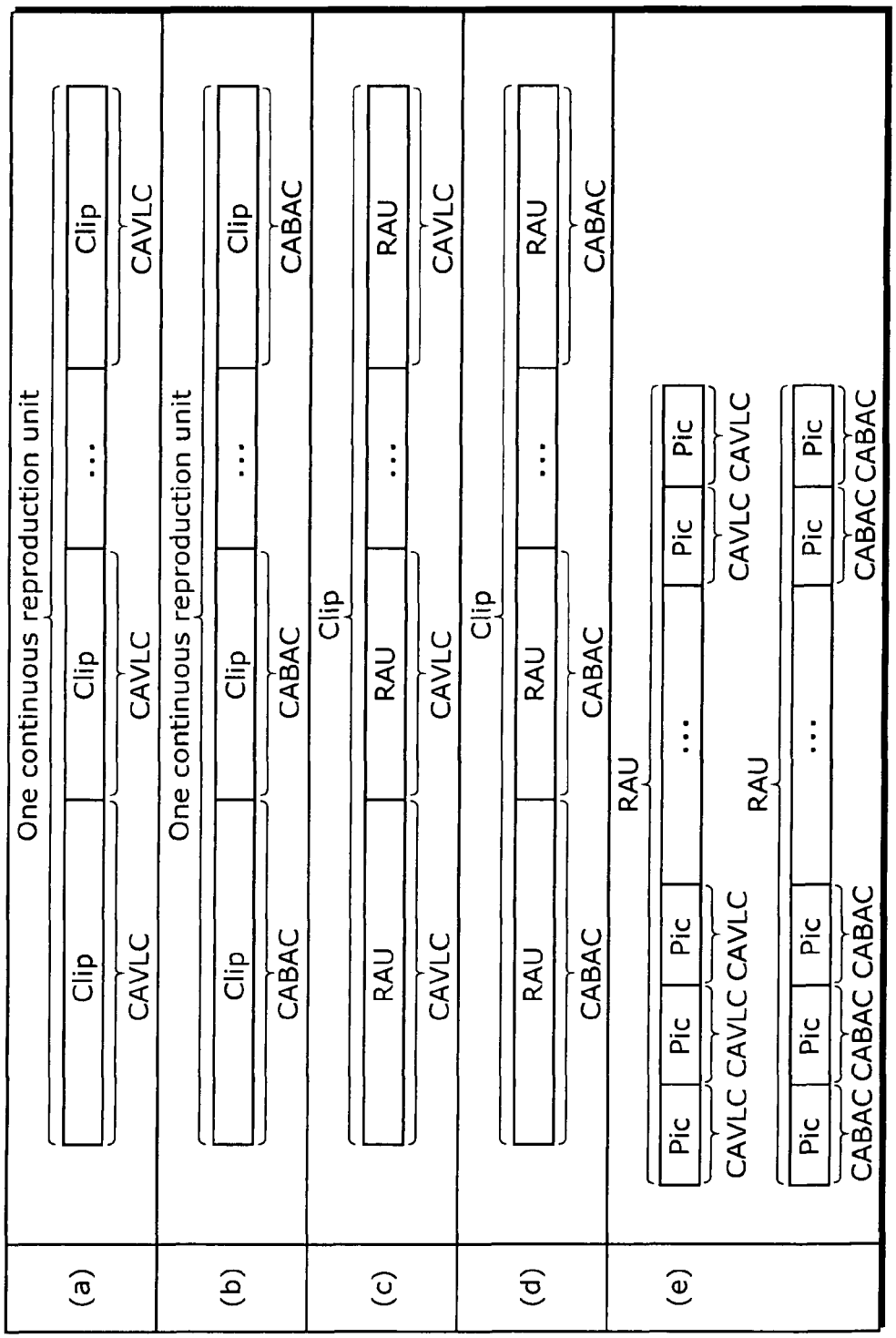
FIG. 7 is a diagram showing example variable-length encoding schemes to be applied for each picture in an MPEG-4 AVC stream stored on an information storage medium of a first embodiment.

FIG. 7 shows an example restriction on a unit of switching between variable-length encoding schemes in an MPEG-4 AVC stream. In a packaged medium such as a BD-ROM, a unit of continuously reproducing encoded data of a moving image (hereinafter referred to as a "continuous reproduction unit") is specified by a playlist or the like. Therefore, by using a fixed variable-length encoding scheme in a continuous reproduction unit, there occurs no delay in a decoding operation that is caused by switching between variable-length encoding schemes or no need to switch buffer management methods in a unit to be continuously reproduced. For this reason, the present embodiment fixes a variable-length encoding scheme in a continuous reproduction unit. (a) and (b) in FIG. 7 shows examples of allowing, as a variable-length encoding scheme, only CAVLC and only CABAC, respectively, in a continuous reproduction unit. Meanwhile, there are two types of conditions for connecting clips to be continuously reproduced: seamless connection and non-seamless connection. The term "connection" here includes the connection of plural segments in a single clip. A non-seamless connection is sometimes subject to the occurrence of a gap in a decoding operation at the time of a connection to an open GOP, for example. Thus, a variable-length encoding scheme may be fixed in continuous reproduction units to be seamlessly connected, on the condition that switching between the variable-length encoding schemes is also allowed.

Note that a variable-length encoding scheme may be fixed in a unit different from a continuous reproduction unit, such as a clip and a random access unit (RAU). (c) and (d) in FIG. 7 show examples in which a variable-length encoding scheme is fixed on a clip basis and, and (e) in FIG. 7 shows an example in which a variable-length encoding scheme is fixed on a random access unit.

Figure 8:
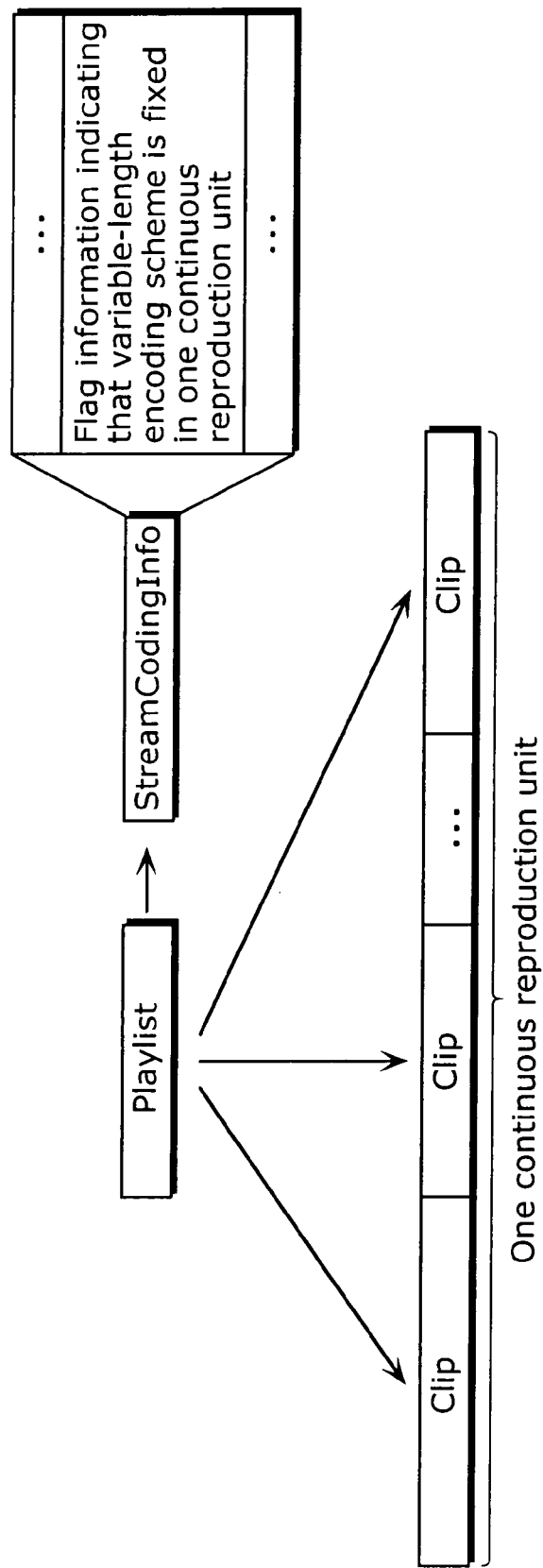
FIG. 8 is a diagram showing an example of how flag information, which indicates a unit for which a variable-length encoding scheme is fixed, is stored on the information storage medium.

Next, in an MPEG-4 AVC stream, management information stores flag information indicating that there exists a restriction on a unit of switching between variable-length encoding schemes. Here, identification information for identifying an encoding scheme is used as a flag. FIG. 8 shows an example of how a flag is stored on a BD-ROM. In a BD-ROM, since an encoding scheme for each of the clips referred to from a playlist is stored in an area in the management information called StreamCodingInfo, it shall mean that a variable-length encoding scheme is fixed in a continuous reproduction unit when it is indicated that the encoding scheme is MPEG-4 AVC. Note that it may be separately indicated whether the variable-length encoding scheme is CABAC or CAVLC.

Note that a separate flag indicating that there exists a restriction on a unit of switching between variable-length encoding schemes may be defined and stored, or information indicating a unit of switching between variable-length encoding units may be stored. Such pieces of information may be stored in an MPEG-4 AVC stream. For example, it is possible to store, in Supplemental Enhancement Information (SEI) or in a Network Abstraction Layer (NAL) unit, information indicating that a variable-length encoding unit is fixed for the pictures within a random access unit, the SEI being placed at the first picture in a random access unit and the NAL unit of the type Unspecified.

Note that according to MPEG-4 AVC, entropy_coding_mode_flag, which is in a Picture Parameter Set (PPS) indicating initialization information of each picture, indicates whether the variable-length encoding scheme is CAVLC or CABAC. Thus, in the case where a variable-length encoding scheme is fixed in a certain unit, the field value of entropy_coding_mode_flag in all PPSs referred to by pictures is fixed in such unit. According to MPEG-4 AVC, it is allowed to store, into such predetermined area, a PPS which is not referred to by any pictures in a predetermined unit in decoding order. However, it is not particularly necessary to impose a restriction on the field value of entropy_coding_mode_flag in a PPS which is not referred to by any pictures in such unit. For example, while it is guaranteed that all PPSs referred to by pictures in a random access unit RAU exist in the random access unit RAU, a PPS that is not referred to by any pictures in the random access unit RAU may exist in such random access unit. In this case, since the PPS which is not referred to dose not affect decoding, it is not necessary to impose a restriction on the field value of entropy_coding_mode_flag. However, since it is easier in terms of handling if a fixed value is used as the field value of entropy_coding_mode_flag of PPSs included in a predetermined unit, a fixed value may be used also for the field value for a PPS that is not referred to.

Figure 1:
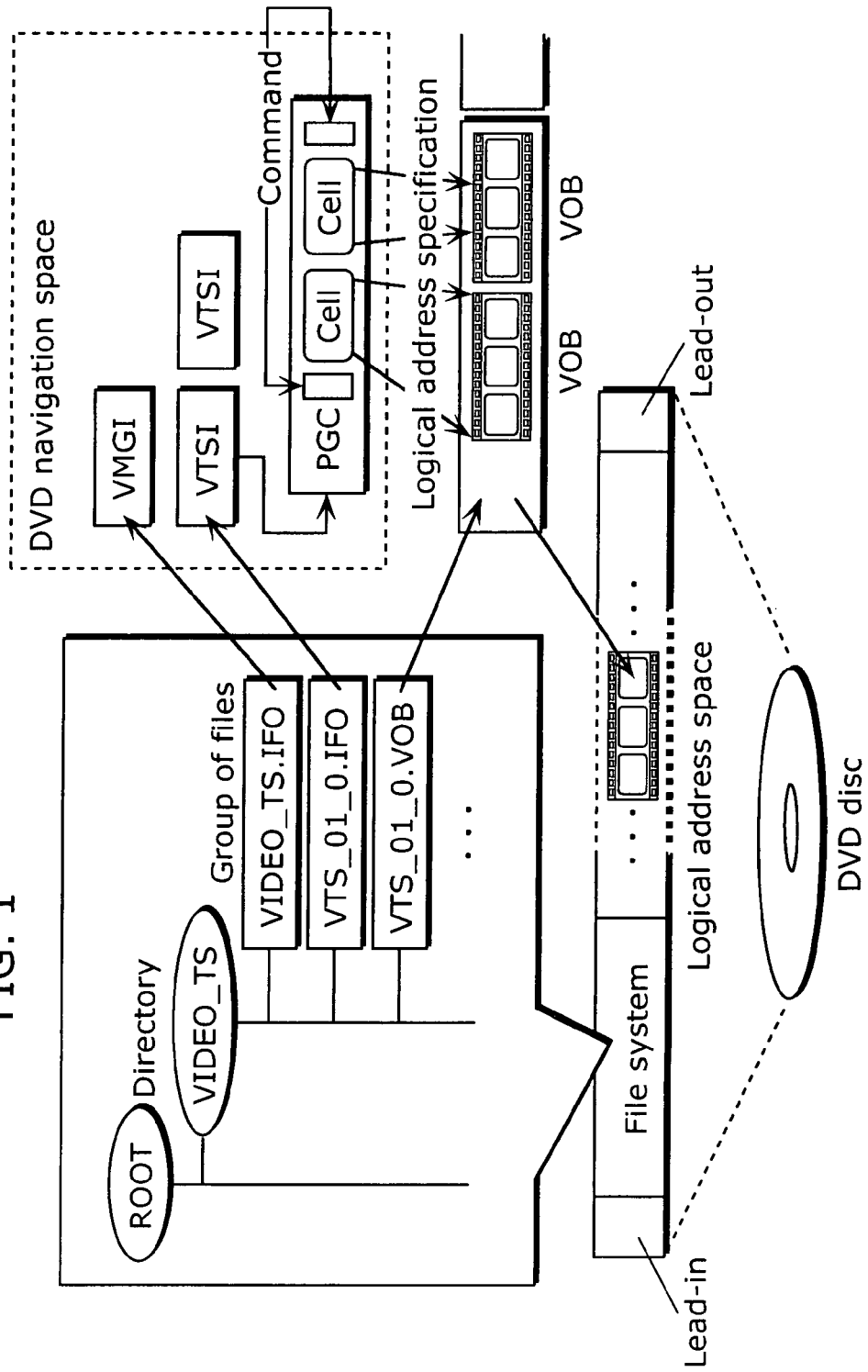
FIG. 1 is a diagram showing a structure of a DVD.
Figure 2:
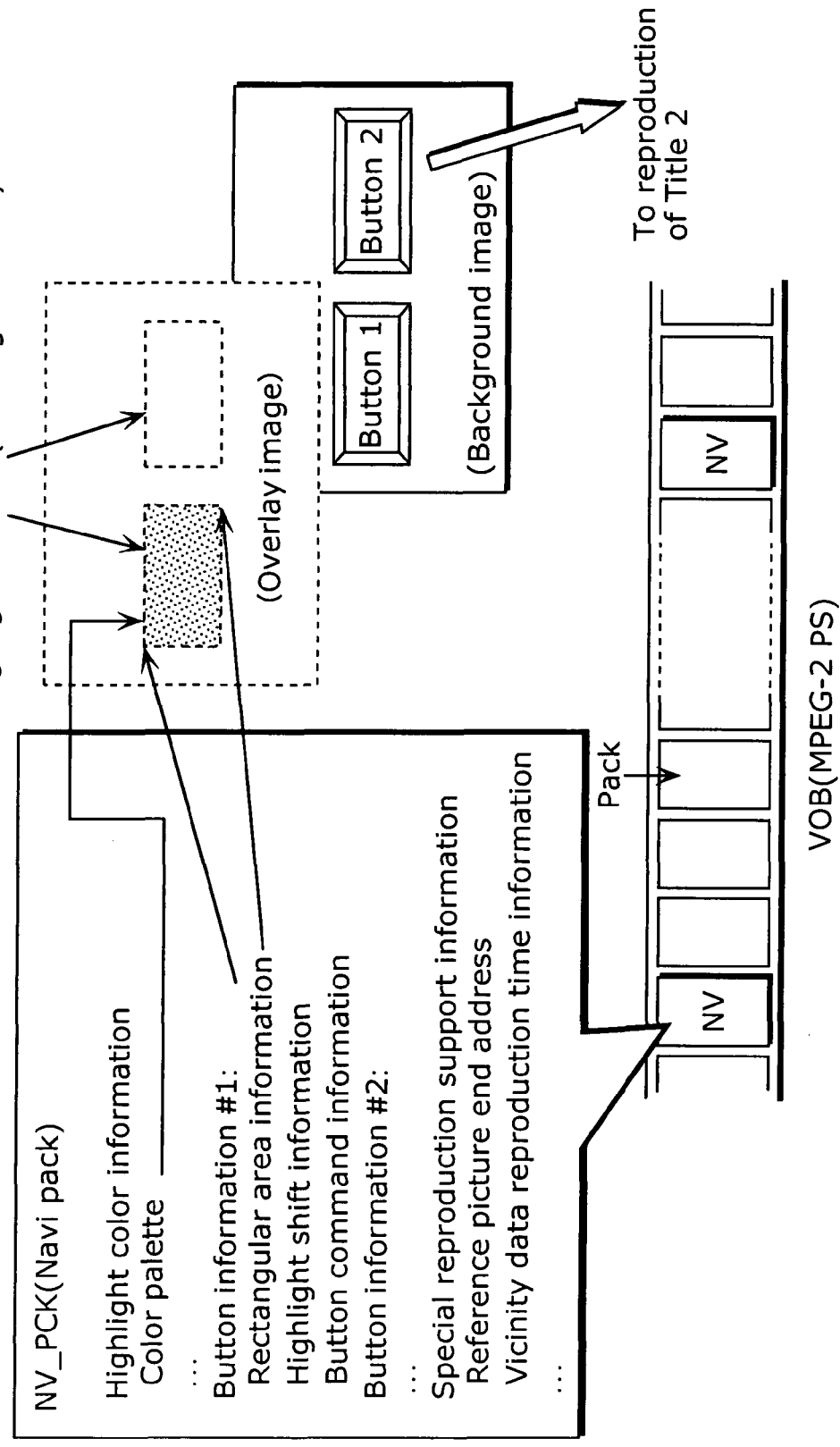
FIG. 2 is a diagram showing a structure of highlight.
Figure 3:
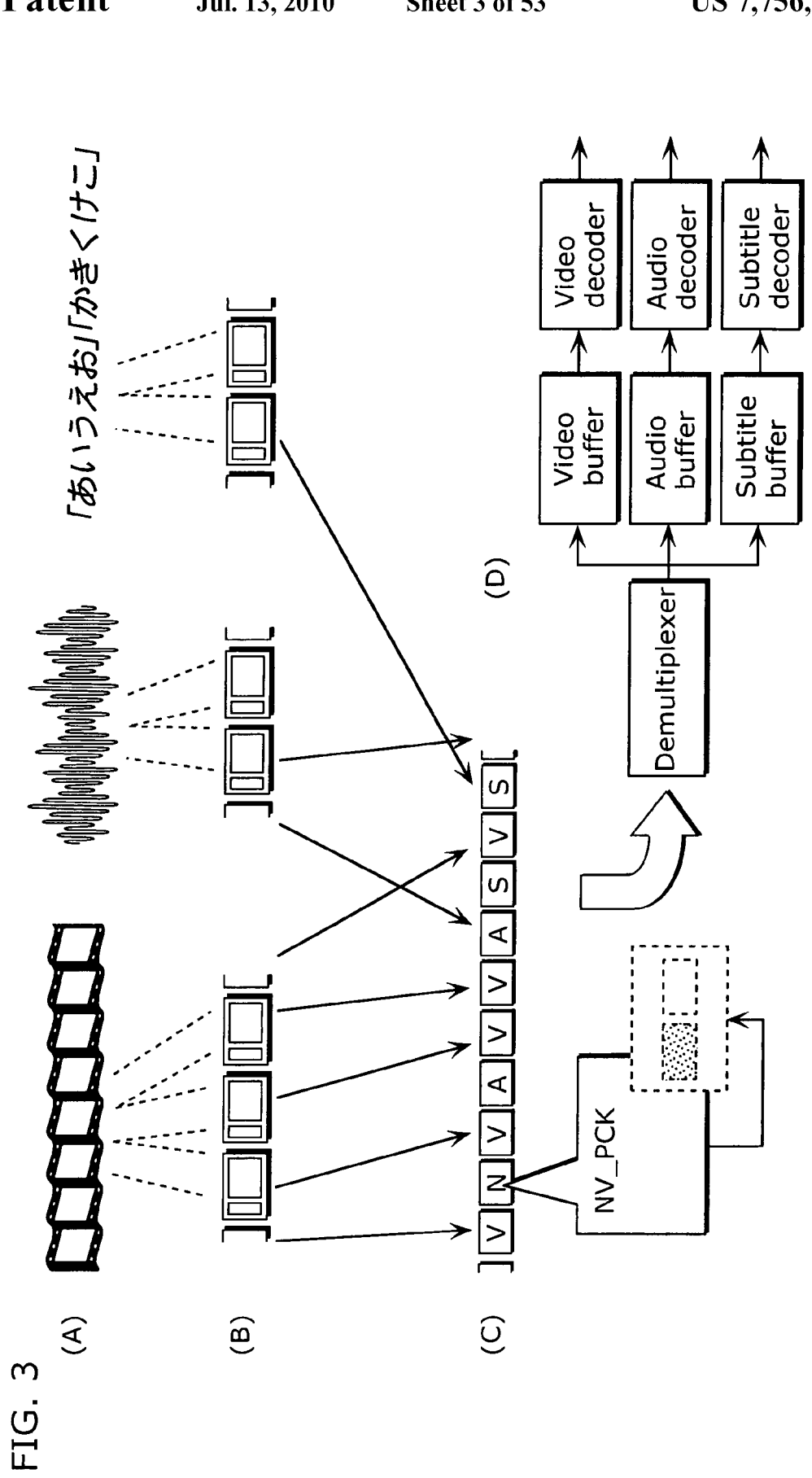
FIG. 3 is a diagram showing an example of multiplexing in a DVD.
Figure 4:
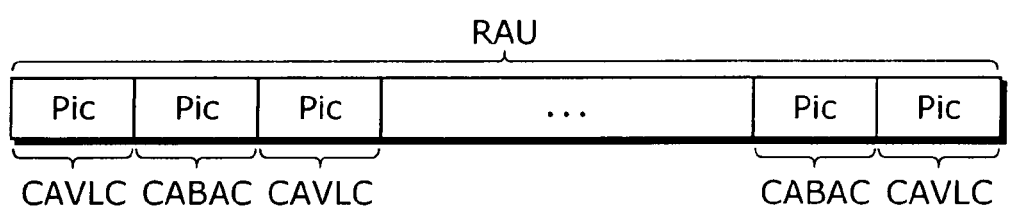
FIG. 4 is a diagram showing an example of variable-length encoding schemes to be applied to each picture in a conventional MPEG-4 AVC stream.
Figure 6:
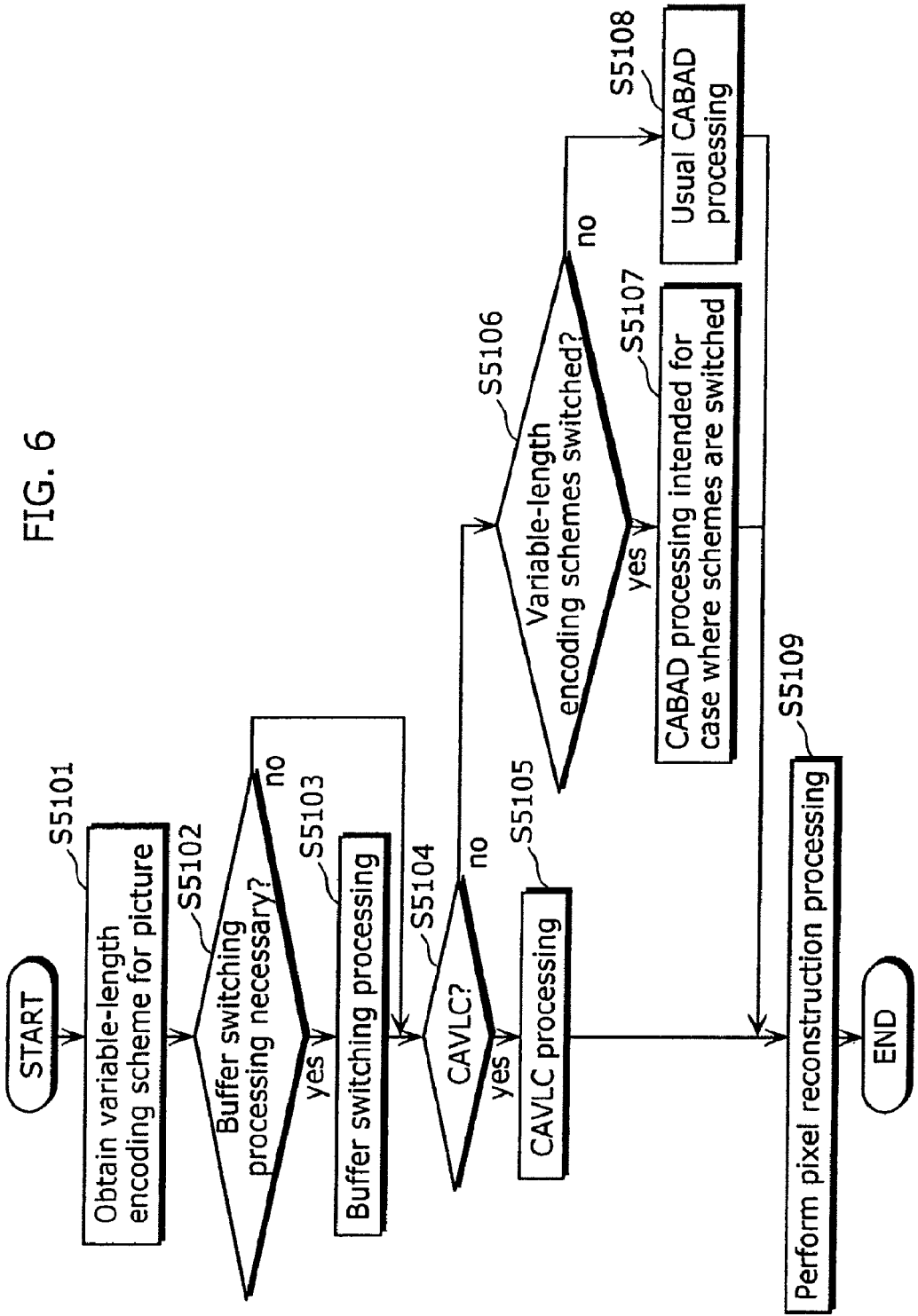
FIG. 6 is a flowchart illustrating operations performed by a conventional decoding apparatus.
Figure 9:
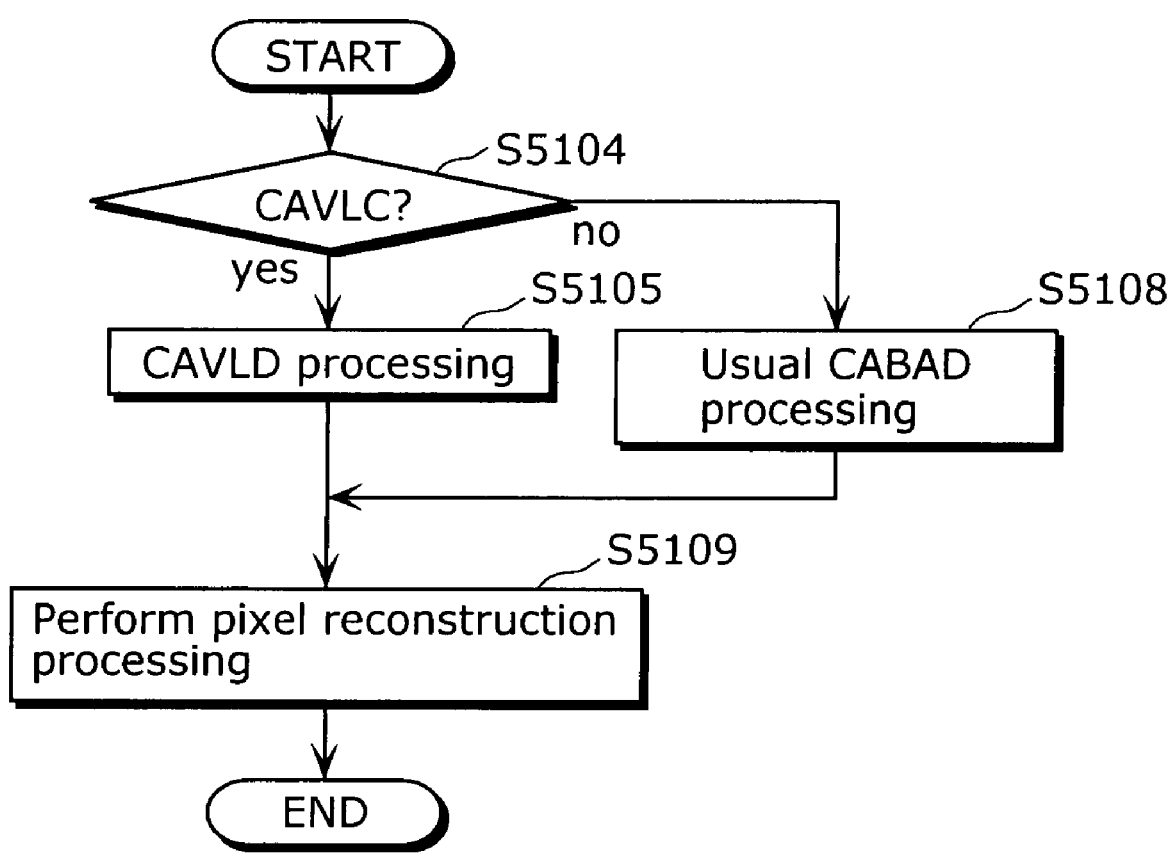
FIG. 9 is a flowchart illustrating operations performed by the decoding apparatus that reproduces the information storage medium.

FIG. 9 is a flowchart illustrating operations for decoding a continuous reproduction unit in the information storage medium of the present embodiment. Since a variable-length encoding scheme is fixed in a continuous reproduction unit, it is not necessary to perform the switching of buffering of binary data and the switching between buffer management methods in the middle of decoding as is necessary in the conventional decoding operations shown in FIG. 6. The operations in the respective steps are the same as the steps with the same numbers in FIG. 6, and thus descriptions thereof are not given here.

Moreover, the VC-1 (Non-patent document 1) standard is currently under development by the Society of Motion Picture and Television Engineers (SMPTE) as a new encoding scheme. VC-1 defines various flags indicating methods of encoding a macroblock (which is a unit sized 16×16 pixels). For example, the flags indicate whether or not a macroblock is a skipped macroblock, whether a macroblock is in the field mode or in the frame mode, whether or not a macroblock is a direct mode macroblock, and the like.

Bitplane encoding is one of the extended encoding tools. Bitplane encoding is used to encode the above-described flags indicating the methods for encoding a macroblock. Bitplane encoding makes it possible to show, in a picture header, these flags equivalent to one picture. In general, neighboring macroblocks are highly correlated with each other, and thus their flags are also highly correlated with each other. For this reason, by collectively encoding the flags of neighboring macroblocks, it is possible to reduce the number of bits used to represent flags.

Bitplane encoding defines seven encoding schemes. One of these is a scheme for encoding each flag into a macroblock header. Known as RAW MODE, such scheme is similar to the MPEG-2 video standard and the MPEG-4 visual standard. The other six scheme s are schemes for collectively encoding flags equivalent to one picture, and they are defined differently depending on how the flags of neighboring macroblocks are collectively encoded. For example, such six schemes can be: a scheme in which the flags of two neighboring macroblocks on the right and left are collectively encoded; a scheme in which, in the case where all flags of macroblocks in a horizontal line indicate "0", it is represented by a 1-bit "0", whereas in the case where at least one of the flags of a line of macroblocks indicates "1", each of the flags is encoded as it is; and the like.

It is possible to change which one of the seven types of schemes to use in bitplane encoding on a picture-by-picture basis independently of each flag.

Here, in bitplane encoding, assuming that mode 1 refers to the case of using only the scheme for encoding each flag in a macroblock header, and that mode 2 refers to the case of using only the scheme for encoding the flags equivalent to one picture in a collective manner, a delay may occur due to an increase in processing load when the switching of modes takes place, since operations at the time of decoding are different between mode 1 and mode 2. In view of this, as in the above case where a restriction is imposed on a unit of switching between variable-length encoding schemes, there may be imposed a restriction, in bitplane encoding, on a unit of switching between mode 1 and mode 2. For example, a mode shall be fixed in a continuous reproduction unit or in continuous reproduction units to be seamlessly connected. Moreover, management information may include flag information indicating that a mode of bitplane encoding is fixed in a predetermined unit. For example, using an encoding scheme indicated by StreamCodingInfo as flag information, it is possible to indicate that a mode of bitplane encoding is fixed in a predetermined unit when VC-1 is indicated as the encoding scheme.

Furthermore, assuming that mode 3 refers to the case where the scheme for encoding each flag in a macroblock header and the scheme for collectively encoding the flags equivalent to one picture are both available for use, there may be the case where mode 1 and mode 3 are selectively used depending on an environment in which VC-1 is used. For example, mode 1 can be used for a terminal with low processing capability, whereas mode 3 can be used for a terminal with high processing capability. In such a case, it is effective to fix a mode to one of mode 1 and mode 3 in a predetermined unit. Furthermore, management information or an encoded stream may store flag information indicating that a mode is fixed to one of mode 1 and mode 3, or information indicating which one of the modes is fixed. Note that mode 2 and mode 3 may also be selectively used.

Figure 10:
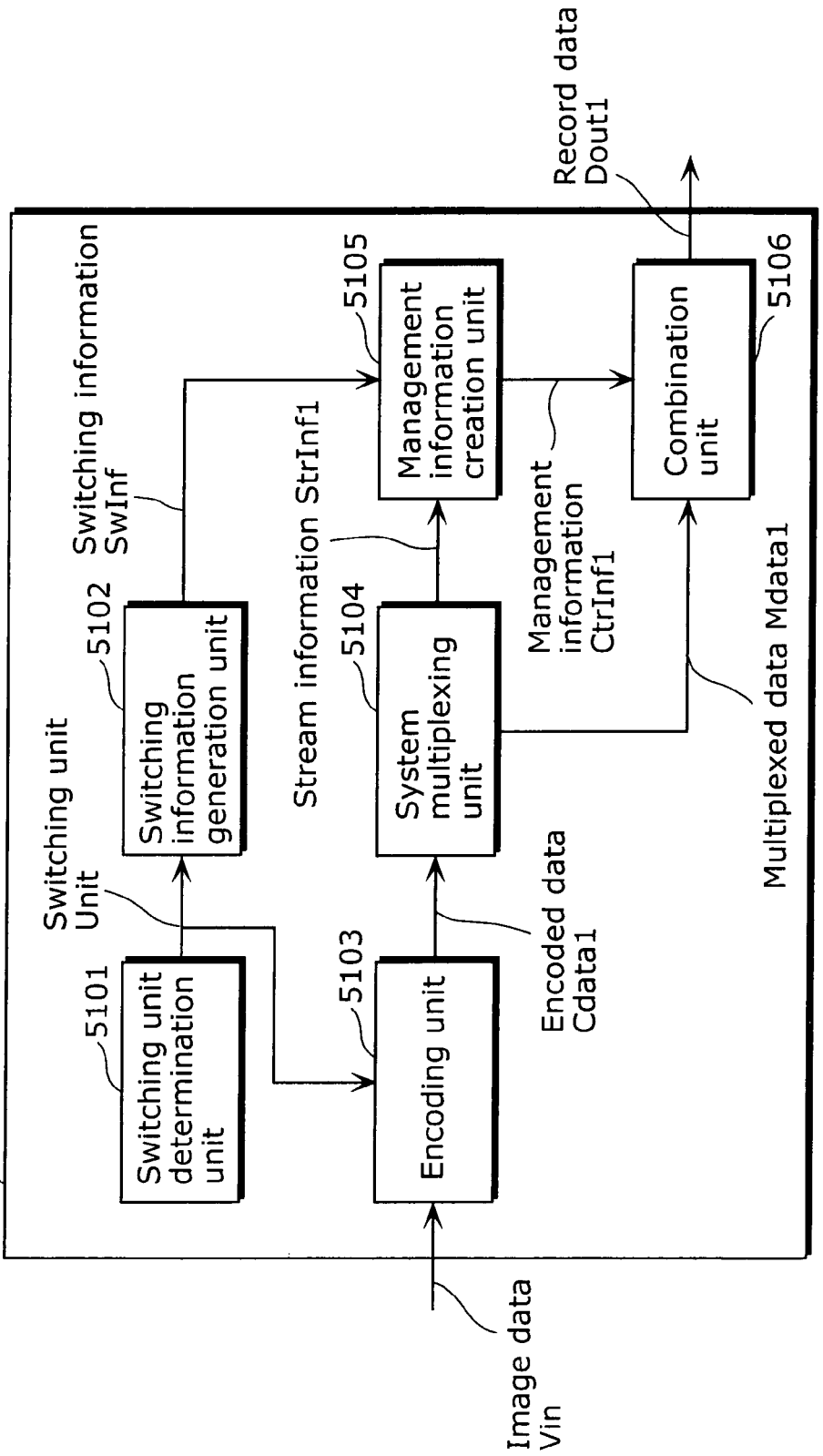
FIG. 10 is a block diagram showing a structure of a multiplexing apparatus.

FIG. 10 is a block diagram showing the structure of a multiplexing apparatus 5100 that realizes a multiplexing method according to the present embodiment. The multiplexing apparatus 5100 includes a switching unit determination unit 5101, a switching information generation unit 5102, an encoding unit 5103, a system multiplexing unit 5104, a management information creation unit 5105, and a combination unit 5016. The following describes operations performed by the respective units.

The switching unit determination unit 5101 determines a unit in which the variable-length encoding schemes can be switched, and inputs the determined switching unit to the switching information generation unit 5102 and the encoding unit 5103. The switching unit shall be determined in advance, but it may be designed to be set from outside. The switching information generation unit 5102 generates, based on the switching unit, switching information SwInf indicating a unit in which the variable-length encoding schemes can be switched, and inputs it to the management information creation unit 5105. The encoding unit 5103 encodes the data of each clip in a manner that the restriction on the switching unit is satisfied, and inputs the encoded data Cdata1 to the system multiplexing unit 5104. The system multiplexing unit 5104 system-multiplexes the encoded data Cdata1, inputs stream information StrInf1 to the management information creation unit 5105, and inputs the multiplexed data Mdata1 to the combination unit 5106. In a BD-ROM, a scheme for adding a 4-byte header to an MPEG-2 transport stream packet, known as a source packet, is used as a system multiplexing scheme. The stream information StrInf1 includes information for generating management information, such as a time map, of the multiplexed data Mdata1. The management information creation unit 5105 creates management information CtrInf1 that includes the time map which is generated based on the stream information StrInf1, as well as the switching information SwInf, or the like, and inputs the created management information to the combination unit 5106. The combination unit 5106 combines the management information CtrlInf1 and the multiplexed data Mdata1, and outputs the resultant data as record data Dout1.

The generation of encoded data, and the system multiplexing or the generation of management information are performed by separate apparatuses in the case of generating data by use of an authoring tool. Even in this case, however, the operations of the respective apparatuses may be designed to be the same as those of the respective units in the multiplexing apparatus 5100.

Figure 11:
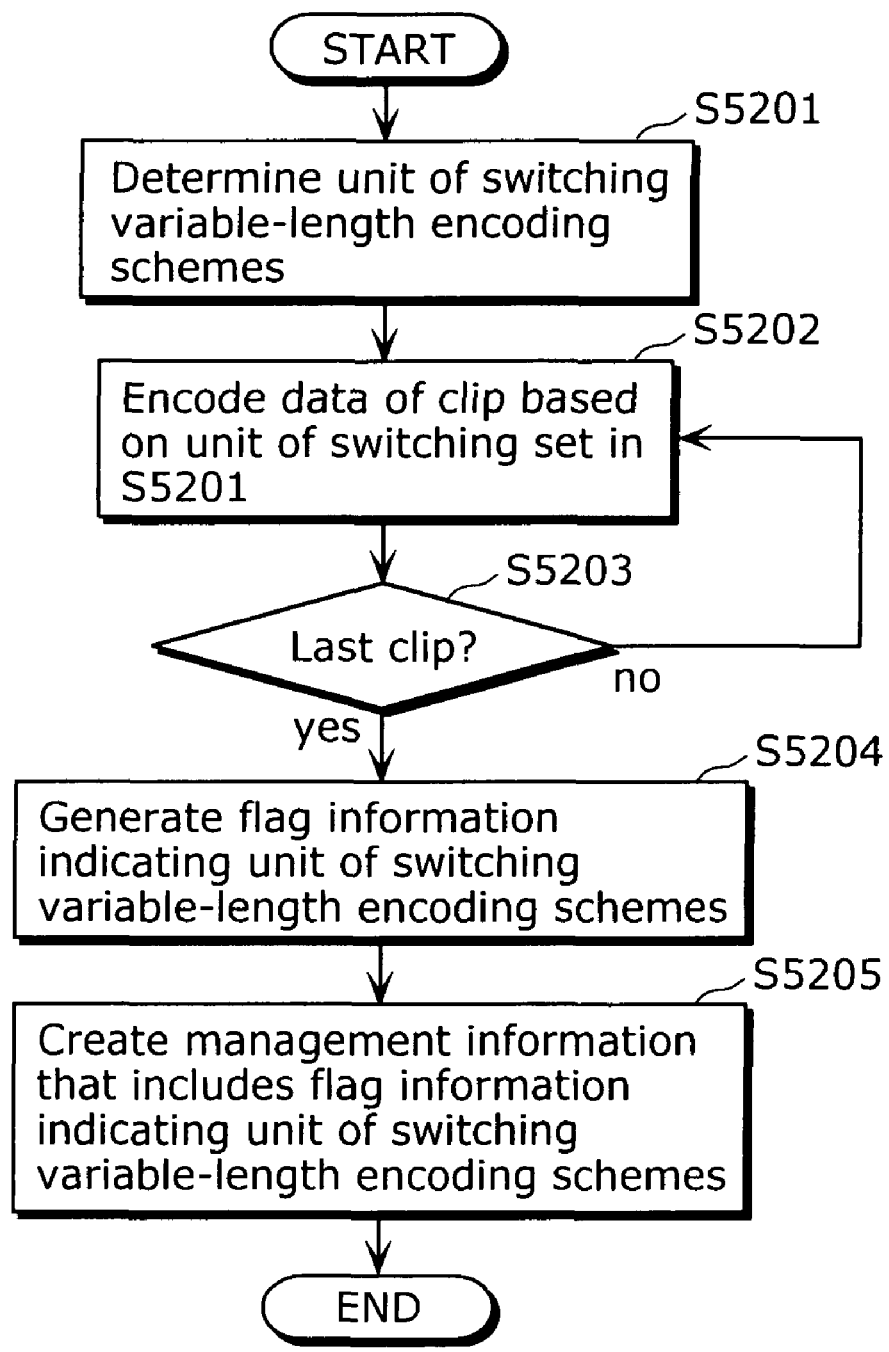
FIG. 11 is a flowchart illustrating operations performed by the multiplexing apparatus.

FIG. 11 is a flowchart illustrating operations performed in the multiplexing method for generating multiplexed data stored in the information storage medium of the present embodiment. The multiplexing method of the present embodiment is different from a conventional multiplexing method in that the present method includes: a step of determining a unit in which the variable-length encoding schemes can be switched (Step S5201); a step of encoding a clip based on the determined unit (Step S5202); and a step of generating flag information indicating the unit of switching between the variable-length encoding units (Step S5204).

First, in Step S5201, a unit in which the variable-length encoding schemes can be switched, is determined. More specifically, it is determined in which one of the following units the switching is possible: a continuous reproduction unit, a clip unit, and a random access unit. Next, in Step S5202, the data of a clip defined by MPEG-4 AVC is encoded based on the switching unit determined in Step S5201. In Step S5203, it is determined whether or not the encoding of the last clip has ended. In the case where the encoding of the last clip has ended, the process proceeds to Step S5204, whereas in the case where the encoding of the last clip has not ended, the process returns to Step S5202 to repeat the encoding of clips. In Step S5204, flag information is generated that indicates a unit of switching the variable-length encoding schemes, and the process proceeds to Step S5205. In Step S5205, management information including the flag information generated in Sep S5204 is created, and the management information and the data of the clips are multiplexed, and the resultant data is outputted.

Figure 12:
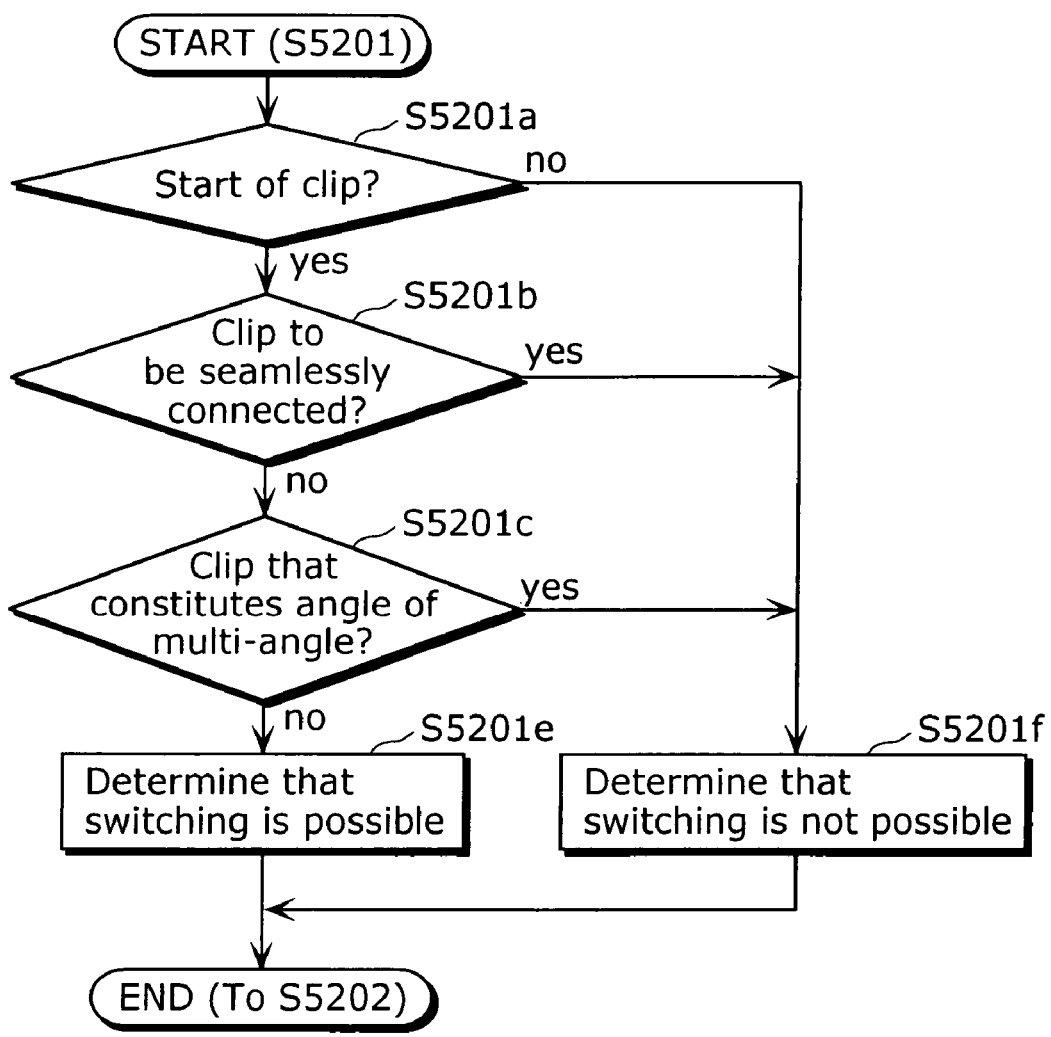
FIG. 12 is a flowchart illustrating a specific example of S5201 in FIG. 11.

FIG. 12 is a flowchart illustrating a specific example of the step of determining a unit in which the variable-length encoding schemes can be switched (Step S5201). This drawing assumes a clip shown in (c) and (d) in FIG. 7 is the smallest unit in which the variable-length encoding schemes can be switched. Here, a clip, which is stored on the storage medium as an AV data file, refers to, for example, one file which stores one MPEG-4 AVC stream or one VC-1 stream. In a transport stream, a clip refers to a stream identified by the identifier of a TS packet.

Referring to FIG. 12, the switching unit determination unit 5101 determines whether or not a current picture to be encoded is the start picture in a clip (S5201a). In the case where the current picture is not the start picture, that is, the current picture is a picture in the middle of the clip, the switching unit determination unit 5101 determines that it is not allowed to switch between the variable-length encoding schemes in encoding such clip (S5201*f*).

In the case where the current picture is the start picture, the switching unit determination unit 5101 determines whether or not the current clip that includes such start picture is to be seamlessly connected to the previous encoded clip (S5201*b*). In the case where the current clip is to be seamlessly connected, the switching unit determination unit 5101 determines that it is not allowed to switch between the variable-length encoding schemes in encoding the clip that includes the start picture (S5201*f*).

In the case where the current clip is not to be seamlessly connected, the switching unit determination unit 5101 determines whether or not the clip that includes the start picture is a clip corresponding to an angle that constitutes a multi-angle (S5201*c*). In the case where the clip corresponds to such angle, the switching unit determination unit 5101 determines that it is not allowed to switch between the variable-length encoding schemes among the angles constituting the multi-angle (S5201*f*). Here, in the case of seamless multi-angle which allows a seamless connection to each angle, a variable-length encoding scheme of each angle is determined to be the same scheme used for the previous clip in the multi-angle segments. Meanwhile, in the case of non-seamless multi-angle that does not guarantee a seamless connection to each angle, the variable-length encoding scheme of each angle may be different from the previous clip in the multi-angle segments as long as the same variable-length encoding scheme is used among the angles.

Furthermore, in the case where the current picture to be encoded is the start picture in a clip and none of the determinations in S5101*b* to S5101*c* applies (in the case where the determination is "no"), the switching unit determination unit 5101 determines that the variable-length encoding scheme of the clip that includes the start picture can be switched from that of the previous encoded clip (S5201*e*).

As described above, in the flowchart of FIG. 12, clips that are determined by the switching unit determination unit 5101 as clips for which switching is not allowed include: (a) a clip identified by the packet identifier of a transport stream; (b) plural clips to be seamlessly connected; (c) plural clips corresponding to the respective angles making up a multi-angle. Note that the determination in S5201*a* to S5201*c* may be made in any orders. Note that in the case of multi-angle too, switching between the variable-length encoding schemes may be prohibited only in the case of seamless multi-angle. Also note that a clip may be identified by information such as a file name, other than a packet identifier. Also, although FIG. 12 has been described for the case where the smallest unit in which the variable-length encoding schemes can be switched is a clip shown in (c) and (d) in FIG. 7, a RAU shown in (e) in FIG. 7 may also be used as the smallest unit. In such case, the processes have to be performed simply by reading the term "clip" as "RAU" in the drawing.

Figure 13:
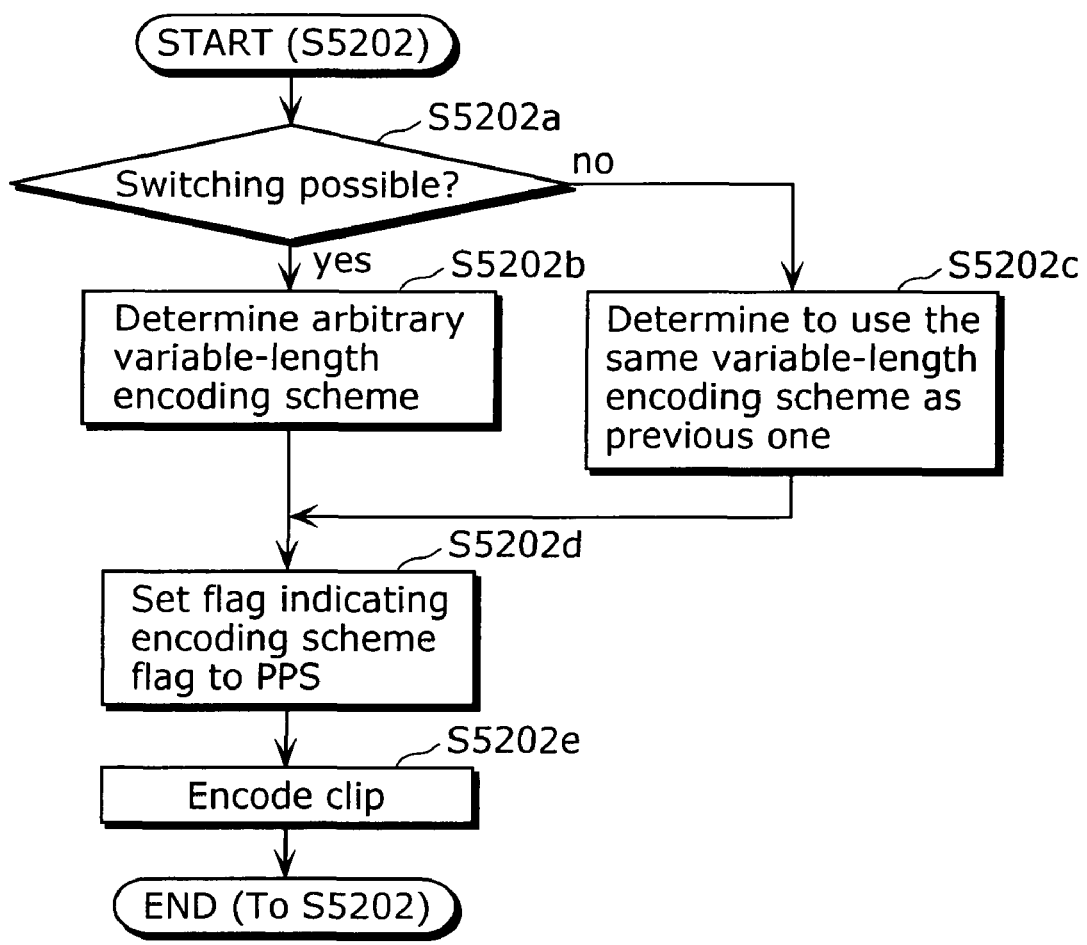
FIG. 13 is a flowchart illustrating a specific example of S5202 in FIG. 11.

FIG. 13 is a flowchart illustrating a specific example of the step of encoding a clip (S5202) shown in FIG. 11. FIG. 13 shows the case of performing encoding in compliant with MPEG-4 AVC. Referring to this drawing, the encoding unit 5103 determines, prior to starting the encoding of a clip, whether or not the switching of the variable-length encoding schemes is possible for such clip (S5202*a*). This determination is made in accordance with the determinations shown in FIG. 12. In the case of determining that the switching is possible, the encoding unit 5103 arbitrarily determines a variable-length encoding scheme for such clip (S5202*b*), whereas in the case of determining that the switching is not possible, the encoding unit 5103 determines, as a variable-length encoding scheme for such clip, a variable-length encoding scheme that is the same as that for the previous clip to be seamlessly connected with each other or that for another clip that constitutes the same multi-angle (S5202*c*). Furthermore, the encoding unit 5103 sets, to a picture parameter set PPS, a flag indicating such determined variable-length encoding scheme (S5202*d*), and encodes the clip in accordance with the determined variable-length encoding scheme (S5202*e*). Such flag is referred to as entropy_coding_mode_flag in MPEG-4 AVC.

As described above, the encoding unit 5103 generates encoded data Cdata1 by encoding a moving image without switching variable-length encoding schemes for clips within a continuous unit for which it is determined that the switching of variable-length encoding schemes is not possible.

Figure 14:
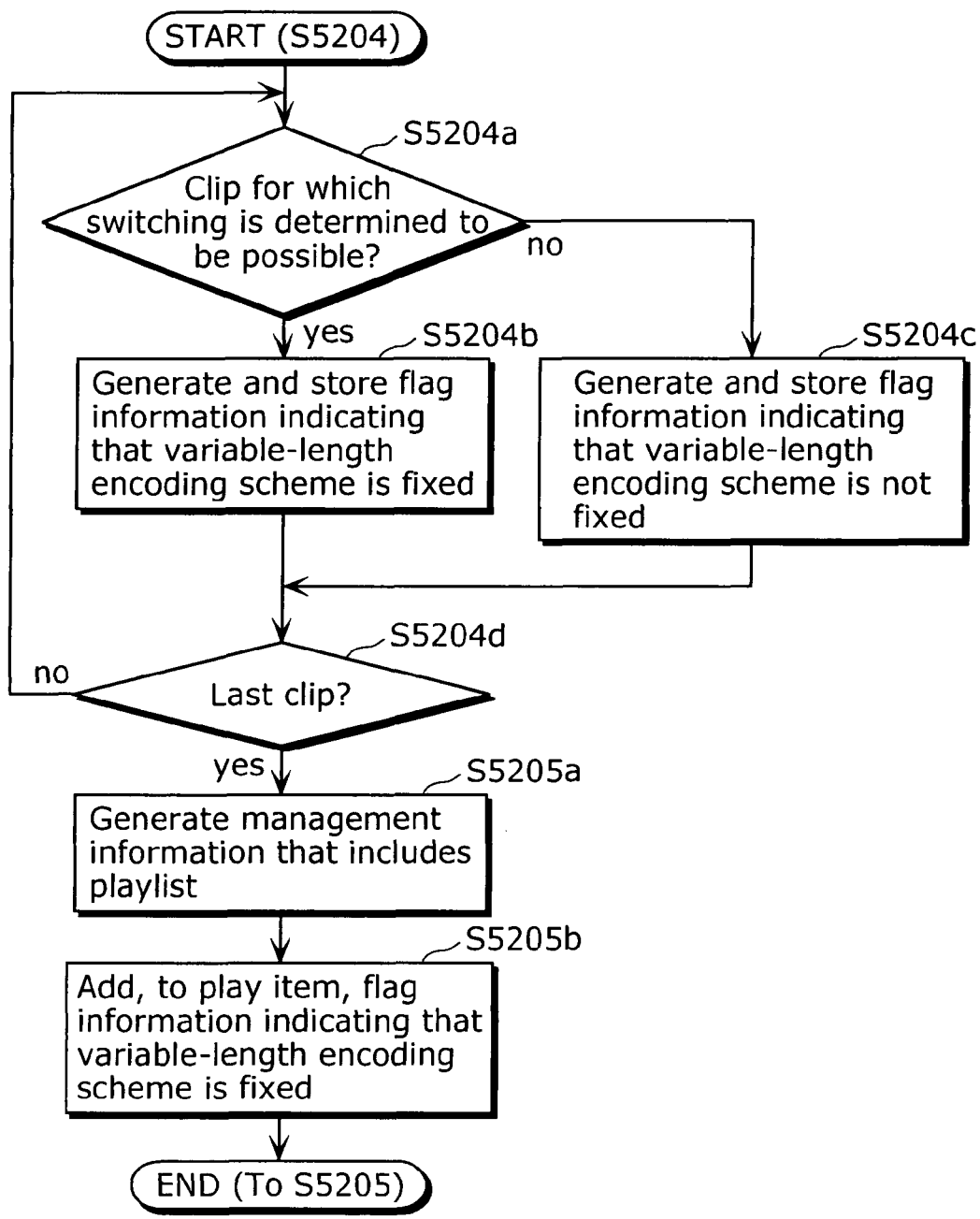
FIG. 14 is a flowchart illustrating another specific example of S5203 in FIG. 11.

FIG. 14 is a flowchart illustrating a specific example of the step of generating flag information (S5204) and the step of generating management information (S5205) shown in FIG. 11.

Referring to the drawing, the switching information generation unit 5102 determines whether or not a clip encoded by the encoding unit 5103 is a clip for which it is determined that the switching of variable-length encoding schemes is possible (S5204*a*). In the case where the clip is a clip for which the switching is determined to be possible, the switching information generation unit 5102 generates flag information indicating that the variable-length encoding scheme is fixed, and stores the flag information into a work area in memory in a manner that the flag information is associated with the clip (S5204*b*). In the case where the clip is not a clip for which the switching is determined to be possible, the switching information generation unit 5102 generates flag information indicating that the variable-length encoding scheme is not fixed, and stores the flag information into a work area in memory in a manner that the flag information is associated with the clip (S5204*b*). Furthermore, the switching information generation unit 5102 determines whether or not such clip is the last clip encoded by the encoding unit 5103 (S5204*d*). In the case where the clip is not the last clip, the switching information generation unit 5102 repeats S5204*a* to S5204*c* described above, whereas in the case where the clip is the last clip, the switching information generation unit 5102 outputs the flag information stored in the work area in memory to the management information creation unit 5105 as the switching information SwInf.

Furthermore, the management information creation unit 5105 creates management information including a playlist (S5205*a*), and adds, to a play item included in the playlist, the flag information indicating that the variable-length encoding scheme is fixed, with reference to the switching information SwInf (S5205*b*). Note that the flag information may indicate that the variable-length encoding scheme is the same as the one used for reproduction segments specified by the previous play item. Here, the playlist indicates the order in which one or more play items are reproduced. A play item is information which refers to a clip to be reproduced and which represents the whole or a part of the reproduction segments in one clip. Also note that another parameter added to a play item may also serve as the flag information. In this case, for example, a parameter meaning that clips are seamlessly connected (e.g., "connection_condition=5") may also serve as the flag information. This is possible since a continuous unit (a unit in which a variable-length encoding scheme is fixed) determined in FIG. 12 that the switching is not possible (a unit in which variable-length encoding scheme is fixed) include (a) a clip identified by the packet identifier of a transport stream; (b) plural clips to be seamlessly connected; (c) plural clips corresponding to the respective angles making up a multi-angle, of which (c) is set on the assumption that seamless connection is possible. Furthermore, since a flag known as "is_multi_angle" indicates whether or not it corresponds to multi-angle segments, such flag may also serve as a flag indicating that a variable-length encoding scheme is fixed. With such structure, it is possible to reduce the amount of data of the management information.

Figure 15:
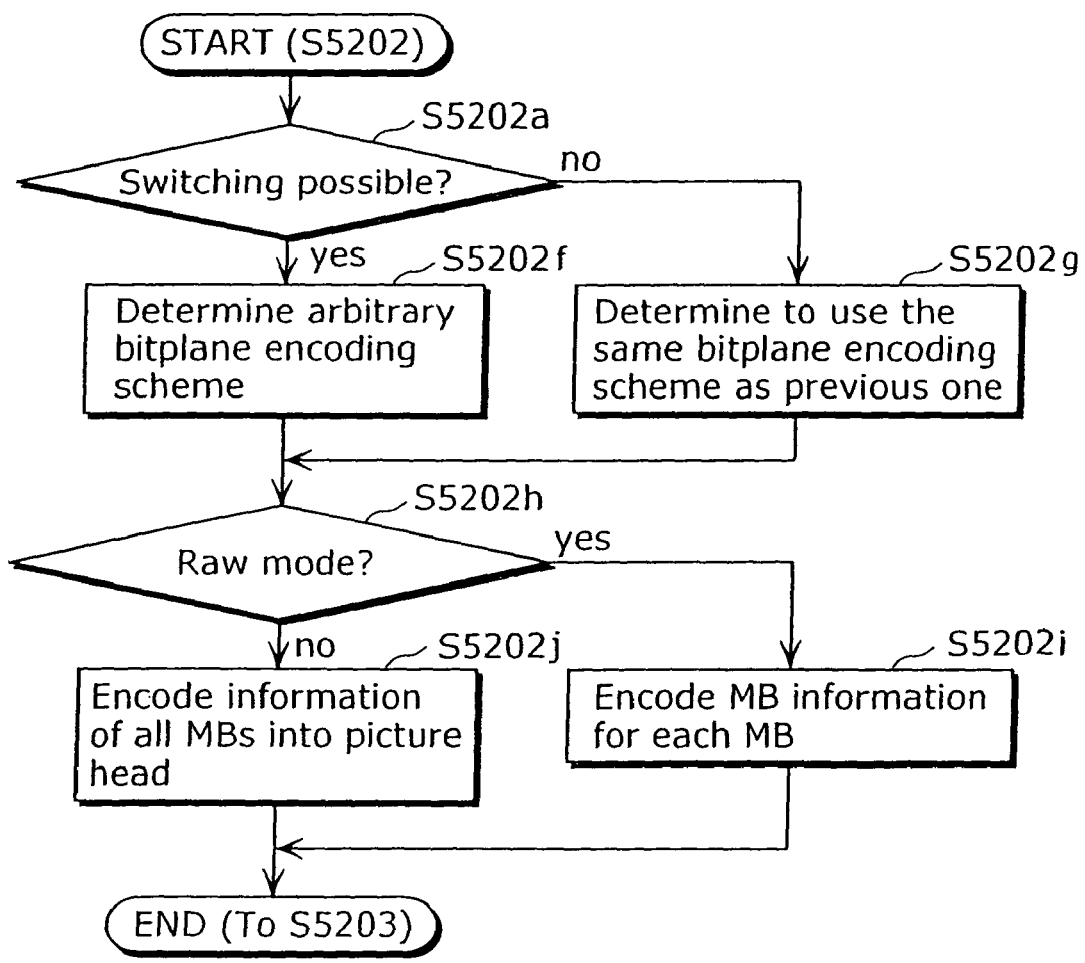
FIG. 15 is a flowchart illustrating another specific example of S5204 in FIG. 11.

FIG. 15 is a flowchart illustrating another specific example of the step of encoding a clip (S5202) shown in FIG. 11. FIG. 15 shows the case of performing encoding compliant with VC-1. Referring to this drawing, the encoding unit 5103 determines, prior to starting the encoding of a clip, whether or not the switching of variable-length encoding schemes for such clip is possible between RAW MODE and another mode (S5202*a*). This determination is made in accordance with the determinations shown in FIG. 12. In the case of determining that the switching is possible, the encoding unit 5103 arbitrarily determines a bitplane encoding scheme for such clip (S5202*f*), whereas in the case of determining that the switching is not possible, the encoding unit 5103 determines, as a bitplane encoding scheme for such clip, a bitplane encoding scheme that is the same as that of the previous clip (S5202*g*). Furthermore, the encoding unit 5103 determines whether or not the determined bitplane encoding scheme is RAW MODE or another scheme (S5202*h*). The encoding unit 5103 adds information indicating a mode on a picture-by-picture basis. In the case of determining that the mode is RAW MODE, the encoding unit 5103 encodes predetermined information of each of the macroblocks MB into each of such macroblock (S5202*i*), whereas in the case of determining that the mode is not RAW MODE, the encoding unit 5103 sets predetermined information of each of the macroblocks MB collectively at the head of a picture and encodes the clip (S5202*j*). Note that the above-described information indicating a mode is indicated in the field known as IMODE.

As described above, the encoding unit 5103 generates encoded data Cdata1 by encoding a moving image without switching bitplane encoding schemes for clips within a continuous unit for which it is determined that the switching of bitplane encoding schemes is not possible.

It should be noted that the above-described playlist is not limited for use on an optical disc, and thus the playlist may also be used in the following manner: when receiving a stream over a network, the playlist is first received for analysis, and the reception of a stream is actually started after determining which stream to receive. Also in the case of transmitting a stream over an Internet Protocol (IP) network after packetizing it into Real-time Transport Protocol (RTP) packets or TS packets, whether a variable-length encoding scheme is fixed in reproduction segments may be indicated by using, for example, a Session Description Protocol (SDP) as reproduction control information.

The following describes the data structure of a BD-ROM disc which stores data generated by the image encoding method according to the present embodiment as well as the structure of a player that reproduces such disc.

<Logical Data Structure on Disc>

Figure 16:
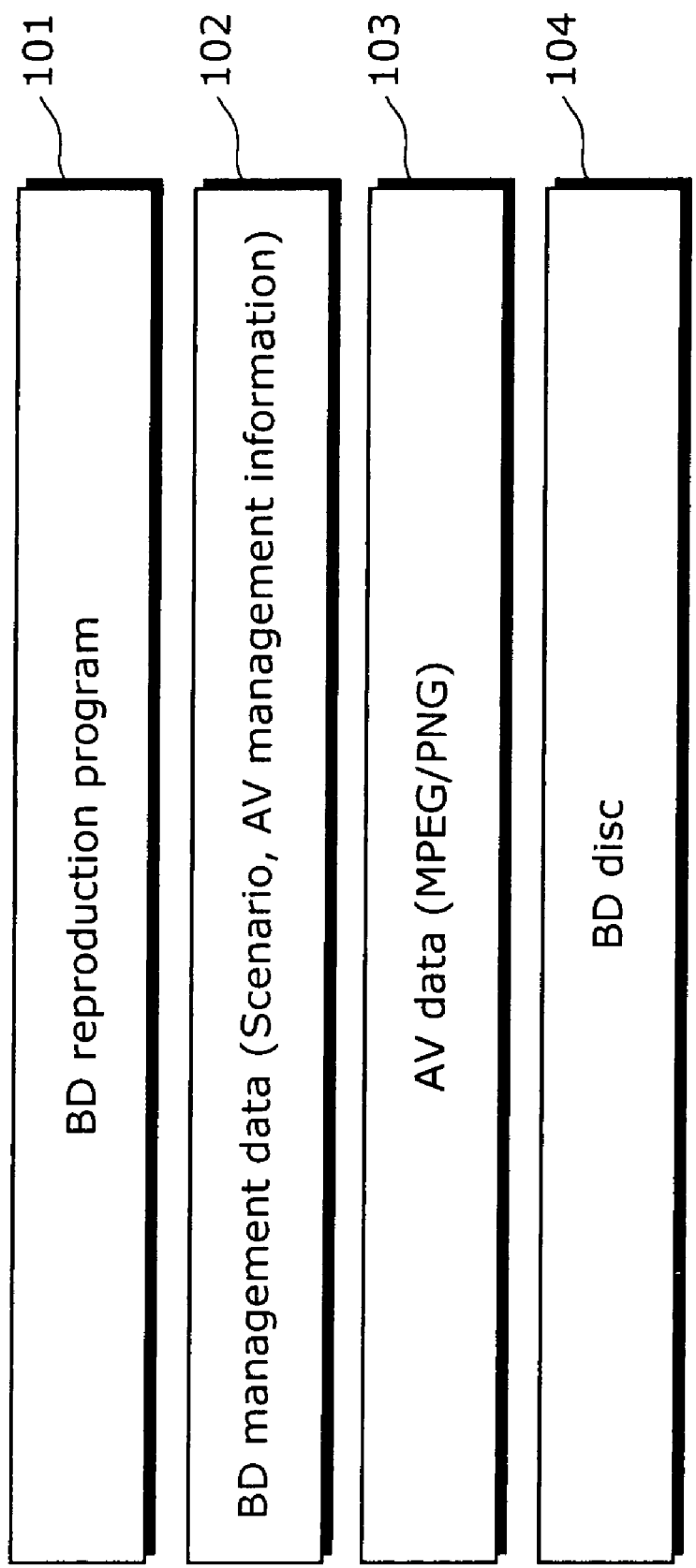
FIG. 16 is a hierarchy chart showing data on an HD-DVD.

FIG. 16 is a diagram showing the structure of a BD-ROM, and more particularly showing a BD disc (104) being a disc medium, as well as the structure of data (101, 102, and 103) stored on the disc. Stored on the BD disc (104) are: AV data (103); BD management information (102) including AV data management information, an AV reproduction sequence, and the like; and a BD reproduction program (101) for realizing interactivity. For the sake of illustrations, the present embodiment describes the BD disc by focusing on an AV application for reproducing the AV contents of a movie, but the same is applied to the case where the BD disc is used for other purposes.

Figure 17:
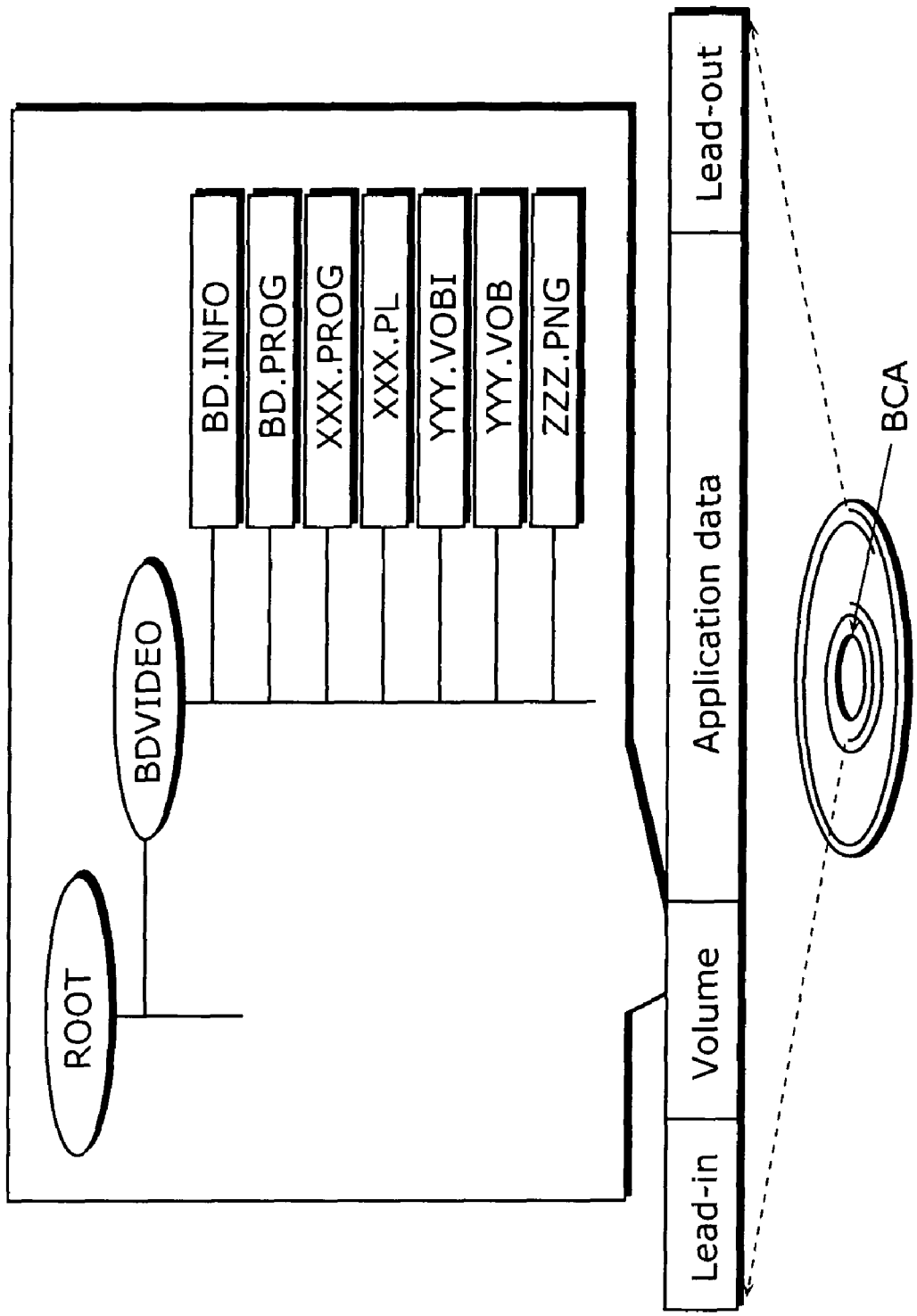
FIG. 17 is a diagram showing a structure of a logical space on the HD-DVD.

FIG. 17 is a diagram showing the structures of directories and files of the logical data stored on the above-described BD disc. As in the case of other optical discs such as DVDs and CDs, the BD disc has storage areas that are spirally formed in a direction from the inner radius toward the outer radius, as well as a logical address space for storing logical data in between the lead-in area at the inner radius and the lead-out area at the outer radius. At the innermost area of the lead-in area, there is a special area called a Burst Cutting Area (BCA), from which data can be read out only by a drive. Since this area cannot be read by the application, it is sometimes used, for example, for copyright protection technology or the like.

In the logical address space, file system information (volume) is stored at the top of the space, and application data such as video data is stored in the subsequent areas. The file system, which is a file system compliant with UDF and ISO9660 as described in "Background Art", is a system for reading the stored logical data using directory and file structures, as is done in ordinary PCs.

According to the structures of the directories and files on the BD disc of the present embodiment, a BDVIDEO directory is located immediately below the root directory (ROOT). This directory is a directory storing data such as AV contents and management information (101, 102, and 103 shown in FIG. 16) stored on the BD.

Seven types of files described below are stored under the BDVIDEO directory.

BD. INFO file (this filename is fixed)

This file forms a part of the "BD management information", and stores information related to the entire BD disc. This is the first file to be read out by a BD player.

BD. PROG (this filename is fixed)

This file forms a part of the "BD reproduction program", and stores reproduction control information related to the entire BD disc.

XXX. PL (where "XXX" is variable, and the extension "PL" is fixed)

This file forms a part of the "BD management information", and stores playlist information being a scenario (reproduction sequence). There exists one file for each playlist.

XXX. PROG (where "XXX" is variable, and the extension "PL" is fixed)

This file forms a part of the "BD reproduction program", and stores reproduction control information for each playlist as described above. The corresponding playlist is identified by a file body name (identified by a matching "XXX").

YYY. VOB (where "YYY" is variable, and the extension "VOB" is fixed)

This file forms a part of the "AV data", and stores a VOB (such a VOB as described in "Background Art"). There exists one file for each VOB.

YYY. VOBI (where "YYY" is variable, and the extension "VOBI" is fixed)

This file forms a part of the "BD management information", and stores stream management information related to a VOB being AV data. The corresponding VOB is identified by the file body name (identified by the matching "YYY").

ZZZ. PNG (where "ZZZ" is variable, and the extension "PNG" is fixed)

This file forms a part of the "AV data", and stores image data PNG (which is an image format standardized by W3C, and is pronounced "ping") for constructing subtitles and a menu. There exists one file for each PNG image.

<Structure of Player>

Figure 18:
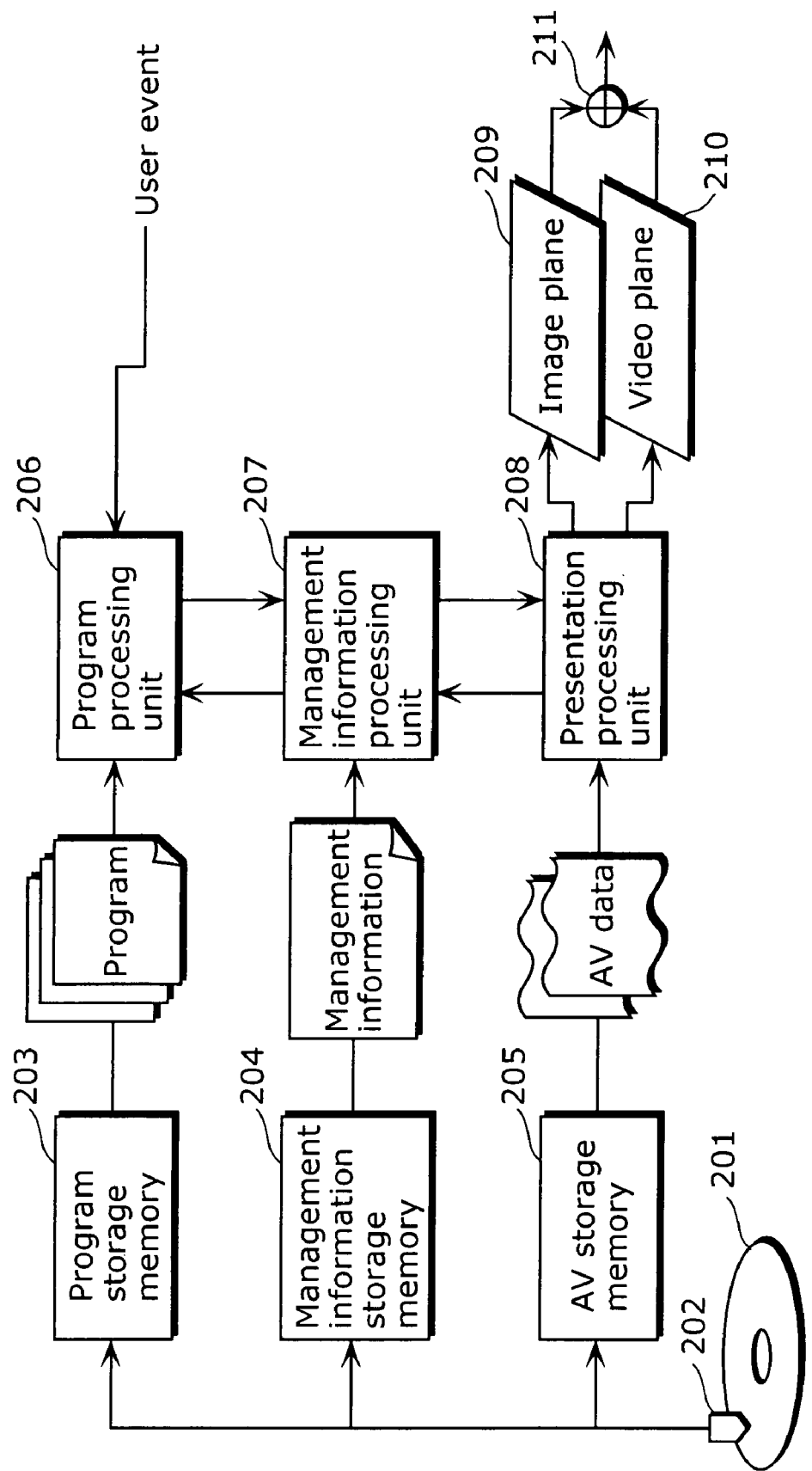
FIG. 18 is a block diagram showing an overview of an HD-DVD player.
Figure 19:
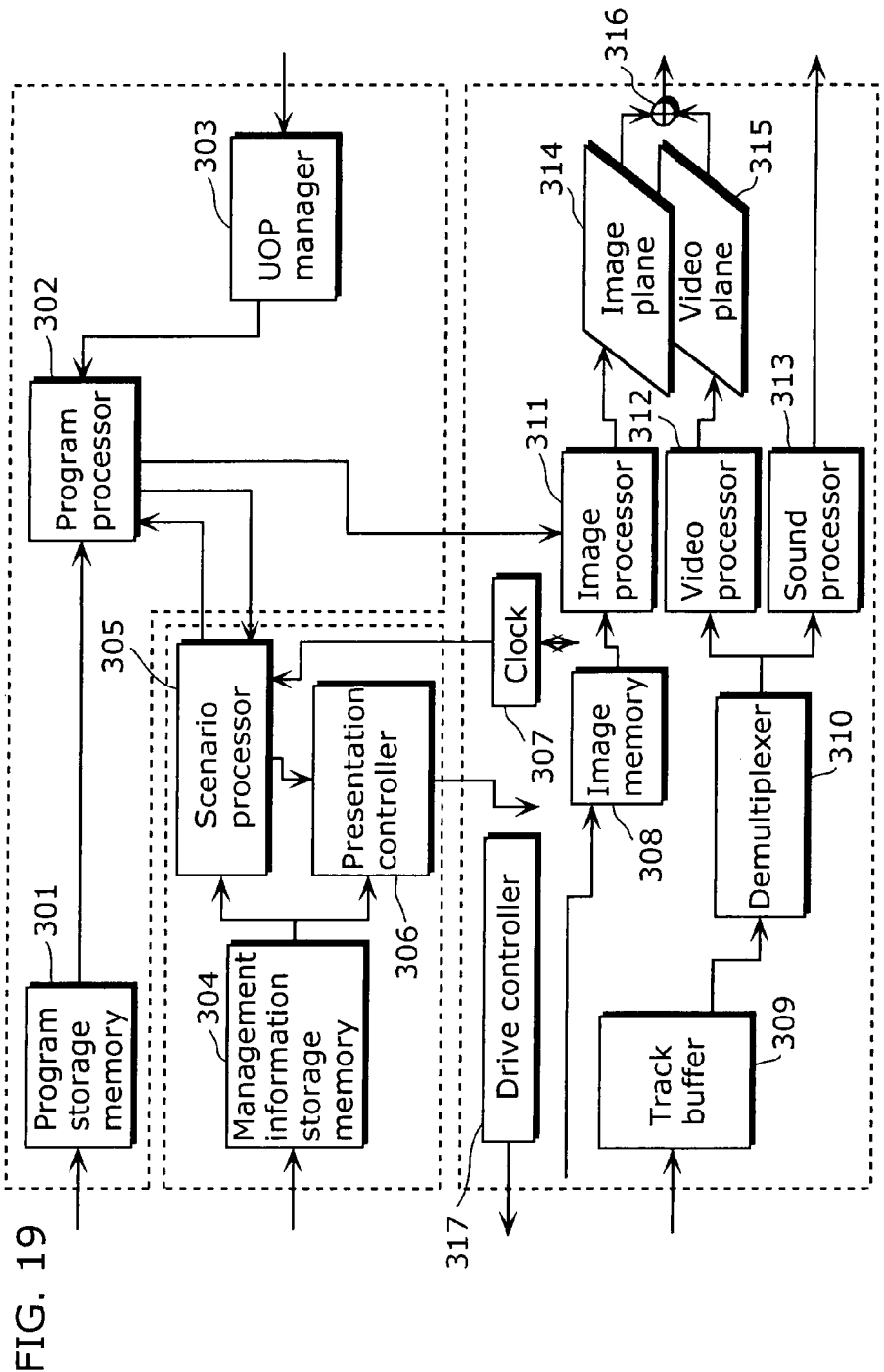
FIG. 19 is a block diagram showing a structure of the HD-DVD player.

Next, referring to FIG. 18 and FIG. 19, a description is given of a player that reproduces the above-descried BD disc.

FIG. 18 is a block diagram showing an overall function of the player.

Data stored on a BD disc (201) is read out via an optical pick-up (202). Each data read out is transferred to a dedicated memory, which depends on the type of such data. The BD reproduction program (the file contents of "BD.PROG" or "XXX.PROG"), is transferred to the program storage memory (203), the BD management information ("BD.INFO", "XXX.PL" or "YYY.VOBI") is transferred to the management information storage memory (204), and the AV data ("YYY.VOB" or "ZZZ.PNG") is transferred to the AV storage memory (205), respectively.

The BD reproduction program stored in the program storage memory (203) is processed by the program processing unit (206), the BD management information stored in the management information storage memory (204) is processed by the management information processing unit (207), and the AV data stored in the AV storage memory (205) is processed by the presentation processing unit (208), respectively.

The program processing unit (206) receives, from the management information processing unit (207), information about a playlist to be reproduced and event information such as timing for executing a program, and then executes the program. In the program, it is possible to dynamically change the playlist by sending, to the management information processing unit (207), an instruction to reproduce a playlist. The program processing unit (206) receives an event from the user, i.e., a request from a remote control key, and executes a program corresponding to the user event, if there is any.

The management information processing unit (207), in response to an instruction from the program processing unit (206), analyzes the corresponding playlist and management information of a VOB corresponding to the playlist, and instructs the presentation processing unit (208) to reproduce the target AV data. Furthermore, the management information processing unit (207) receives reference time information from the presentation processing unit (208), and instructs the presentation processing unit (208) to end the reproduction of the AV data based on such time information, as well as generating an event, for the program processing unit (206), indicating the timing for executing the program.

The presentation processing unit (208), which has decoders corresponding respectively to video, audio, and subtitles/images (still images), decodes and outputs the AV data according to an instruction from the management information processing unit (207). In the case of video data, and subtitles/images, they are rendered onto the respective dedicated planes, that is, the video plane (210) and image plane (209) after being decoded and composed by a composition processing unit (211), and the composed images are outputted to a display device such as a television.

The BD player, as is shown in FIG. 18, has a device structure which is based on the respective structures of the data stored on the BD disc shown in FIG. 16.

FIG. 19 is a block diagram showing a detailed structure of the above-described player. In FIG. 19, the AV storage memory (205) corresponds to an image memory (308) and a track buffer (309), the program processing unit (206) corresponds to a program processor (302) and an UOP manager (303), the management information processing unit (207) corresponds to a scenario processor (305) and a presentation controller (306), and the presentation processing unit (208) corresponds to a clock (307), a demultiplexer (310), an image processor (311), a video processor (312) and a sound processor (313), respectively.

The VOB data (MPEG stream) and image data (PNG) read from the BD disc (201) are stored respectively into the track buffer (309) and the image memory (308). The demultiplexer (310) demultiplexes the VOB data stored in the track buffer (309) based on the time indicated by the clock (307), and sends the video data to the video processor (312) and the audio data to the sound processor (313), respectively. The video processor (312) and the sound processor (313) are each made up of a decoder buffer and a decoder, as specified by the MPEG system standard. In other words, the video data and audio data inputted from the demultiplexer (310) are temporarily stored in the respective decoder buffers and decoded by the respective corresponding decoders according to the clock (307).

The PNG stored in the image memory (308) is processed using two methods described below.

First, in the case where the image data is subtitle data, the presentation controller (306) gives an instruction about decoding timing. Upon receipt of time information from the clock (307), the scenario processor (305) instructs, when it is the time to display the subtitles (when it is the time to start/end the display), the presentation controller (306) to display or not to display the subtitles so that the subtitles are displayed in an appropriate manner. The image processor (311), upon receipt of an instruction from the presentation controller (306) to decode/display the image data, reads out the corresponding PNG data from the image memory (308), decodes it, and renders the decoded data onto the image plane (314).

Second, in the case where the image data is menu data, the program processor (302) gives an instruction about decoding timing. Timing at which the program processor (302) gives an instruction to decode the image data all depends on BD program processed by the program processor (302), and therefore it is not simply determined.

As has been described with reference to FIG. 18, the image data and video data are outputted respectively onto the image plane (314) and the video plane (315) after being decoded, and are outputted after being composed by the composition processing unit (316).

While the management information (scenario information and AV management information) read from the BD disc (201) is stored into the management information storage memory (304), the scenario information ("BD. INFO" and "XXX. PL") is read out and processed by the scenario processor 305. Furthermore, the AV management information ("YYY. VOBI") is read out and processed by the presentation controller (306).

The scenario processor (305) analyzes the information in the playlist, and notifies the presentation controller (306) of a VOB referred to by the corresponding playlist and the reproduction position of such VOB. The presentation controller (306) analyzes the management information ("YYY.VOBI") of such target VOB, and instructs the drive controller (317) to read out the target VOB.

According to the instruction from the presentation controller (306), the drive controller (317) reads out the target AV data by moving the optical pick-up. The AV data read out is stored into the image memory (308) or the track buffer (309), as described above.

The scenario processor (305) monitors the time indicated by the clock (307), and outputs, to the program processor (302), an event at the timing set in the management information.

The BD program ("BD. PROG" or "XXX. PROG") stored on the program storage memory (301) is executed by the program processor (302). The program processor (302) processes the BD program in the case where an event is sent from the scenario processor (305) or where an event is sent from the UOP manager (303). The UOP manager (303) generates an event for the program processor (302) in the case where a request is sent from the user using a remote control key.

<Application Space>

Figure 20:
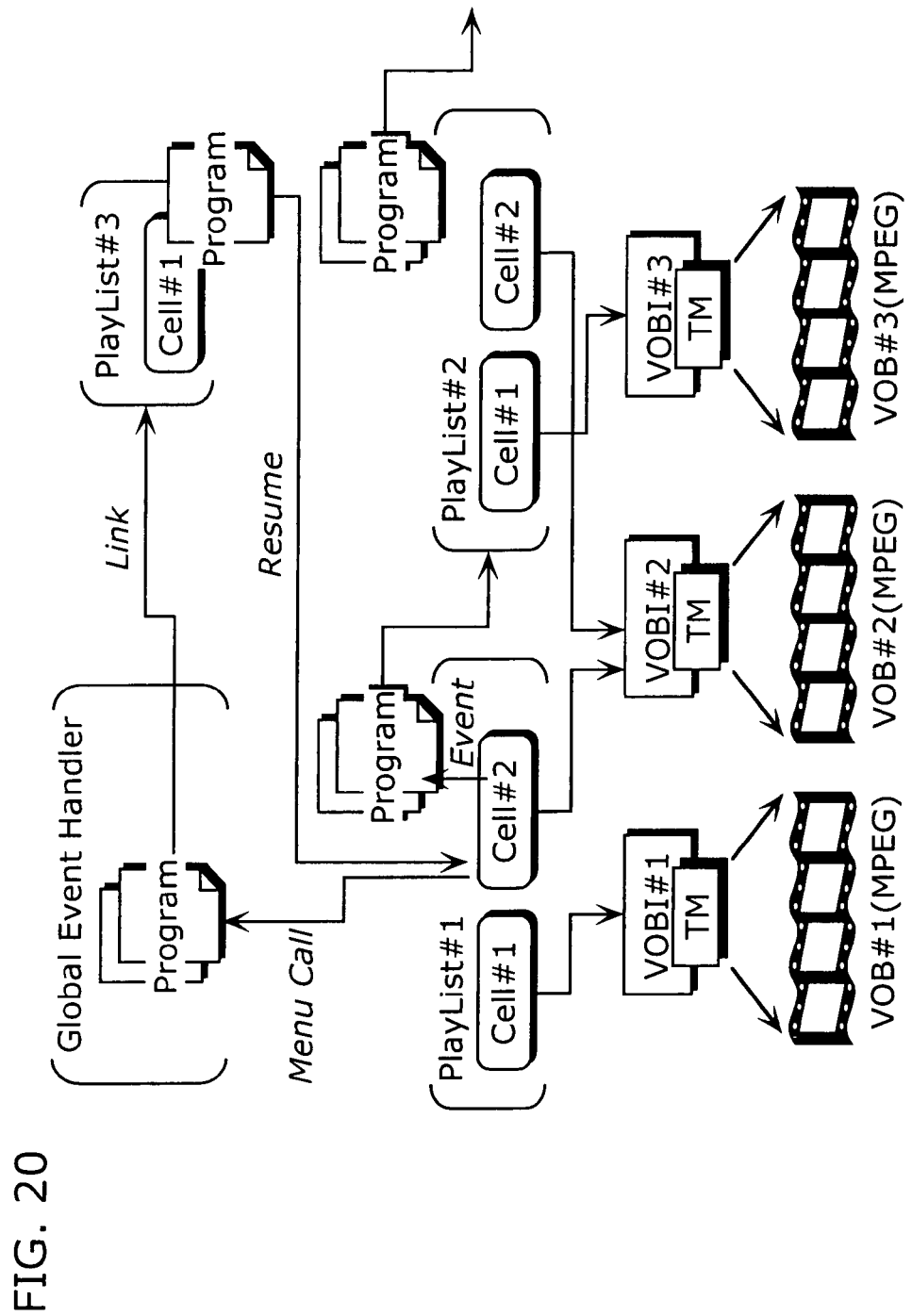
FIG. 20 is a diagram for describing an application space on the HD-DVD.

FIG. 20 is a diagram showing an application space on the BD.

In the application space on the BD, a playlist (PlayList) serves as a unit of reproduction. Each playlist, which is a concatenation of cells (Cell), includes a static scenario being a reproduction sequence determined by the order of cell concatenation and a dynamic scenario described by the program. Unless the program makes a dynamic change in a scenario, the cells in the playlist are reproduced in order of concatenation, and the completion of the reproduction of all the cells marks the completion of the reproduction of such playlist. Furthermore, the program can change reproduction targets when reproduction and description is carried out beyond the playlist, as well as depending on user selection or player status. A typical example of this is menu. In the BD, a menu can be defined as a scenario to be reproduced according to a user selection, and the playlist can be dynamically selected by the program.

The program here refers to an event handler that is executed by a time event or a user event.

Time events are events that are generated based on time information embedded in a playlist. An example of time events is an event sent from the scenario processor (305) to the program processor (302), which has been described with reference to FIG. 19. When a time event is issued, the program processor (302) executes an event handler associated with the corresponding ID. As has been described above, it is possible, for a program to be executed, to give an instruction to reproduce another playlist. In this case, the program stops the reproduction of the current playlist to reproduce another playlist.

User events are events that are generated by remote key operations by the user, and are categorized roughly into two types. User events of a first type are menu selection events that are generated by operating cursor keys (the Up/Down/Right/Left key or the "Determination" key). Event handlers corresponding to menu selection events are effective only during a limited period indicated in a playlist (the validity period of each event handler is set as one of the information in the playlist). When the Up/Down/Right/Left key or the "Determination" key on the remote control is pressed, a search is made for an effective event handler. In the case where there is an effective event handler, such event handler is executed, whereas in the case where there is no effective event handler, this menu selection event is ignored.

User events of a second type are menu call events that are generated by operating the "Menu" key. When a menu call event is generated, a global event handler is called. The global event handler is an event handler that is always effective without depending on any playlists. Using this function, it is possible to implement a DVD menu call (e.g., a function of calling audio (data) or a subtitle menu during the reproduction of a title, and resuming the reproduction of the title at the point of suspension after a change is made in the audio (data) or subtitle (data)).

A cell (Cell), which is a unit constituting a static scenario in a playlist, represents the whole or a part of reproduction segments in a VOB (MPEG stream). Each cell includes the reproduction segments in a VOB as information about reproduction start time and reproduction end time. VOB management information (VOBI), which is paired with an individual VOB, includes a time map (TimeMap or TMAP), which is table information indicating storage addresses corresponding to data reproduction times. The use of a time map makes it possible to derive the read-start address and the read-end address within a VOB (i.e., the target "YYY. VOB") based on the above-described reproduction start time and reproduction end time of the VOB. Time map is described in detail later.

<Details about VOB>

Figure 21:
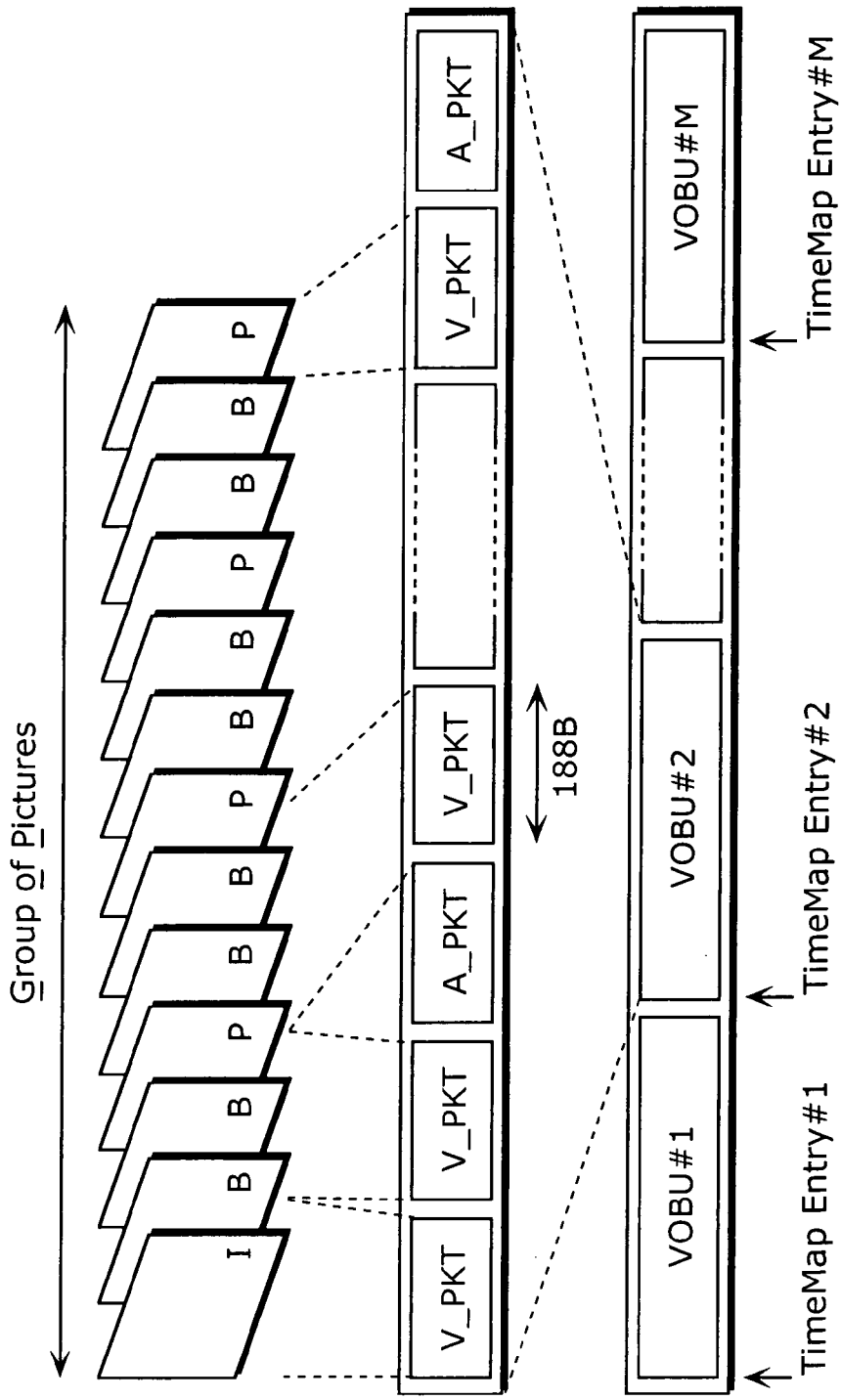
FIG. 21 is a diagram showing a structure of an MPEG stream (VOB).

FIG. 21 is a diagram showing the structure of an MPEG stream (VOB) used in the present embodiment.

As shown in FIG. 21, a VOB is made up of plural Video Object Units (VOBUs). A VOBU serves as one unit of reproduction in a multiplexed stream that additionally includes audio data in a Group of Pictures (GOP) in an MPEG video stream. The reproduction duration of a VOBU is 1.0 seconds or less, and normally about 0.5 seconds.

The TS packet (MPEG-2 Transport Stream Packet) at the head of a VOBU stores a sequence header, which is followed by a GOP header and an I picture (Intra-coded), so that decoding can be started from this I picture. Furthermore, managed in the time map are: the address of a TS packet that includes the head part of the first I picture in the VOBU (start address); the address of a TS packet that includes the last part of the I picture, starting with the start address (end address); and the reproduction start time of this I picture (PTS). Thus, an entry of the time map is provided for each TS packet at the head of a VOBU.

Each VOBU includes video packets (V_PTK) and audio packets (A_PTK). Each packet is 188 bytes. While not illustrated in FIG. 21, an Arrival Time Stamp (ATS) is provided immediately before each TS packet. The ATS indicates a relative time at which such TS packet is provided to the decoder.

An ATS is assigned for each TS packet because the system rate of this TS stream is not a fixed rate but a variable rate. In general, in the case where a fixed system rate is used, a dummy TS packet called a NULL packet is inserted. However, a variable rate is suitable in order to store high-quality images in a limited storage capacity, and a TS stream with an ATS is stored on the BD.

Figure 22:
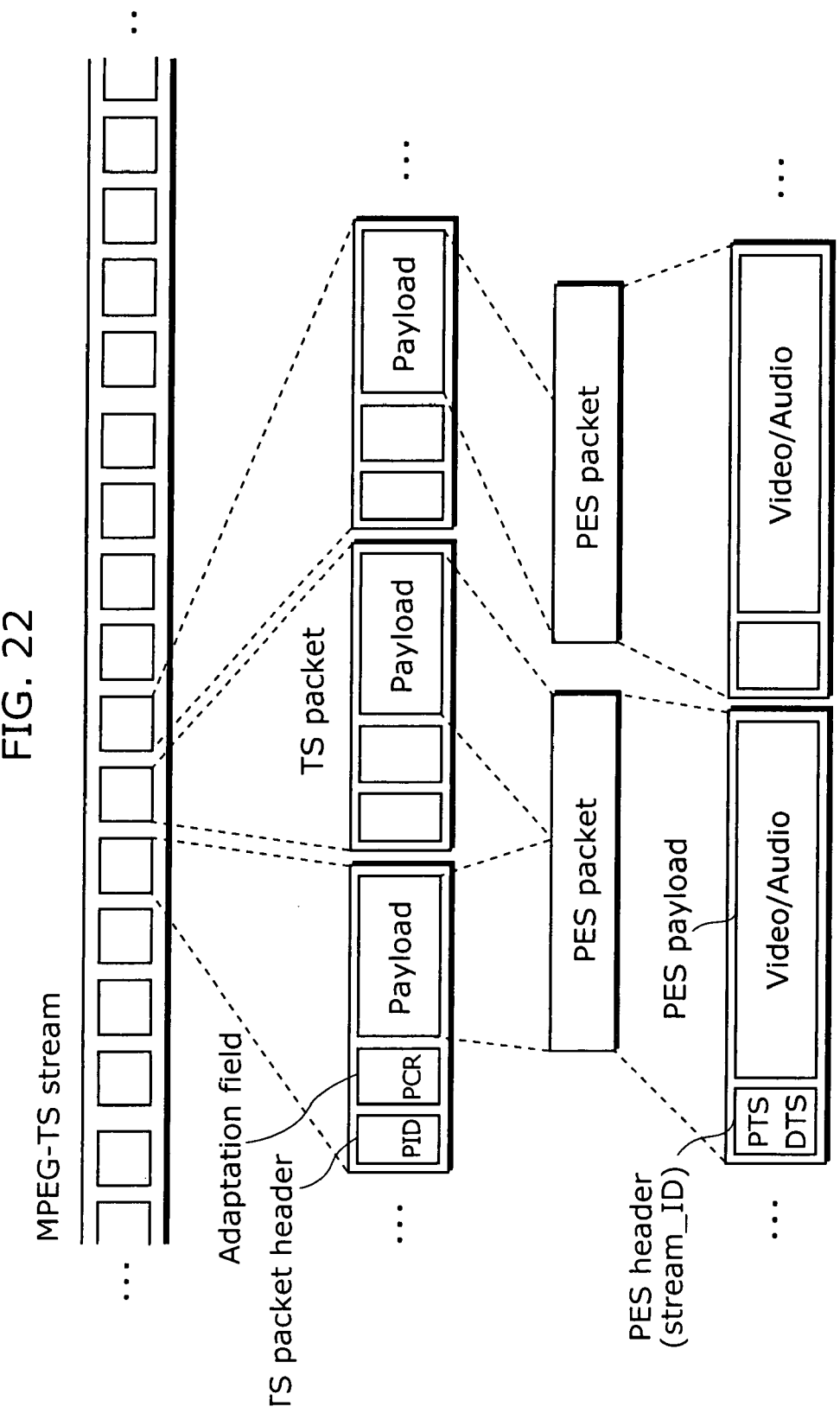
FIG. 22 is a diagram showing a structure of each pack.

FIG. 22 is a diagram showing the structure of each TS packet.

As shown in FIG. 22, a TS packet is made up of a TS packet header, an adaptation field, and a payload. A Packet Identifier (PID) is stored in the TS packet header, thereby the type of information stored in the TS packet is identified. A Program Clock Reference (PCR) is stored in the adaptation field. The PCR is a reference value of a reference clock (referred to as a System Time Clock; STC) of a device which decodes the stream. Typically, the device demultiplexes the system stream at the timing indicated by the PCR, and reconstructs various streams such as a video stream. A PES packet is stored in the payload.

Stored in the PES packet header is a Decoding Time Stamp (DTS) and a Presentation Time Stamp (PTS). The DTS indicates the timing of decoding a picture/an audio frame stored in the PES packet, and the PTS indicates presentation timing such as the timing of outputting video/audio. Each elementary data, such as video data and audio data, is stored into a data storage area called a PES Packet Payload in a PES Packet sequentially from the top. Also stored in the PES packet header is an ID (stream_id) that identifies the type of the stream to which the data stored in the payload corresponds.

The details of a TS stream is specified by ISO/IEC13818-1. What is characteristic about the BD is that an ATS is assigned for each TS packet.

<Interleaved Storage of VOB>

Figure 23:
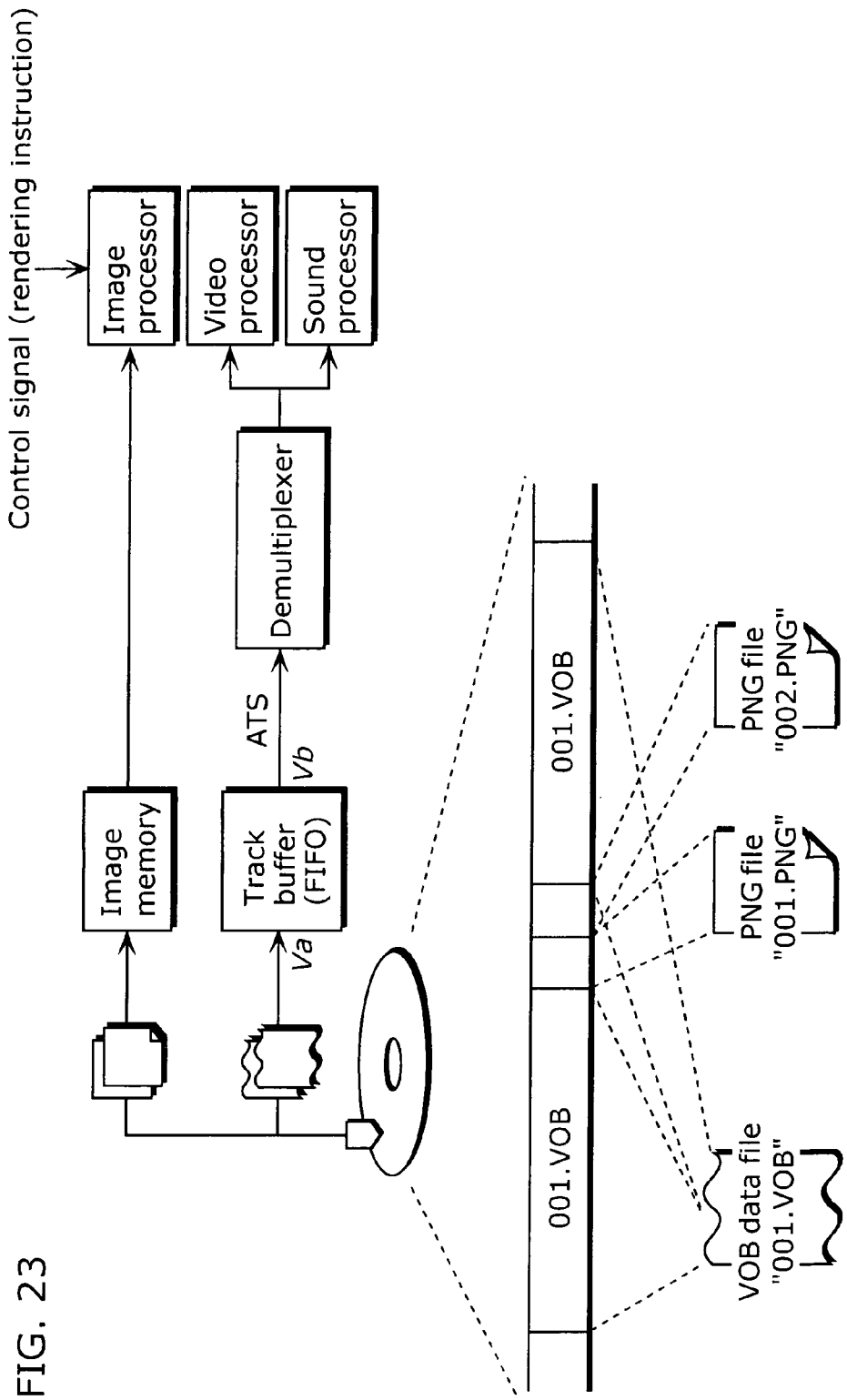
FIG. 23 is a diagram for describing a relationship between an AV stream and a player structure.
Figure 24:
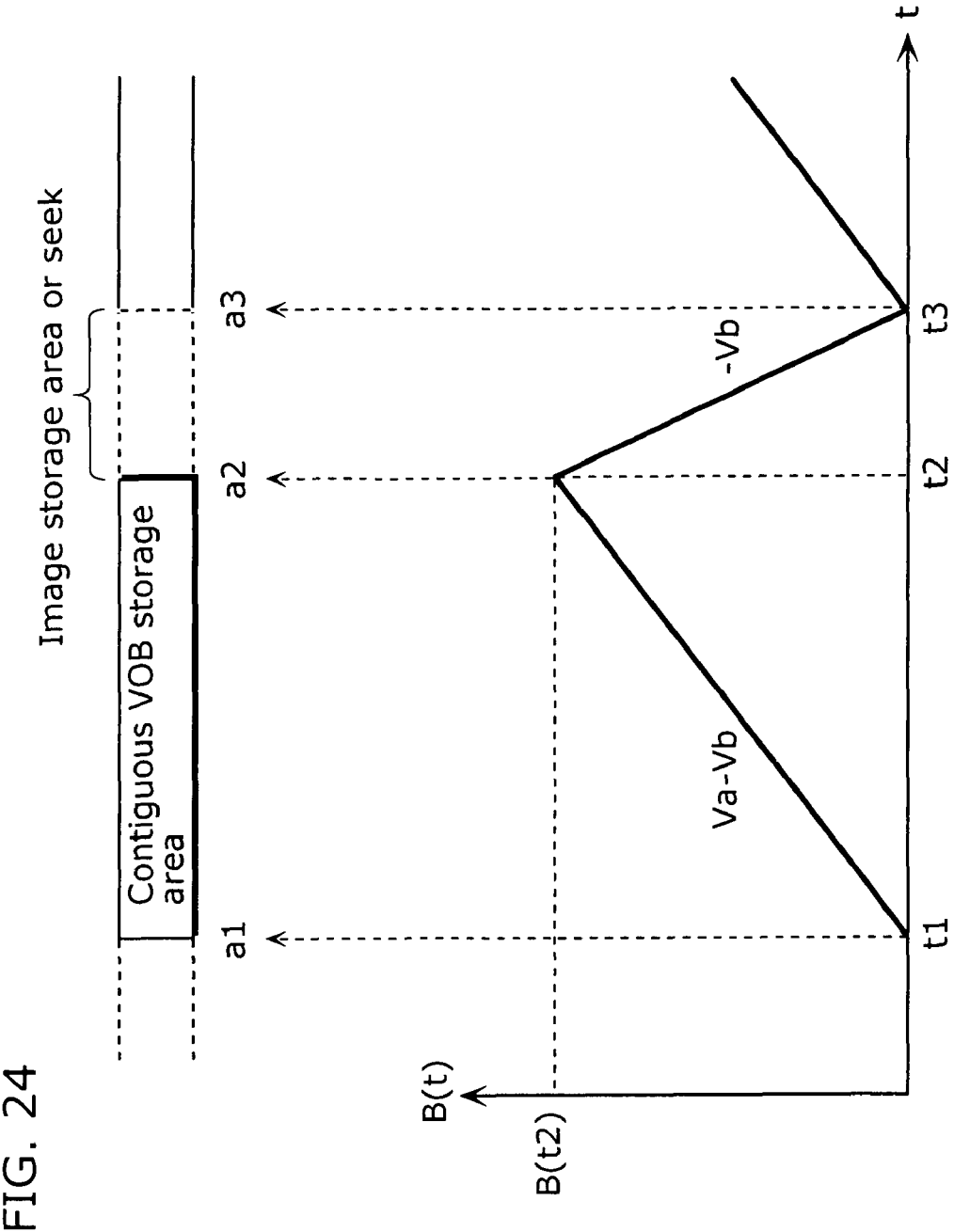
FIG. 24 is a model diagram showing a continuous supply of AV data to a track buffer.

Next, referring to FIG. 23 and FIG. 24, a description is given of interleaved storage of a VOB file.

The upper part of FIG. 23 shows a part of the structure of the above-described player. As shown in the drawing, data on the BD disc is inputted, through the optical pick-up, to the track buffer in the case where it is a VOB, i.e., an MPEG stream, whereas it is inputted to the image memory in the case where it is PNG, i.e., image data.

The track buffer is a FIFO buffer, and each VOB data inputted thereto is sent to the demultiplexer in order of input. At this time, each TS packet is extracted from the track buffer according to the ATS described above, and then sent to the video processor or the sound processor via the demultiplexer. Meanwhile, regarding the image data, the image to be rendered is instructed by the presentation controller. In the case where image data used for rendering is subtitle image data, such image data is deleted from the image memory upon being used. On the other hand, in the case where image data used for rendering is menu image data, such image data remains stored in the image memory while the rendering of the menu is taking place. Menu rendering depends on user operation, and therefore when a part of the menu is displayed again or replaced by another image according to a user operation, the decoding of the image data to be displayed again is facilitated by allowing the menu image data to remain stored in the image memory while the rendering of the menu is taking place.

The bottom part of FIG. 23 shows the interleaved storage of a VOB file and PNG files on the BD disc. In general, on a ROM such as a CD-ROM and a DVD-ROM, AV data made up of a series of continuous reproduction units to be sequentially reproduced, are stored contiguously. As long as the data are stored contiguously, the drive simply has to read out the data sequentially and deliver the read data to the respective decoders. However, in the case where such contiguous data are stored on the disc in a discrete manner, the drive needs to seek individual continuous units, and thus there is a possibility that data supply stops since data reading stops while the seek is taking place. It is preferable that data in a VOB file are stored in contiguous areas on the BD. Such data as subtitle data, which is reproduced in synchronization with video data stored in a VOB, needs to be read from the BD disc by some method, as in the case of a VOB file.

The methods of reading out subtitle data include a method of collectively reading out the whole subtitle image data (PNG files) before starting the reproduction of a VOB. However, it is not realistic to use this method, since a large capacity memory is required.

In view of this, the present embodiment employs a method in which a VOB file is divided into several blocks and stored by being interleaved with image data. The bottom part of FIG. 23 illustrates such interleaved storage.

By appropriately placing a divided VOB file and image data in an interleaved manner, it becomes possible to store image data into the image memory at the required timing without having to use a large capacity temporary memory as described above. However, the reading of VOB data is suspended during the reading of image data.

FIG. 24 is a diagram for describing a model, which solves this problem, for continuous supply of VOB data using the track buffer.

As has been described above, VOB data is accumulated into the track buffer once. Taking that the rate at which data is inputted to the track buffer is Va, and the rate at which data is outputted from the track buffer is Vb, the amount of data accumulated in the track buffer keeps increasing, when the difference between Va and Vb is Va>Vb, as long as data is continuously read from the BD disc.

Suppose, as shown in the upper part of FIG. 24, that a contiguous VOB storage area starts with the logical address "a1" and ends with the logical address "a2". Also suppose that image data is stored in an area between "a2" and "a3", and that VOB data cannot be read out in such area.

The bottom part of FIG. 24 shows the inside of the track buffer. The lateral axis indicates time, and the vertical axis indicates the amount of data accumulated in the track buffer. Time "t1" indicates the time at which the reading of data starts, the data being stored in "a1", which is the start point of the contiguous VOB storage area. At such time and thereafter, data is to be stored into the track buffer at the rate of Va−Vb. Needless to say, this rate equals to a difference between the rates at which data is inputted to and outputted from the track buffer. Time "t2" indicates the time at which data is read out, the data being stored in "a2", which is the end point of the contiguous VOB storage area. In other words, during the period from the time "t1" and the time "t2", the amount of data accumulated in the track buffer increases at the rate of Va−Vb. The amount of accumulated data at the time "t2" (B(t2)) is determined by the following Equation 1:

$$B(t2)=(Va-Vb)\times(t2-t1) \qquad \text{(Equation 1)}.$$

After this, since image data is stored until the addresses "a3" on the BD disc, there is no input of data into the track buffer, and thus the amount of data in the track buffer decreases at an output rate of "−Vb". This continues until the read-out point "a3" is reached, which corresponds to "t3" in time.

What is important here is that there is a possibility that the reproduction of the VOB stops if the amount of data accumulated in the track buffer becomes 0 before the time "t3", since it means that there is no VOB data to be supplied to the decoders. However, when there remains data in the track buffer at the time "t3", this means that the reproduction of VOB continues without stopping.

A condition for this is represented by the following Equation 2:

$$B(t2) \geqq -Vb \times (t3-t2) \qquad \text{(Equation 2)}.$$

In other words, the position of each image data (non-VOB data) should be determined so that Equation 2 is satisfied.

<Structure of Navigation Data>

Referring to FIG. 25 to FIG. 31, a description is given of the structure of the navigation data (BD management information) on the BD.

Figure 25:
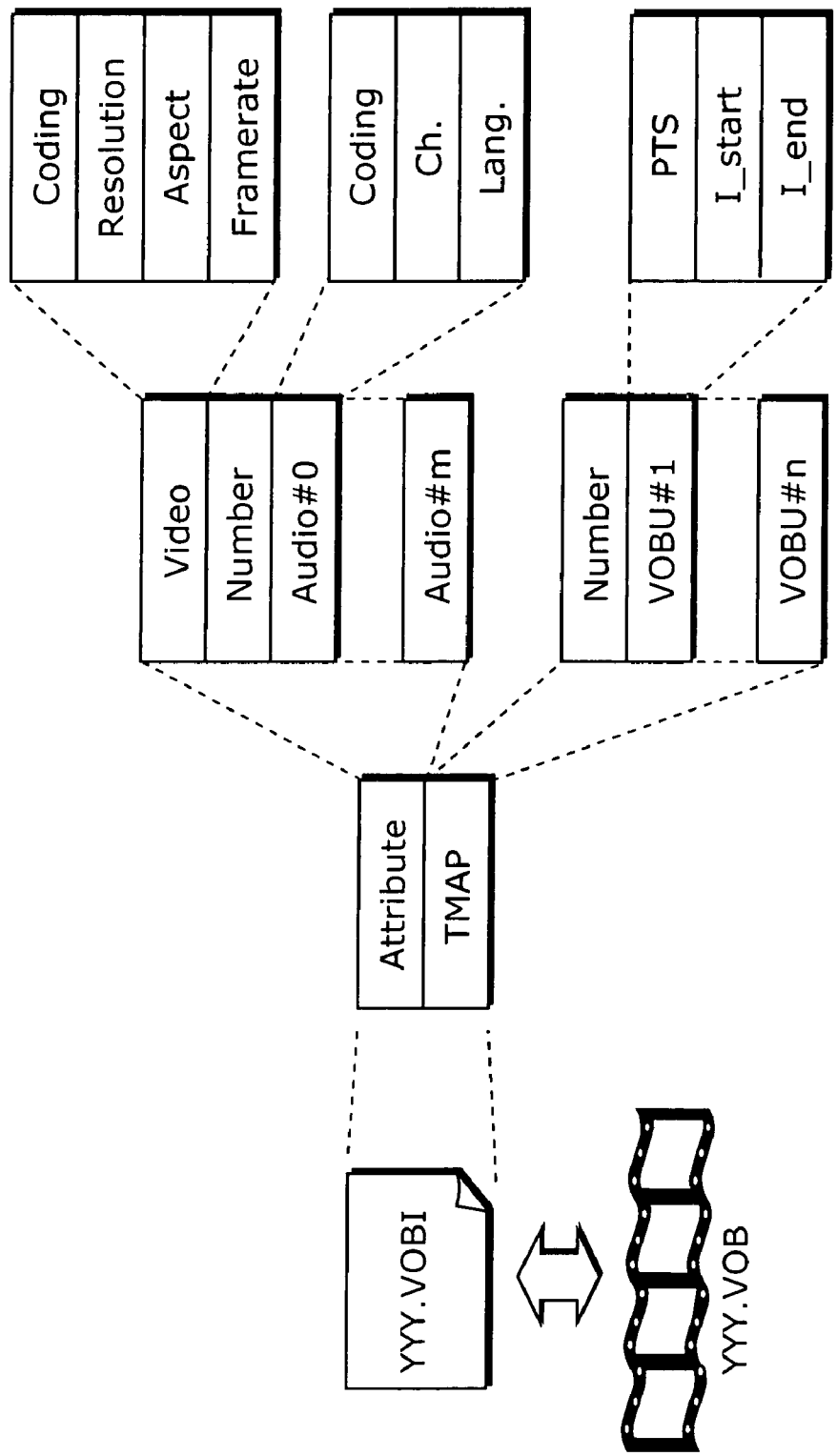
FIG. 25 is a diagram showing a structure of a VOB information file.

FIG. 25 is a diagram showing an internal structure of a VOB management information file ("YYY. VOBI").

The VOB management information includes stream attribute information (Attribute) of the VOB, and a time map. Each stream attribute includes a video attribute (Video) and audio attributes (Audio#0 to Audio#m). Since a VOB can include plural audio streams, there is an indication of the number of audio streams (Number).

The following lists fields included in the video attribute (Video) and possible values included in the respective fields:

Compression mode (Coding):
MPEG1
MPEG2
MPEG4
MPEG-4 AVC (Advanced Video Coding)
Resolution (Resolution):

1920×1080
1440×1080
1280×720
720×480
720×565
Aspect ratio (Aspect)
4:3
16:9
Frame rate (Framerate)
60
59.94 (60/1.001)
50
30
29.97 (30/1.001)
24
23.976 (24/1.001)

The following lists fields included in each of the Audio attributes (Audio) and possible values included in the respective fields:

Compression mode (Coding):
AC3
MPEG1
MPEG2
LPCM
Channel number (Ch.):
1 to 8
Linguistic attribute (Language):

The time map (TMAP), which is a table holding information for each VOBU, includes the number of VOBUs (Number) in the VOB, and VOBU information of each of such VOBUs (VOBU#1 to VOBU#n). Each VOBU information is made up of: the address I_start of the first TS packet in the VOBU (the start of an I picture; the offset address indicating the end of such I picture (I_end); and the reproduction start time of such I picture (PTS).

The actual end address of the I picture may be used as the value of I_end, rather than using the offset value, that is, the size of the I picture.

Figure 26:
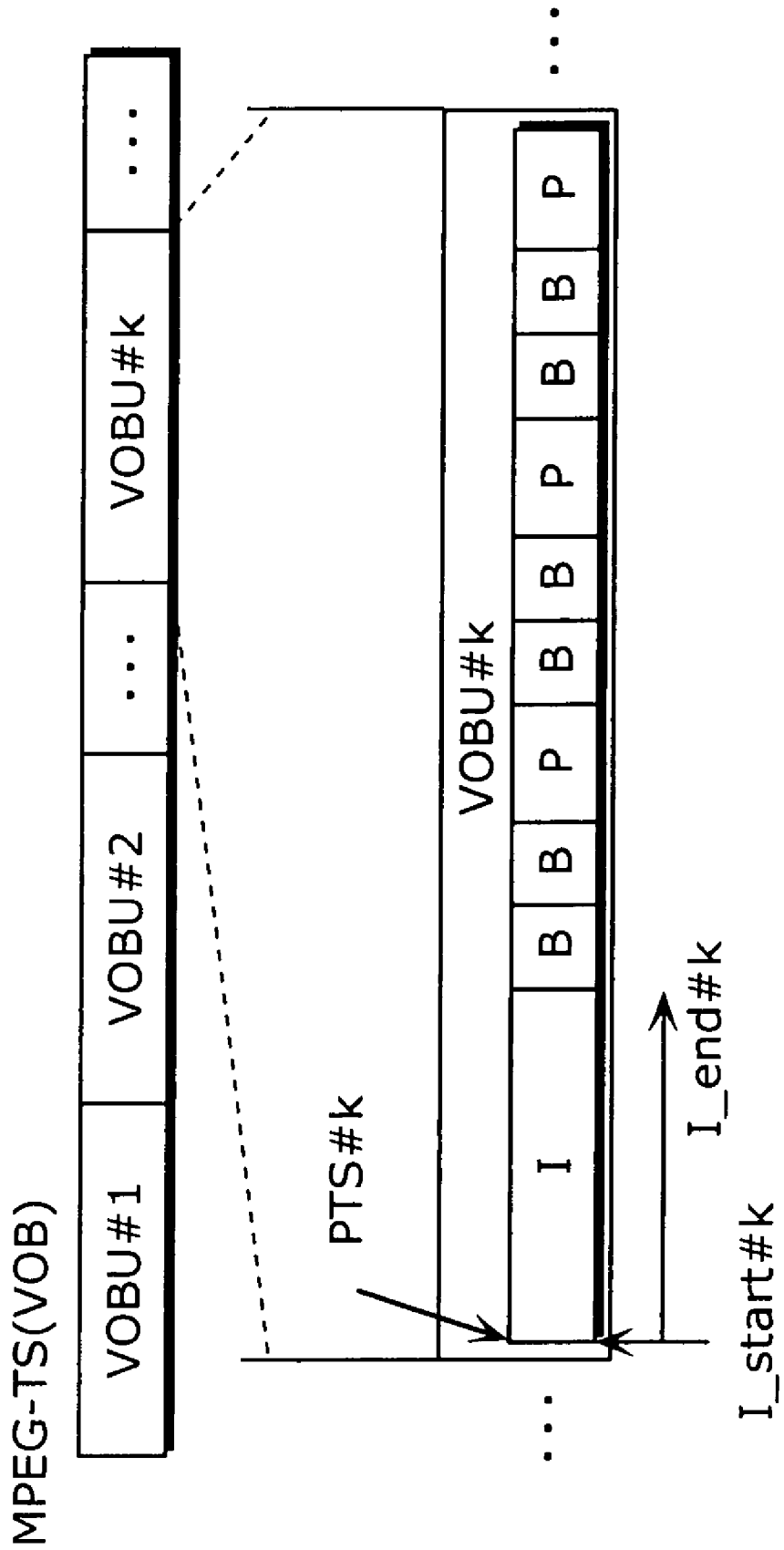
FIG. 26 is a diagram for describing a time map.

FIG. 26 is a diagram for describing the details of each VOBU information.

As is widely known, MPEG video streams are compressed, in some cases, at a variable bit rate for storing them with high image quality, and therefore there is no simple correlation between their reproduction duration and data size. In contrast, since AC3, which is a compression standard for audio, performs compression at a fixed bit rate, a relationship between duration and each address can be represented by a linear expression. The display duration of each frame in MPEG video data is fixed. For example, the display duration of one frame in the case of NTSC is 1/29.97 seconds, but the data size of each frame after compression greatly differs from frame to frame depending on the pictorial feature and the picture type used for compression, i.e., whether a frame is an I picture, a P picture or a B picture. Thus, in the case of MPEG video, it is impossible to represent a relationship between duration and each address by a linear expression.

As a matter of fact, it is impossible to represent duration and each data size by a linear expression in the case of an MPEG system stream, i.e., a VOB, in which MPEG video data is multiplexed. For this reason, in a VOB, duration and each address are associated with each other in a time map (TMAP).

As described above, the following is performed when certain time information is provided: first detecting which one of the VOBUs such time belongs to (checks the PTS of each VOBU); jumping to the VOBU whose TMAP includes the PTS immediately previous to such time (address specified by I_start); performing decoding starting from the first I picture in the VOBU; and displaying pictures starting with the picture corresponding to such time.

Figure 27:
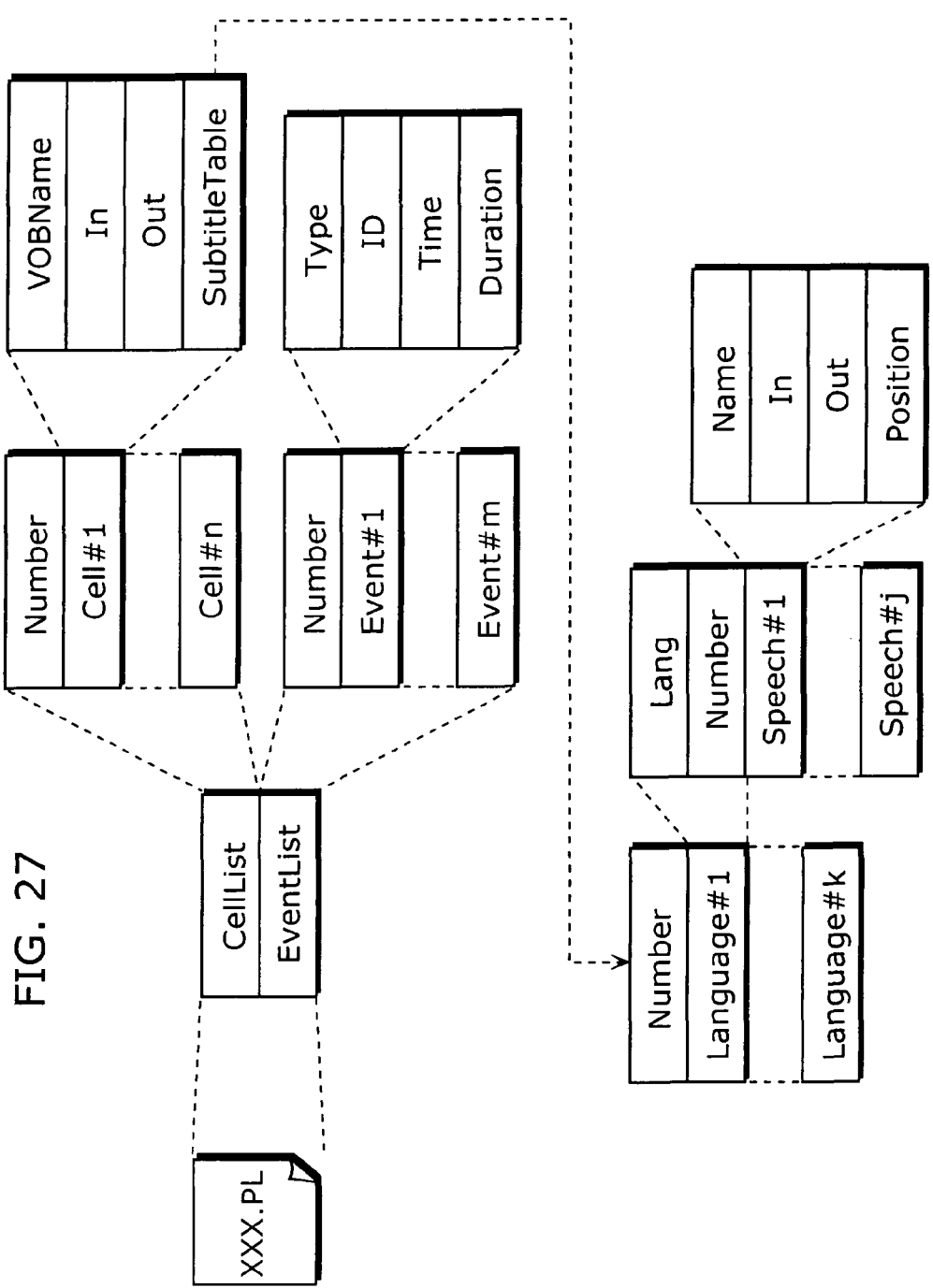
FIG. 27 is a diagram showing a structure of a playlist file.

Next, referring to FIG. 27, a description is given of an internal structure of playlist information ("XXX. PL").

The playlist information is made up of a cell list (CellList) and an event list (EventList).

The cell list (CellList) is a sequence of cells to be reproduced in the playlist, wherein the cells are reproduced in order of description in this list. The cell list (CellList) is made up of the number of cells (Number) and cell information of each of such cells (Cell#1 to Cell#n).

Cell information (Cell#) includes a VOB filename (VOBName), start time (In) and end time (Out) in the VOB, and a subtitle table (SubtitleTable). The start time (In) and the end time (Out) are each represented by a frame number in the VOB, and it is possible to obtain the address of VOB data necessary for reproduction, using the above-described time map.

The subtitle table (SubtitleTable) is a table holding information about subtitles to be reproduced in synchronization with the VOB. Subtitles can be in plural languages as in the case of audio, and the subtitle table (SubtitleTable) includes the number of languages (Number), which is the first information therein and is followed by tables for the respective languages (Language#1 to Language#k).

The table for each language (Language#) is made up of language information (Lang), the number of subtitle information to be individually displayed (Number), and subtitle information to be individually displayed (Speech#1 to Speech#j). Each subtitle information (Speech#) is made up of: the filename of corresponding image data (Name); display start time (In) of the subtitles and display end time (Out) of the subtitles; and a display position of the subtitles (Position).

The event list (EventList) is a table that defines events that occur in the playlist. The event list includes the number of events (Number), which is followed by individual events (Evnet#1 to Evnet#m). Each event (Event#) is made up of the type of the event (Type), the ID of the event (ID), and the time at which the event occurs (Time), and the validity period (Duration).

Figure 28:
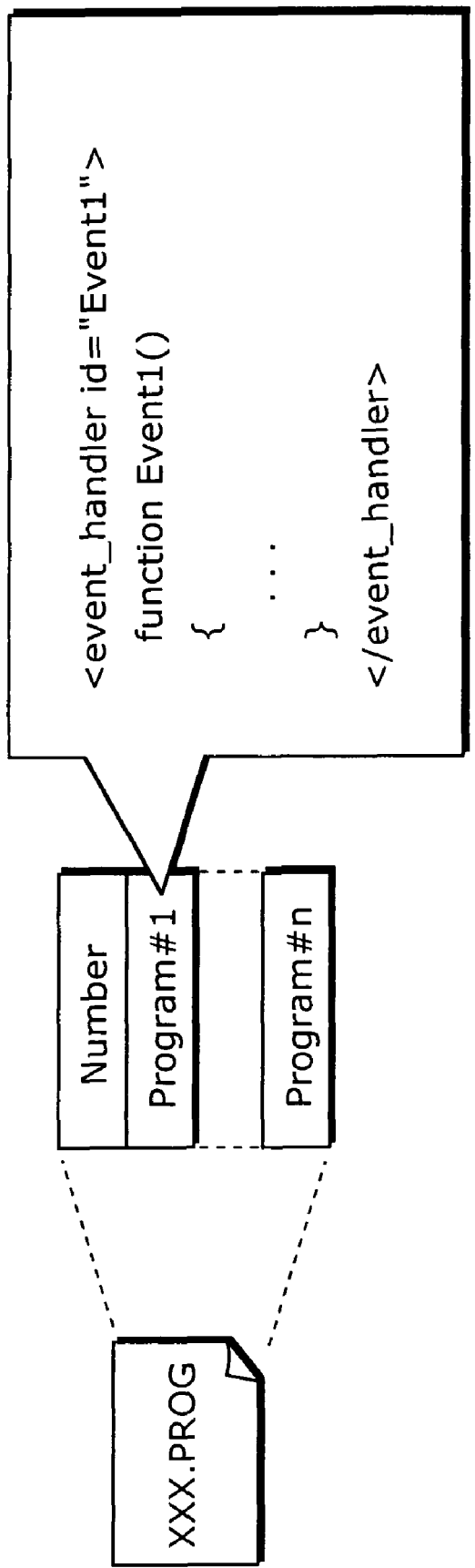
FIG. 28 is a diagram showing a structure of a program file corresponding to a playlist.

FIG. 28 is a diagram showing an event handler table ("XXX. PROG") that holds event handlers (for time event and user event for menu selection) of each playlist.

The event handler table holds the number of event handlers/programs defined (Number), and individual event handlers/programs (Program#1 to Program#n). Each event handler/program (Program#) includes the definition of the start of the event handler (<event_handler> tag) and the ID of the event handler (ID) that is paired with the ID of the event as described above. The program is described in the brackets { } that follows Function. The events (Event#1 to Evnet#m) stored in the above-described event list (EventList) in "XXX. PL" are identified using the ID (IDs) of the corresponding event handlers in "XXX. PROG".

Figure 29:
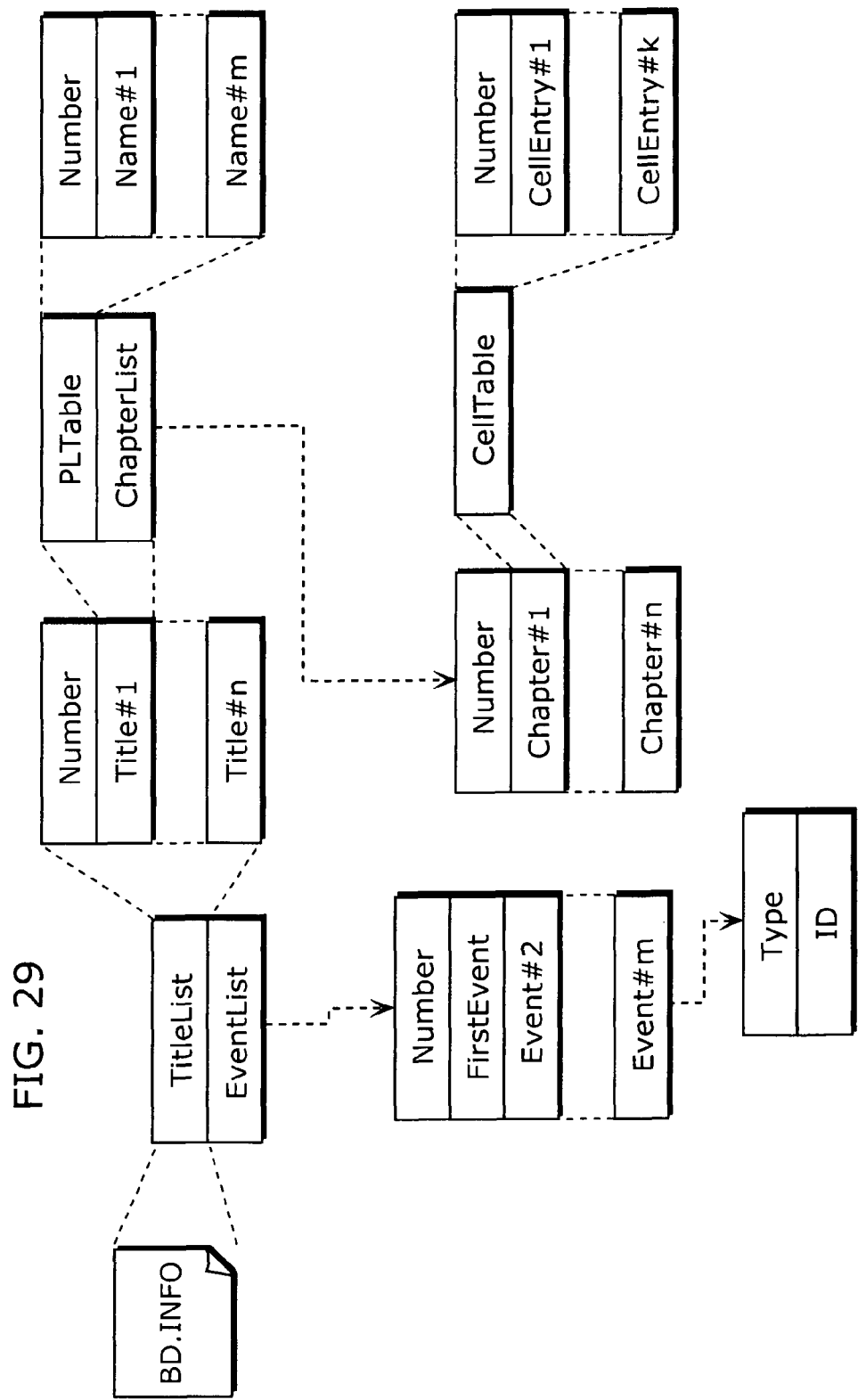
FIG. 29 is a diagram showing a structure of a management information file related to the entire BD disc.

Next, referring to FIG. 29, a description is given of an internal structure of information related to the entire BD disc ("BD. INFO").

The information related to the entire BD disc is made up of a title list (TitleList) and an event table (EventList) for global events.

The title list (TitleList) includes the number of titles in the disc (Number), which is followed by title information of each of such titles (Title#1 to Title#n). Each title information (Title#) includes a playlist table (PLTable) holding playlists in the title and a chapter list (Chapterlist) holding chapters in the title. The playlist table (PLTable) includes the number of playlists in the title (Number) and the playlist names (Name), i.e., the filenames of the respective playlists.

The chapter list (Chapterlist) is made up of the number of chapters included in the title (Number) and chapter information of each of such chapters (Chapter#1 to Chapter#n). Each chapter information (Chapter#) includes a cell table (CellTable) holding cells included in the chapter. The cell table (CellTable) is made up of the number of cells (Number) and cell entry information of each of such cells (CellEntry#1 to CellEntry#k). Each cell entry information (CellEntry#) is made up of the name of the playlist including the cell, and the cell number in the playlist.

The event list (EventList) includes the number of global events (Number), and information about each of such global events. What should be noted here is that the first defined global event is referred to as a first event (FirstEvent), and such event is first read out when the BD disc is inserted into the player. Event information for a global event includes only the type of the event (Type), and the ID of the event (ID).

Figure 30:
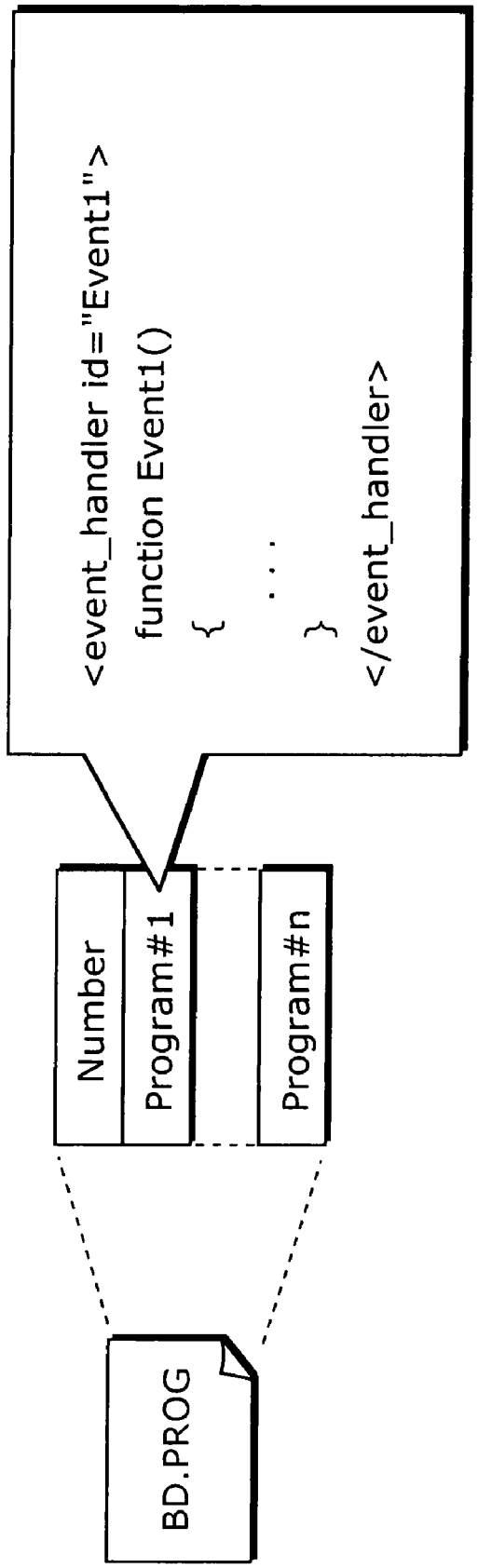
FIG. 30 is a diagram showing a structure of a file for recording a global event handler.

FIG. 30 is a diagram showing a table holding programs of global event handlers ("BD. PROG").

The contents of this table are the same as the contents of the event handler table described with reference to FIG. 28.

<Mechanism of Event Occurrence>

Figure 31:
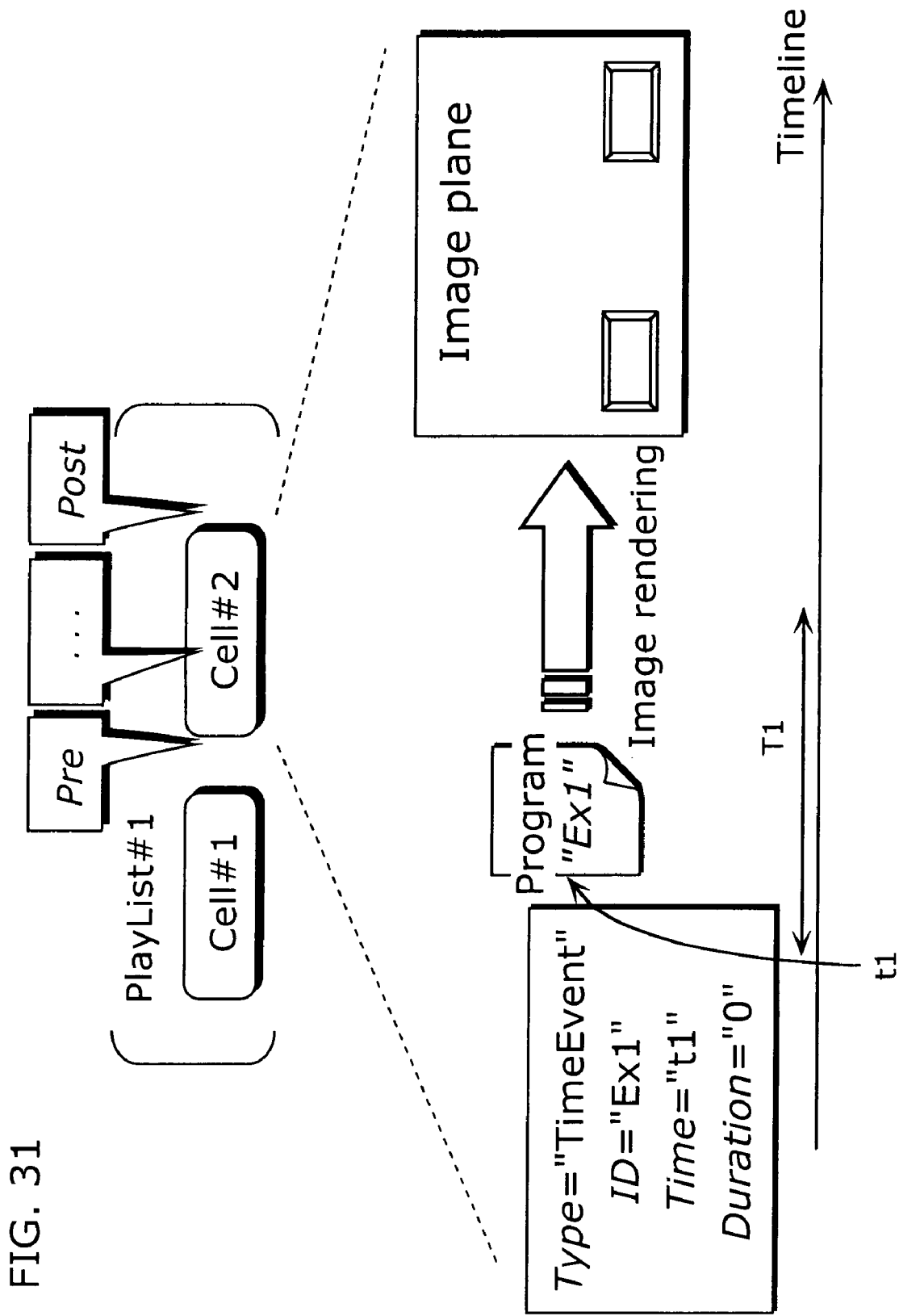
FIG. 31 is a diagram showing an example of a time event.
Figure 32:
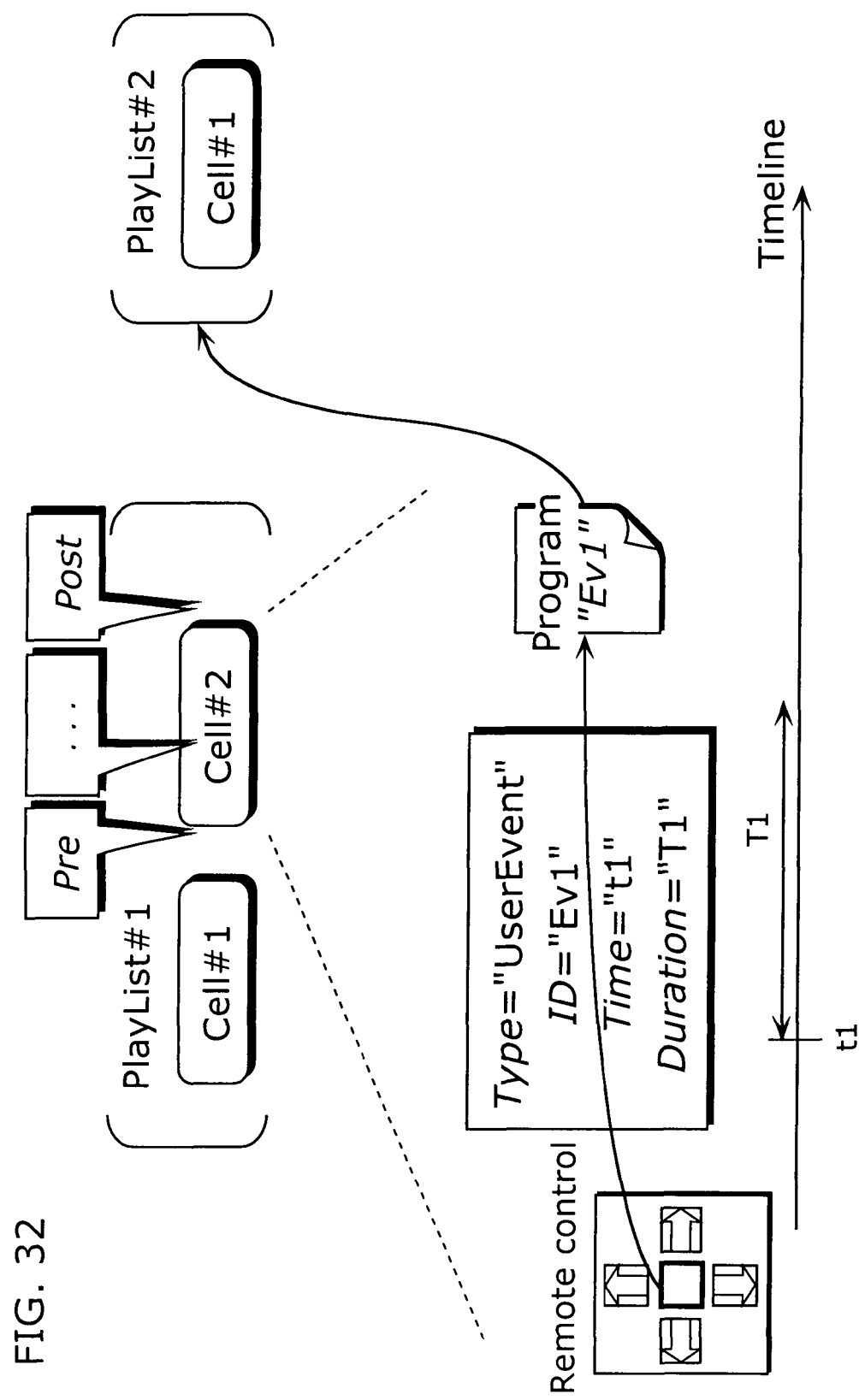
FIG. 32 is a diagram showing an example of a user event.
Figure 33:
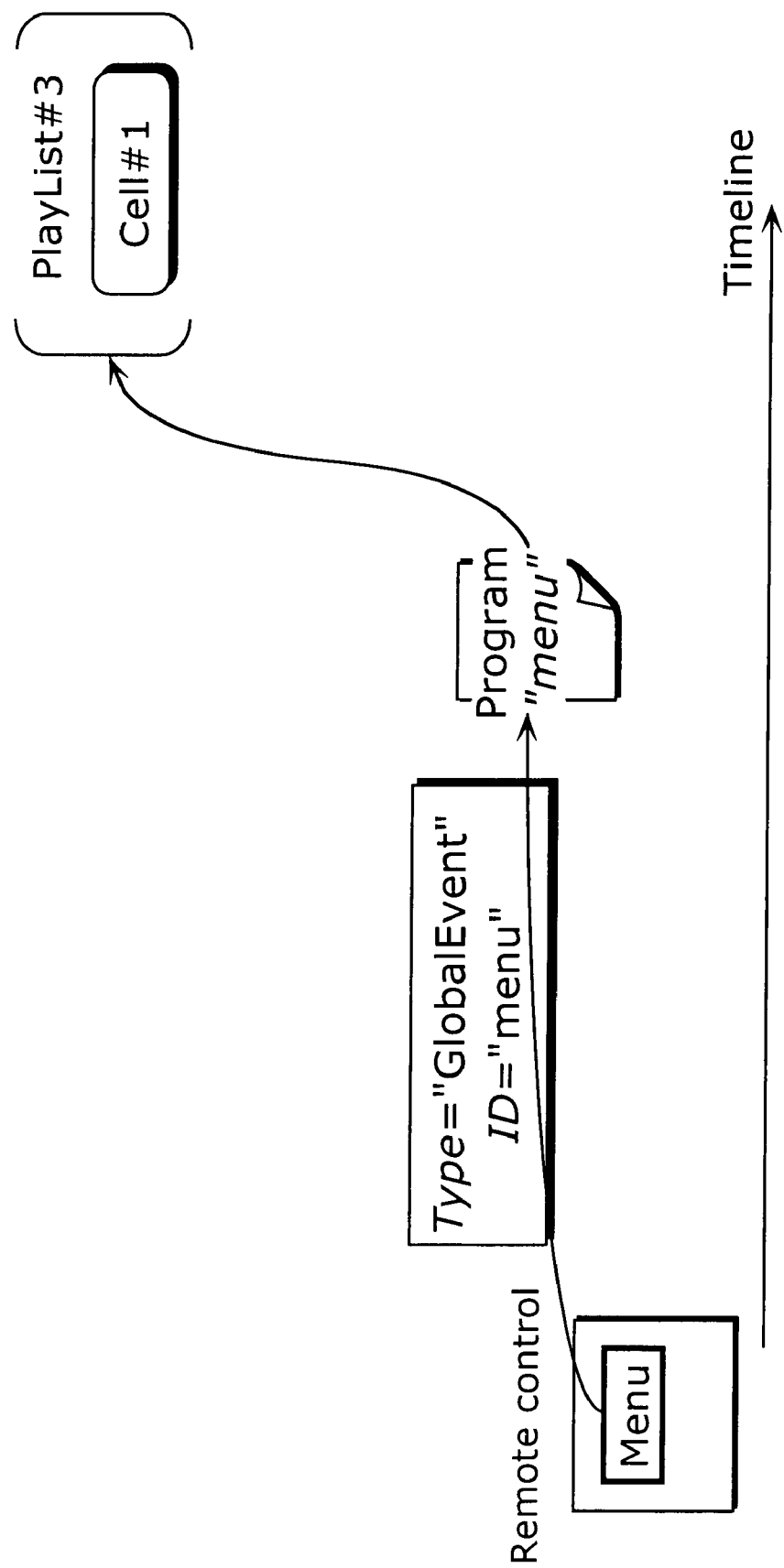
FIG. 33 is a diagram for describing an example of a global event handler.

Referring to FIG. 31 to FIG. 33, a description is given of a mechanism of event occurrence.

FIG. 31 is a diagram showing an example of a time event.

As has been described, a time event is defined in the event list (EventList) in playlist information ("XXX. PL"). In the case where an event is defined as a time event, i.e., an event whose event type (Type) is "TimeEvent", a time event with the ID "Ex1" is outputted to the program processor from the scenario processor at the event generation time ("t1"). The program processor searches for an event handler with the event ID "EX1", and executes such target event handler. For example, an event such as the rendering or the like of two button images is executed in the present embodiment.

FIG. 32 is a diagram showing an example of a user event for menu operation.

As has been described above, a user event for menu operation is also defined in the event list (EventList) in playlist information ("XXX. PL"). In the case where an event is defined as a user event, i.e., an event whose event type (Type) is "UserEvent", such user event becomes ready at the event generation time ("t1"). At this time, the event itself has not been generated yet. This event is in the ready state during the period indicated by its validity period information (Duration).

As shown in FIG. 32, when the user presses the Up/Down/Right/Left key or the "Determination" key on the remote control, the UOP manager first generates an UOP event, and outputs it to the program processor. The program processor outputs such UOP event to the scenario processor. The scenario processor checks whether or not there exists any user event that is effective at the time of receiving the UOP event. In the case where there exists an effective user event, the scenario processor generates a user event, and outputs it to the program processor. The program processor searches for an event handler with the event ID "Ev1", and executes such target event handler. For example, the reproduction of the playlist #2 is started in the present embodiment.

The generated user event does not include information for identifying which one of the remote control keys the user has pressed. Information about the selected remote control key is notified to the program processor by the UOP event, and stored into the register SPRM (8) of the virtual player. By checking the value of such register, it is possible to perform branch processing on the program of the event handler.

FIG. 33 is a diagram showing an example of a global event.

As has been described above, a global event is defined in the event list (EventList) in information related to the entire BD disc ("BD. INFO"). In the case where an event is defined as a global event, i.e., an event whose event type (Type) is "GlobalEvent", such event is generated only when the user has performed a remote control key operation.

When the user presses the "Menu" key, the UOP manager first generates a UOP event, and outputs it to the program processor. The program processor outputs such UOP event to the scenario processor. Then, the scenario processor generates a global event corresponding to such UOP event, and sends it to the program processor. The program processor searches for an event handler with the event ID "menu", and executes such target event handler. For example, the reproduction of the playlist#3 is started in the present embodiment.

Note that the number of "Menu" keys is assumed to be one in the present embodiment, but there may be plural menu keys as in the case of a DVD recorder. It is possible to support such case by defining an ID corresponding to each menu key.

<Virtual Player Machine>

Figure 34:
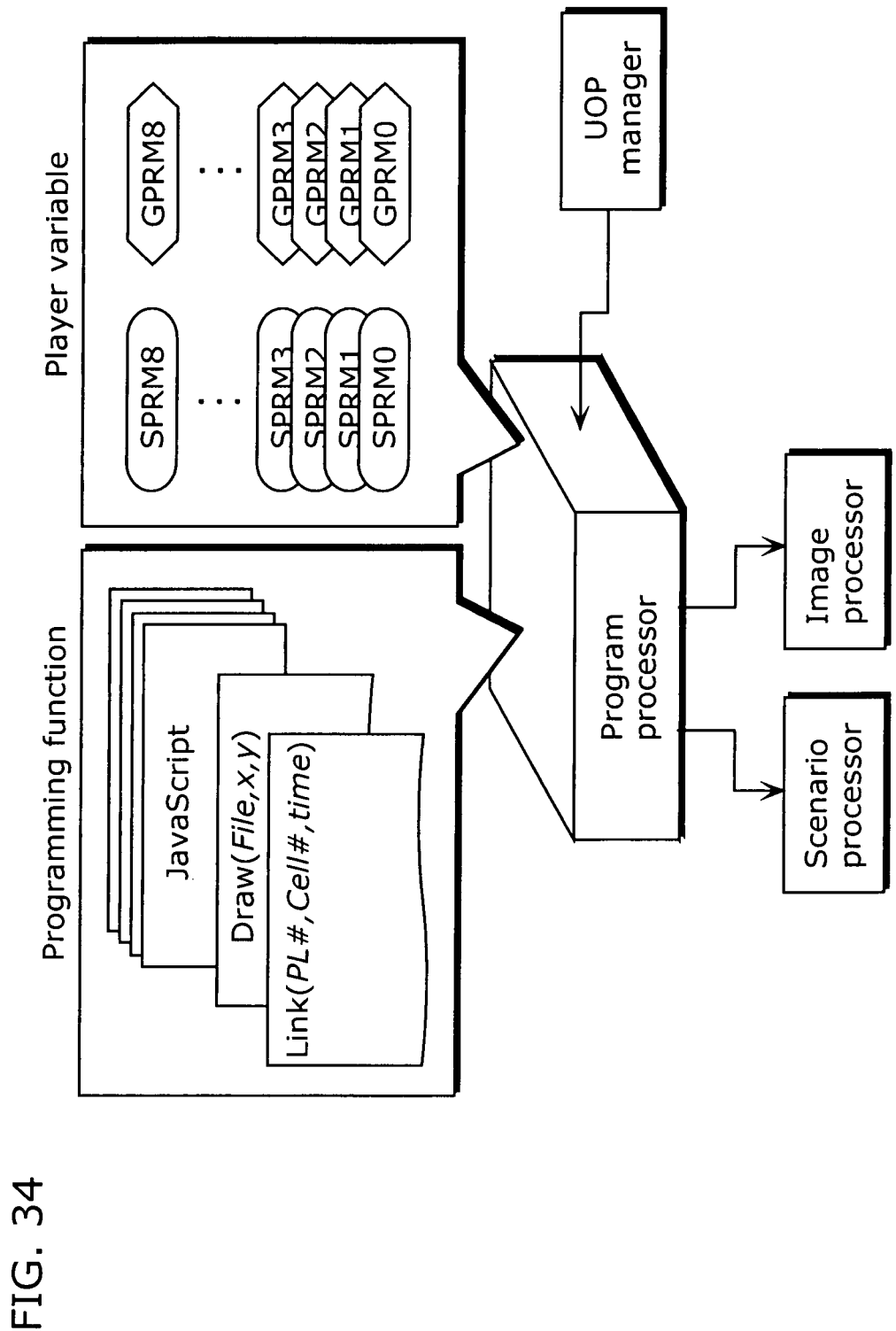
FIG. 34 is a diagram showing a structure of a virtual machine.

Referring to FIG. 34, a description is given of the functional structure of the program processor.

The program processor is a processing module having a virtual player machine therein. Such virtual player machine has the function of supporting BDs, and does not depend on the implementation of a BD player. In other words, the virtual player machine is guaranteed to realize the same function regardless of BD player.

The virtual player machine roughly has two functions: programming functions and player variables (registers). In the programming functions, two properties described below are defined as BD eigen functions based on Java (registered trademark) Script:

Link function: stopping the current reproduction, and starting the reproduction starting from a specified playlist, cell, or time.

Link (PL#, Cell#, time)

PL#: Playlist name

Cell#: Cell number time: Reproduction start time in the cell

PNG rendering function: render specified PNG data onto the image plane

Draw (File, X, Y)

File: PNG filename

X: Position on the X coordinate

Y: Position on the Y coordinate

Image plane clear function: clear a specified area on the image plane

Clear (X, Y, W, H)

X: Position on the X coordinate

Y: Position on the Y coordinate

W: Width in the X direction

H: Width in the Y direction

Player variables include system parameters (SPRMs) indicating the status of the player, and general parameters (GPRMs) that can be used for general purposes.

FIG. 35 shows a list of system parameters (SPRMs).

SPRM (0): Language code

SPRM (1): Audio stream number

SPRM (2): Subtitle stream number

SPRM (3): Angle number

SPRM (4): Title number

SPRM (5): Chapter number

SPRM (6): Program number

SPRM (7): Cell number

SPRM (8): Key name

SPRM (9): Navigation timer
SPRM (10): Current playback time
SPRM (11): Player audio mixing mode for Karaoke
SPRM (12): Country code for parental management
SPRM (13): Parental level
SPRM (14): Player configuration (video)
SPRM (15): Player configuration (audio)
SPRM (16): Language code for audio stream
SPRM (17): Language code for audio stream (extension)
SPRM (18): Language code for subtitle stream
SPRM (19): Language code for subtitle stream (extension)
SPRM (20): Player region code
SPRM (21): reserved
SPRM (22): reserved
SPRM (23): Player status
SPRM (24): reserved
SPRM (25): reserved
SPRM (26): reserved
SPRM (27): reserved
SPRM (28): reserved
SPRM (29): reserved
SPRM (30): reserved
SPRM (31): reserved Note that the programming functions are defined in the present embodiment based on Java (registered trademark) Script, but these programming functions may be defined based on other programming functions such as B-Shell and Perl Script used in such OS as a UNIX (registered trademark) OS, rather than being defined based on Java (registered trademark) Script. In other words, the present invention is not limited to the use of Java (registered trademark) Script for their definitions.

<Example of Program>

Figure 36:
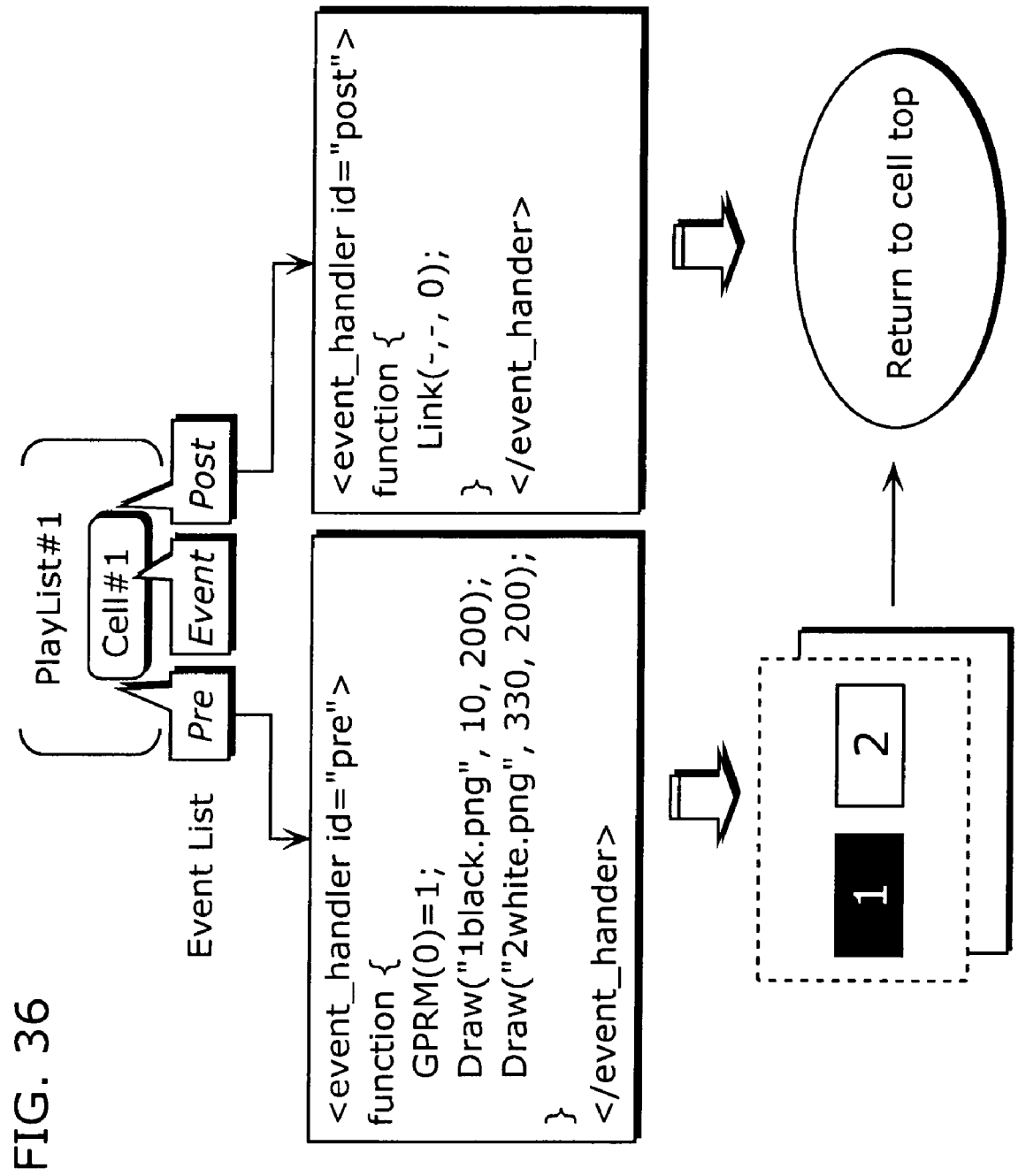
FIG. 36 is a diagram showing an example of an event handler (for a time event).
Figure 37:
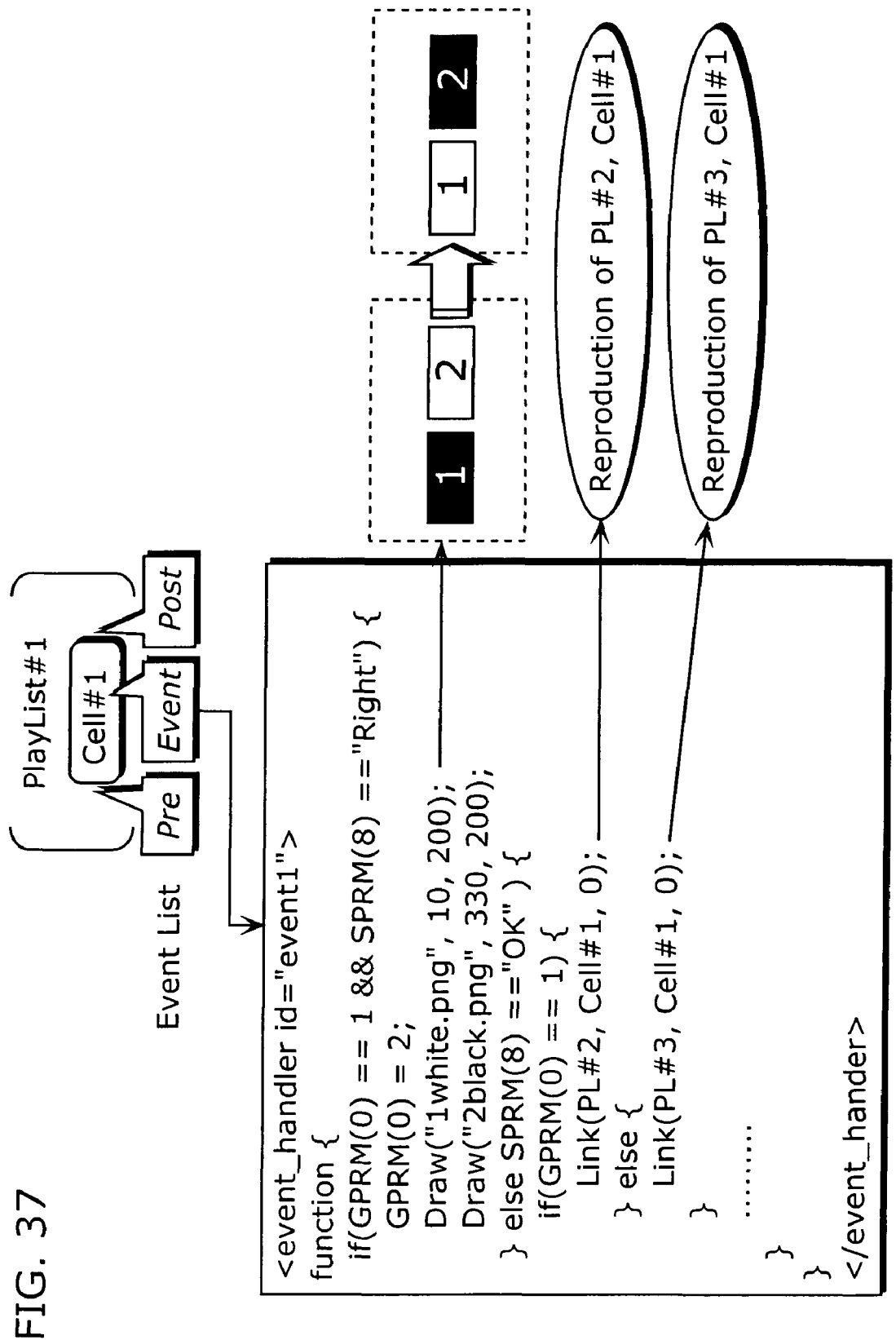
FIG. 37 is a diagram showing an example of an event handler (for a user event).

FIG. 36 and FIG. 37 are diagrams showing examples of programs as event handlers.

FIG. 36 is a diagram showing an example of a menu having two selection buttons.

The program illustrated on the left of FIG. 36 is executed based on the top time event of the cell (PlayList#1. Cell#1). Here, "1" is set to one of the general parameters GPRM (0) by default. GPRM(0) is used in the program to identify the selected button. In the initial state, it is an initial value indicating that the button 1 located on the left is selected.

Next, using a rendering function Draw, PNG of each of the button 1 and button 2 is rendered. The button 1 is formed by rendering the PNG image "1black. png" that extends from the coordinates (10, 200) as the starting point (upper left corner). The button 2 is formed by rendering the PNG image "2white. png" that extends from the coordinates (330, 200) as the starting point (upper left corner).

Then, the program illustrated on the right of FIG. 36 is executed based on the last time event of the current cell. In this program, it is specified, using Link function, that the cell should be reproduced from the top again.

FIG. 37 is a diagram showing an example of an event handler for a user event for menu selection.

Programs corresponding to each of the remote control keys, in the case where any of the "Left" key, "Right" key, and "Determination" key is pressed, is described in the event handler. As has been described with reference to FIG. 32, when the user presses a remote control key, a user event is generated, and then the event handler shown in FIG. 37 is invoked. In this event handler, branch processing is performed using the value of GPRM (0) for identifying the selected button and using SPRM (8) for identifying the selected remote control key.

Condition 1) in the case where the button 1 is selected, and the "Right" key is selected
GPRM(0) is reset to 2 so as to change the currently selected button to the button 2 on the right.
The images of the respective button 1 and button 2 are re-rendered.
Condition 2) in the case where the "Determination (OK)" key is selected, and the button 1 is selected
The reproduction of the playlist#2 is started.
Condition 3) in the case where the "Determination (OK)" key is selected, and the button 2 is selected
The reproduction of the playlist#3 is started.
The execution is carried out in this manner.

<Flow of Player Processes>

Next, referring to FIG. 38 to FIG. 41, a description is given of the flow of processes performed by the player.

Figure 38:
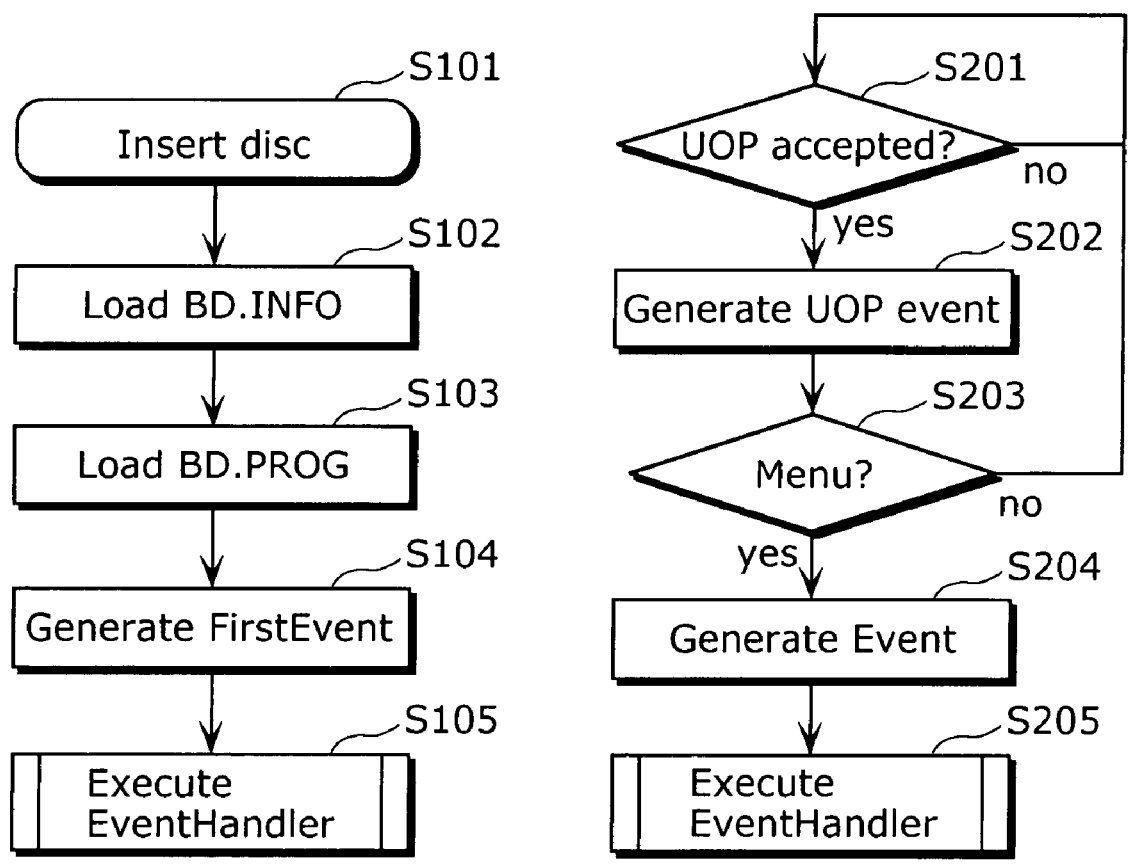
FIG. 38 is a flowchart showing basic player processes.

FIG. 38 is a diagram showing the flow of basic processes until the reproduction of AV data.

When the BD disc is inserted (S101), the BD player loads and analyzes the BD. INFO file (S102), and then loads the BD. PROG (S103). The BD. INFO and BD. PROG are both stored into the management information storage memory once, and analyzed by the scenario processor.

Next, the scenario processor generates the first event based on the first event (FirstEvent) information in the BD. INFO file (S104). The program processor receives the generated first event, and executes an event handler corresponding to such event (S105).

It is expected that the playlist information that should be reproduced first is stored in the event handler corresponding to the first event. If there is no instruction to reproduce a playlist, the player keeps waiting for a user event without reproducing anything (S201). When the BD player receives a remote control operation from the user, the UOP manager causes the program manager to start the execution of the UOP event (S202).

The program manager determines whether or not such UOP event is a menu key event (S203). In the case where the UOP event is a menu key event, the program manager outputs the UOP event to the scenario processor, and the scenario processor then generates a user event (S204). The program processor executes an event handler corresponding to such generated user event (S205).

Figure 39:
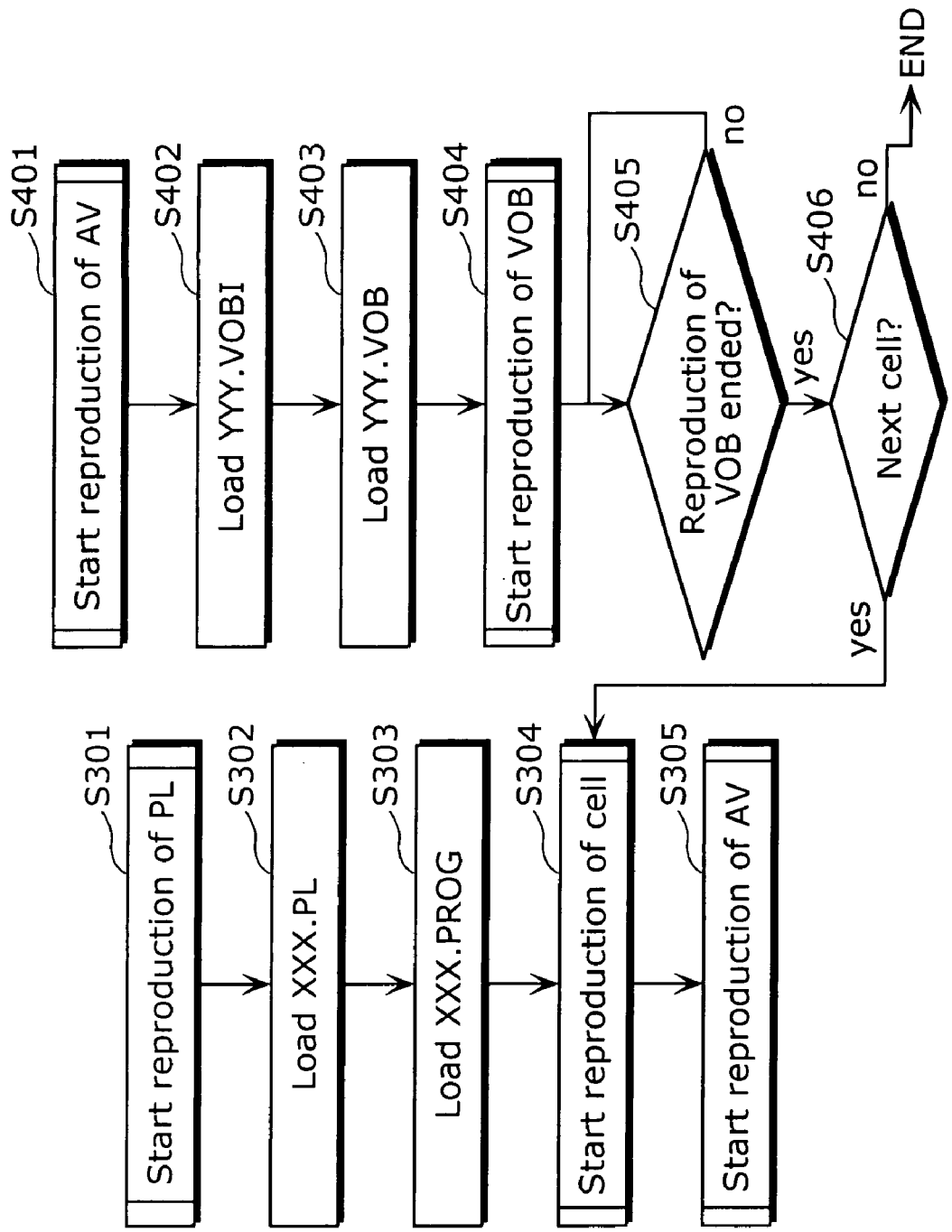
FIG. 39 is a flowchart showing playlist reproduction processes.

FIG. 39 shows the flow of processes from the reproduction of a PL to the reproduction of a VOB.

As has been described above, the reproduction of the playlist is started by a first event handler or a global event handler (S301). The scenario processor loads and analyzes the playlist information "XXX. PL" as information required to reproduce the playlist to be reproduced (S302), and loads the program information "XXX. PROG" corresponding to such playlist (S303). Then, the scenario processor instructs the reproduction of a cell based on the cell information registered in the playlist (S304). Since the reproduction of the cell means that there is a request from the scenario processor to the presentation controller, the presentation controller starts the reproduction of the AV data (S305).

When the reproduction of the AV data starts (S401), the presentation controller loads and analyzes the information file (XXX. VOBI) of the VOB corresponding to the cell to be reproduced (S402). Referring to the time map, the presentation controller identifies the first VOBU to be reproduced and the address of such VOBU, and notifies such address to the drive controller, and the drive controller then reads out the target VOB data (S403). Accordingly, the VOB data is sent to the decoders, and the reproduction of such data starts (S404).

The reproduction of the VOB continues until the end of the reproduction segments of such VOB is reached (S405), which is followed by the reproduction of the next cell S304. If there is no cell that follows, the reproduction stops (S406).

Figure 40:
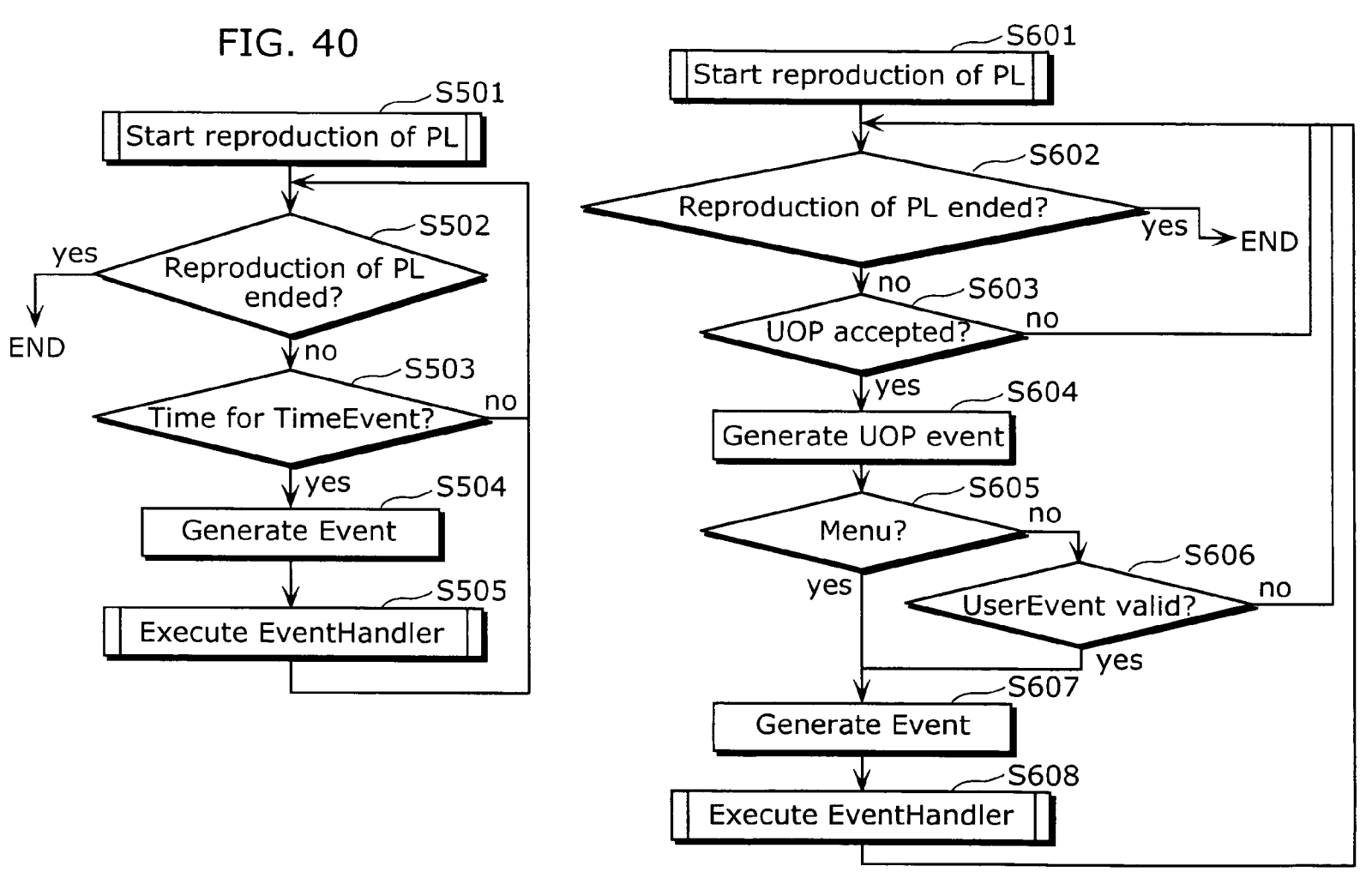

FIG. 40 shows the flow of event processes after the reproduction of the AV data starts.

The BD player is an event-driven player. When the reproduction of a playlist starts, event processes for time event, user event, and subtitle display are respectively invoked, and event processes are executed in parallel with them.

Processes in S500's are a flow of time event processes.

After the reproduction of the playlist starts (S501) and a step of checking whether or not the reproduction of the playlist has ended is performed (S502), the scenario processor checks whether or not it is the time for time event occurrence (S503). In the case where it is the time for time event occurrence, the scenario processor generates a time event (S504), and the program processor receives such time event and executes the corresponding event handler (S505).

The processes returns to Step S502 again in the following cases, and the above-described processes are repeated: it is not the time for time event occurrence in Step S503; and after the event handler is executed in Step S504. Meanwhile, in the case where the result of the check in Step S502 is that the reproduction of the playlist has ended, the time event processes are forcefully terminated.

Processes in S600's are a flow of user event processes.

After the reproduction of the playlist starts (S601) and a step of checking whether or not the reproduction of the playlist has ended is performed (S602), the process proceeds to a step of checking whether or not there is any UOP accepted (S603). In the case where there is a UOP accepted, the UOP manager generates a UOP event (S604), and the program processor receives such UOP event and checks whether or not the received UOP event is a menu call (S605). In the case where the UOP event is a menu call, the program processor causes the scenario processor to generate an event (S607), and the program processor executes the corresponding event handler (S608).

In the case where the result of the check in Step S605 is that the UOP event is not a menu call, it indicates that the UOP event is an event that is generated by operating a cursor key or the "Determination" key. In this case, the scenario processor determines whether or not the current time is within the user event validity period (S606). In the case where the current time is within the user event validity period, the scenario processor generates a user event (S607), and the program processor executes the corresponding event handler (S608).

The process returns to Step S602 again in the following cases and the above-described processes are repeated: the result of the check in Step S603 is that there is no UOP accepted; it is determined in Step S606 that the current time is not within the user event validity period; and after the event handler is executed in Step S608. Meanwhile, in the case where the result of the check in Step S602 is that the reproduction of the playlist has ended, the user event processes are forcefully terminated.

Figure 41:
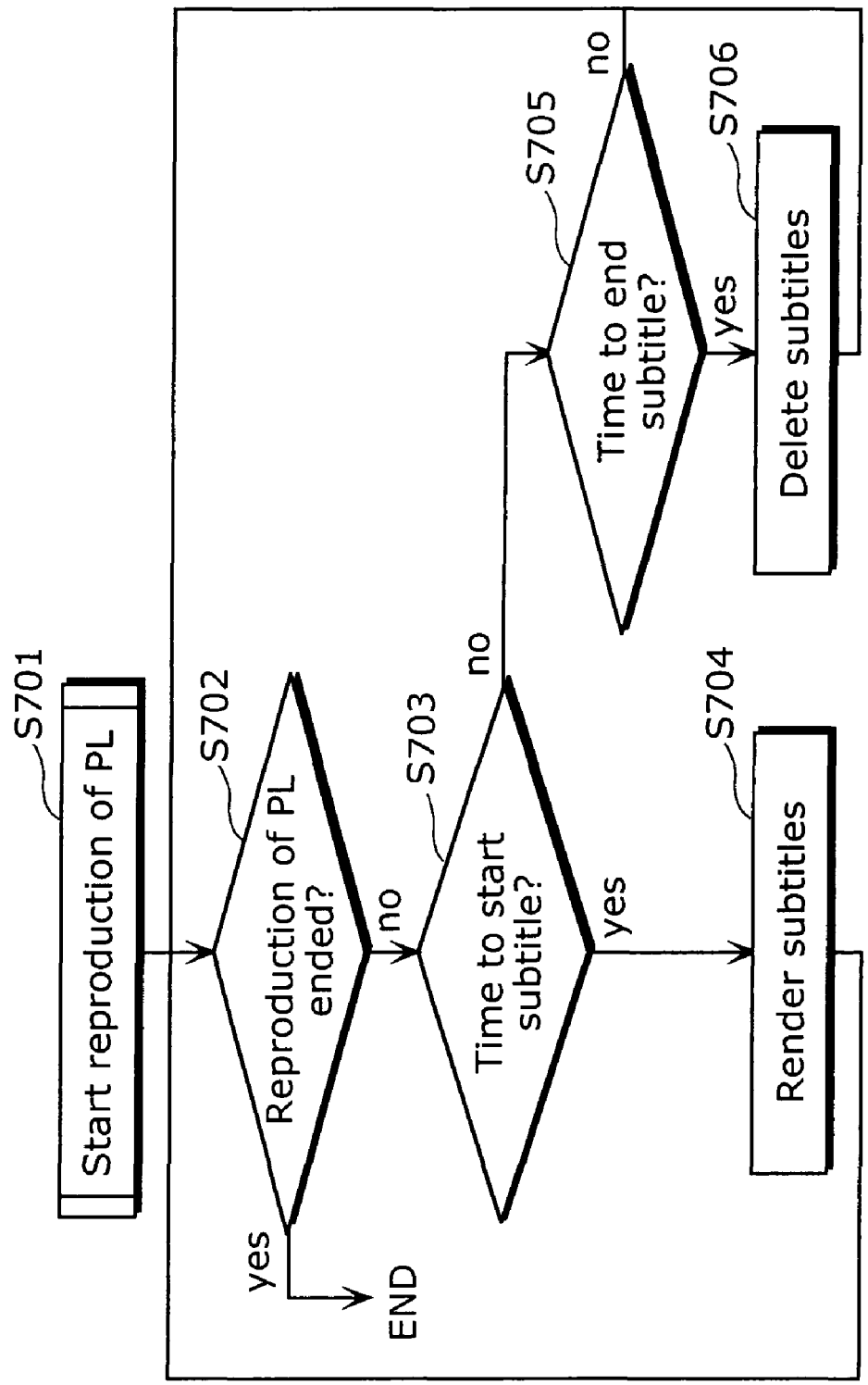
FIG. 41 is a flowchart showing subtitle processes.

FIG. 41 shows the flow of subtitle processes.

After the reproduction of the playlist starts (S701) and a step of checking whether or not the reproduction of the playlist has ended is performed (S702), the process proceeds to a step of checking whether or not the current time is the time to start the rendering of subtitles (S703). In the case where the current time is the time to start the rendering of subtitles, the scenario processor instructs the presentation controller to render subtitles, and the presentation controller instructs the image processor to render subtitles (S704). In the case where the result of the check in Step S703 is that the current time is not the time to start the rendering of subtitles, it is then checked whether or not the current time is the time to end the display of the subtitles (S705). In the case where the result of the check is that the current time is the time to end the display of the subtitles, the presentation controller instructs the image processor to delete the subtitles, and the image processor deletes the subtitles rendered on the image plane (S706).

The process returns to Step S702 in the following cases and the above-described processes are repeated: after the subtitle rendering performed in Step S704; after the subtitle deletion performed in Step S706; and the result of the check in Step S705 is that the current time is not the time to end the display of the subtitles. Meanwhile, in the case where the result of the check in Step S702 is that the reproduction of the playlist has ended, the subtitle processes are forcefully terminated.

Second Embodiment

Next, a description is given of the second embodiment of the present invention.

The second embodiment is a description for realizing a slideshow of still images by using the above-described application. Basically, the details of the second embodiment are based on the first embodiment. Thus, the second embodiment focuses on extended parts or differences.

<Reference to I Picture>

Figure 42:
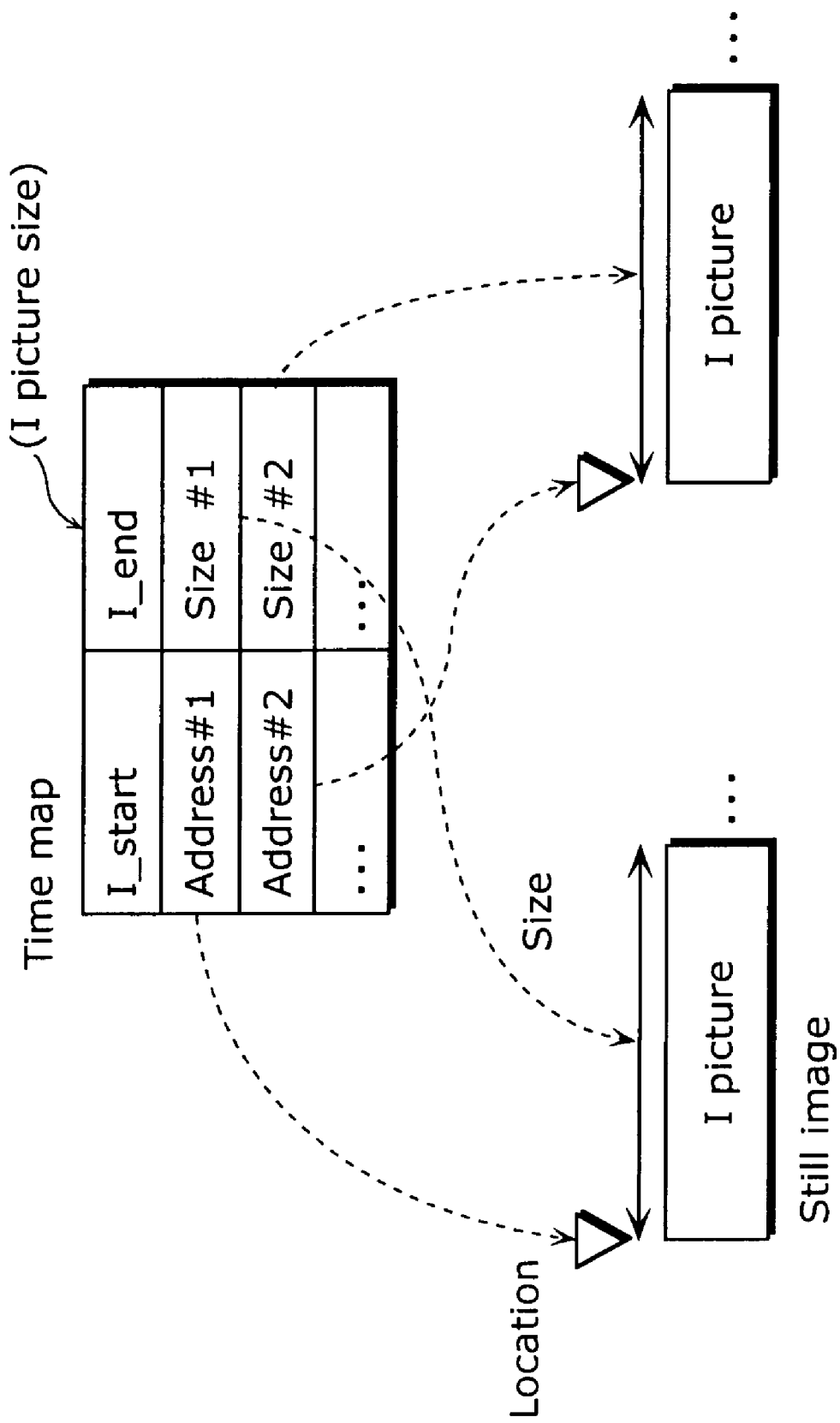
FIG. 42 is a diagram for describing a relationship between still images and the time map of the second embodiment.

FIG. 42 shows a relationship between a slideshow (still image application) and a time map. A slideshow is usually composed only of still images (I pictures). The time map includes the position and size information of still image data. When a certain still image is chosen, such single still image is to be displayed after extracting necessary data and sending it to the decoder. Usually, a slideshow is not necessarily displayed in order of images as in the case of a moving image, since their display order differs depending on a user interaction. In order to ensure that image display is performed from any images, I pictures, which are intra coded and can be decoded by themselves, are used.

However, in order to reduce the amount of data, it is also possible to realize a slideshow using P pictures, which are compressed with reference to I pictures, and using B pictures, which are compressed with reference to two or more forward/backward pictures.

Figure 43:
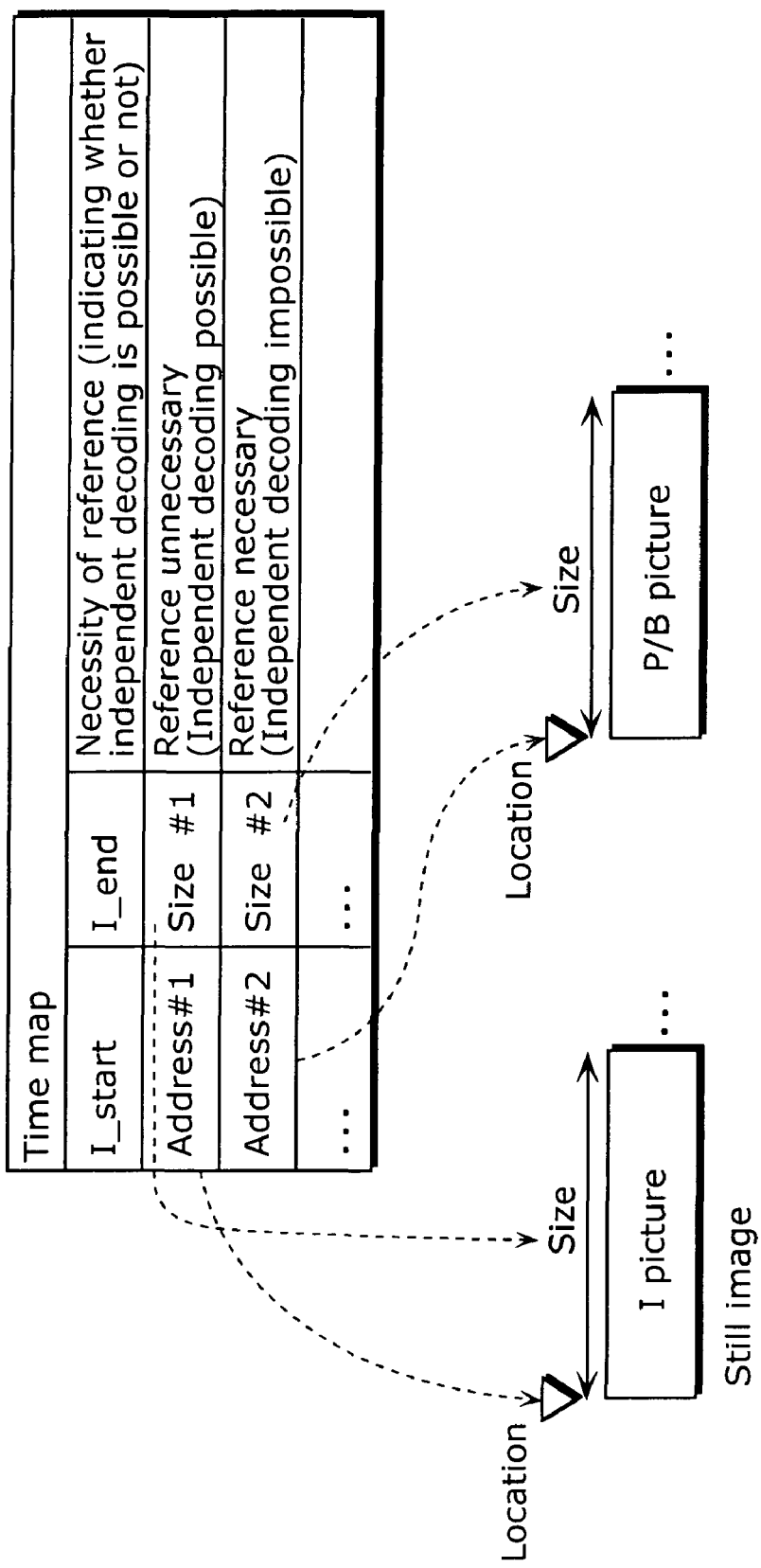
FIG. 43 is a diagram for describing a flag indicating whether or not a picture to be referred to is decodable.

However, P pictures and B pictures cannot be decoded without pictures they refer to. For this reason, a P picture or a B picture positioned in the middle cannot be decoded even when the reproduction is wished to be started from these pictures in response to a user interaction. In view of this, as shown in FIG. 43, a flag is provided indicating that a picture indicated in the time map is an I picture and that does not refer to any pictures. The reference to this flag makes it possible to know: that, in the case where a certain image does not require any reference images, or in other words, such image can be decoded by itself, it is possible to perform decoding and display, starting from such image regardless of its forward and backward images that are displayed; and that, in the case where a certain image requires a reference image, such image may not be displayed depending on its display order, since the image cannot be displayed unless its related images have been decoded prior to such image.

Figure 44:
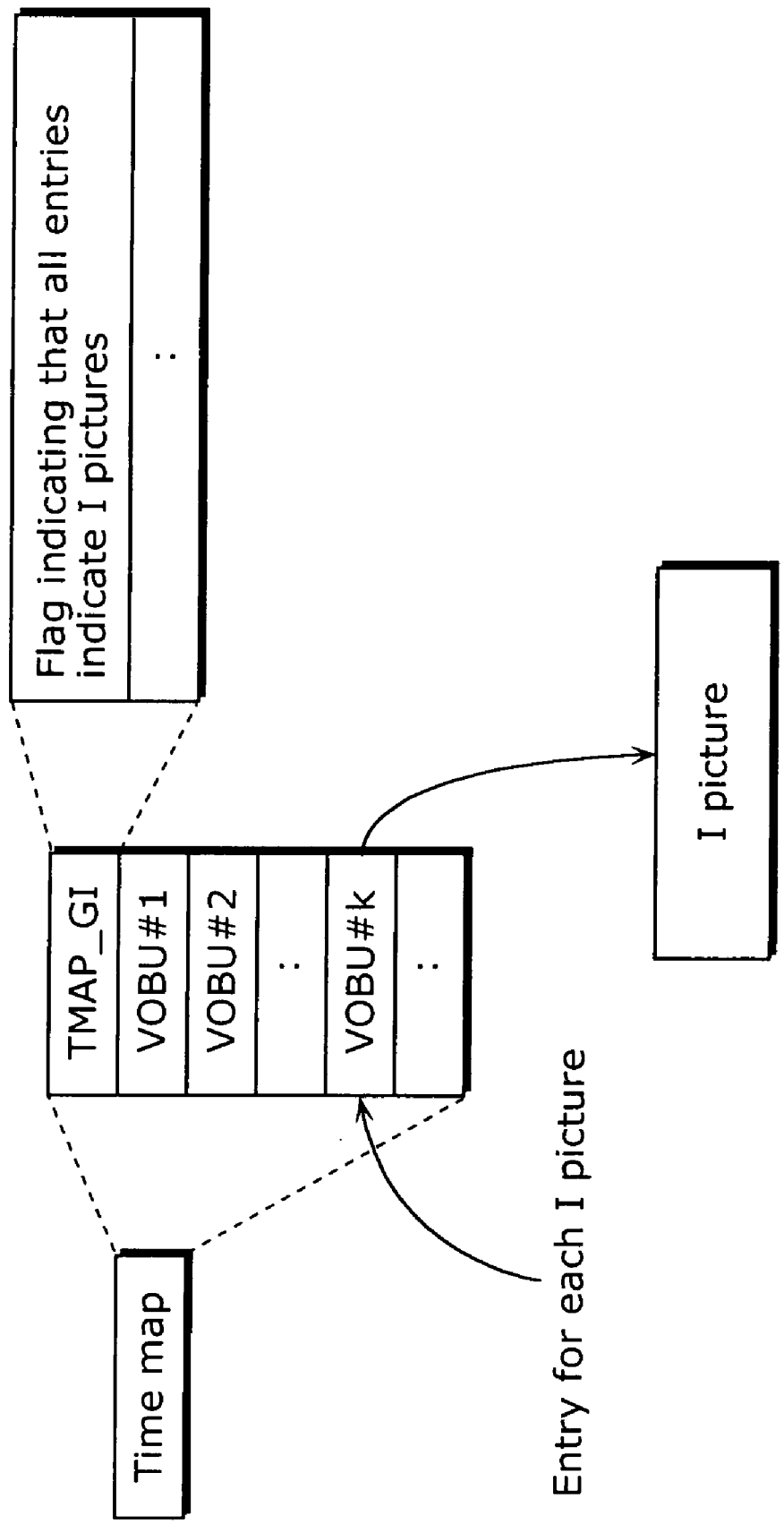
FIG. 44 is a diagram for describing a flag indicating that all entries refer to I pictures.

Note that all through the time map, flags indicating that pictures referred to from the time map are always I pictures, or in other words, that any picture can be decoded by itself, may be stored in the time map as shown in FIG. 44 or in a part of the related navigation information. In the case where such a flag is not set, an entry of the time map does not necessarily indicate an I picture, and thus there is no guarantee that the picture referred to is decodable.

Note that although the above description has been given using an I picture based on an MPEG-2 video stream, an Instantaneous Decoder refresh (IDR) picture may be used in the case of MPEG-4 AVC (also referred to as H.264 or JVT). Moreover, an I picture other than an IDR picture or even an image in another format may be used and can be applied with ease, as long as such image can be decoded by itself.

<Guarantee for Reference of all I Pictures>

Figure 45:
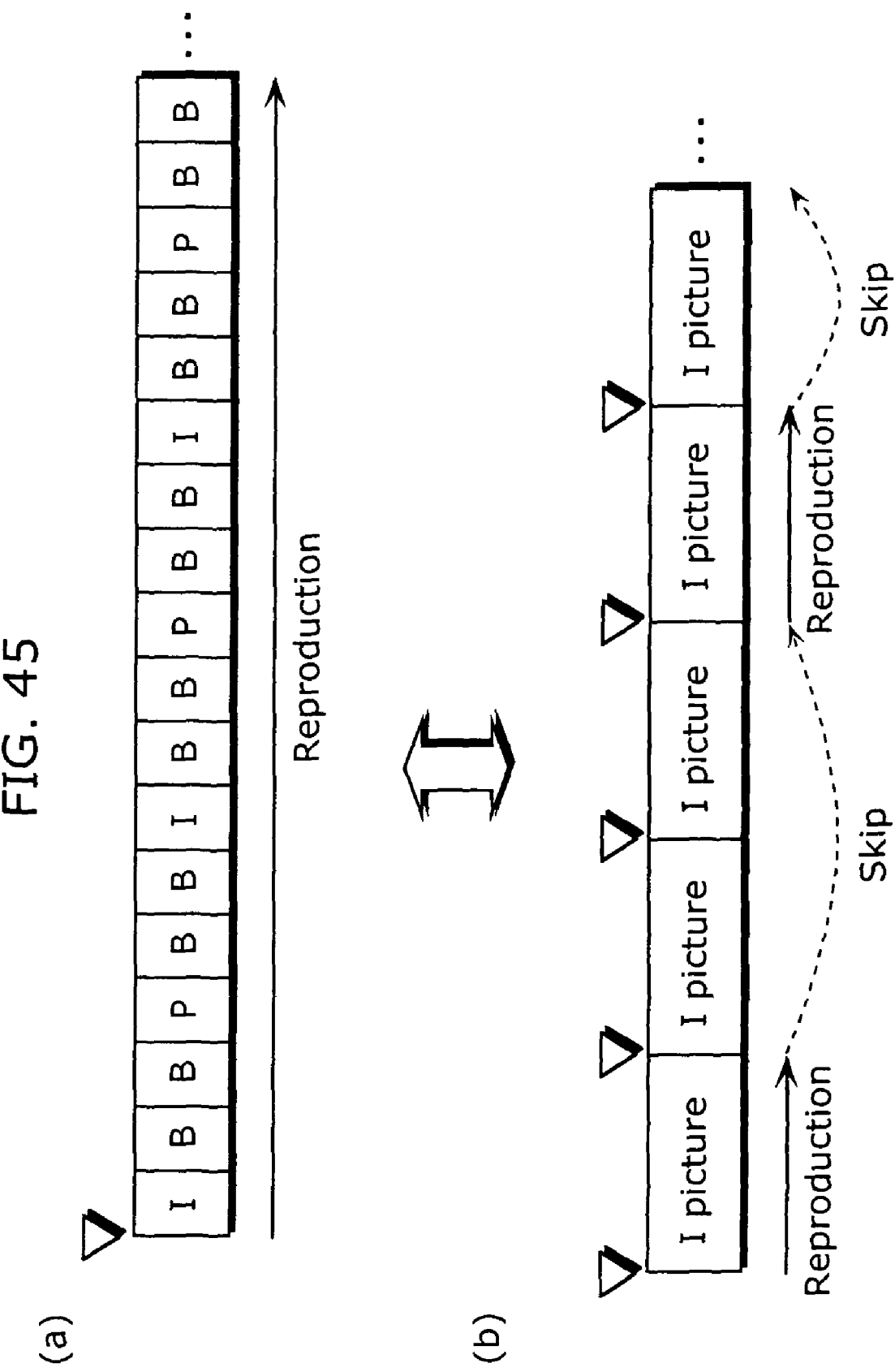
FIG. 45 is a diagram for describing a difference between a moving image application and a slideshow.

FIG. 45 shows a difference between a moving image application and a still image application (a slideshow). As shown in (a) in FIG. 45, in the case of the moving image application, once the reproduction starts, the subsequent pictures are to be sequentially decoded. Therefore, it is not necessary to set reference made from the time map to all I pictures and it suffices if an entry of the time map is set only at least at a point from which the reproduction is wished to be started.

(b) in FIG. 45 shows an example of a slideshow. In the case of the slideshow, it is necessary to display still images without displaying the forward and backward video independently of their order, in response to a user operation such as a skip operation. For this reason, data of I pictures to be displayed cannot be outputted to the decoder without actually analyzing the whole stream, unless entries are registered in the time map for all I pictures. This results in poor efficiency. If there is an entry in the time map for each I picture, it is possible to make a direct access only to the data of necessary I pictures so as to read such data and output it to the decoder. This results in a favorable access efficiency as well as in a favorable efficiency since a shorter length of time is required before the pictures are displayed.

If it can be identified that entries exist for all I pictures, it is possible to know the scope of data to be read out by referring to the corresponding entry in the time map when making an access to any I picture. Accordingly, there is no need for making unnecessary analysis of the forward and backward pictures.

In the case where it is not guaranteed that entries exist for all I pictures and where an I picture not registered in the time map is specified to be displayed, it is necessary to extract necessary data while analyzing its forward and backward pictures in the stream. This results in poor access efficiency and poor efficiency since it takes time until pictures are displayed.

Figure 46:
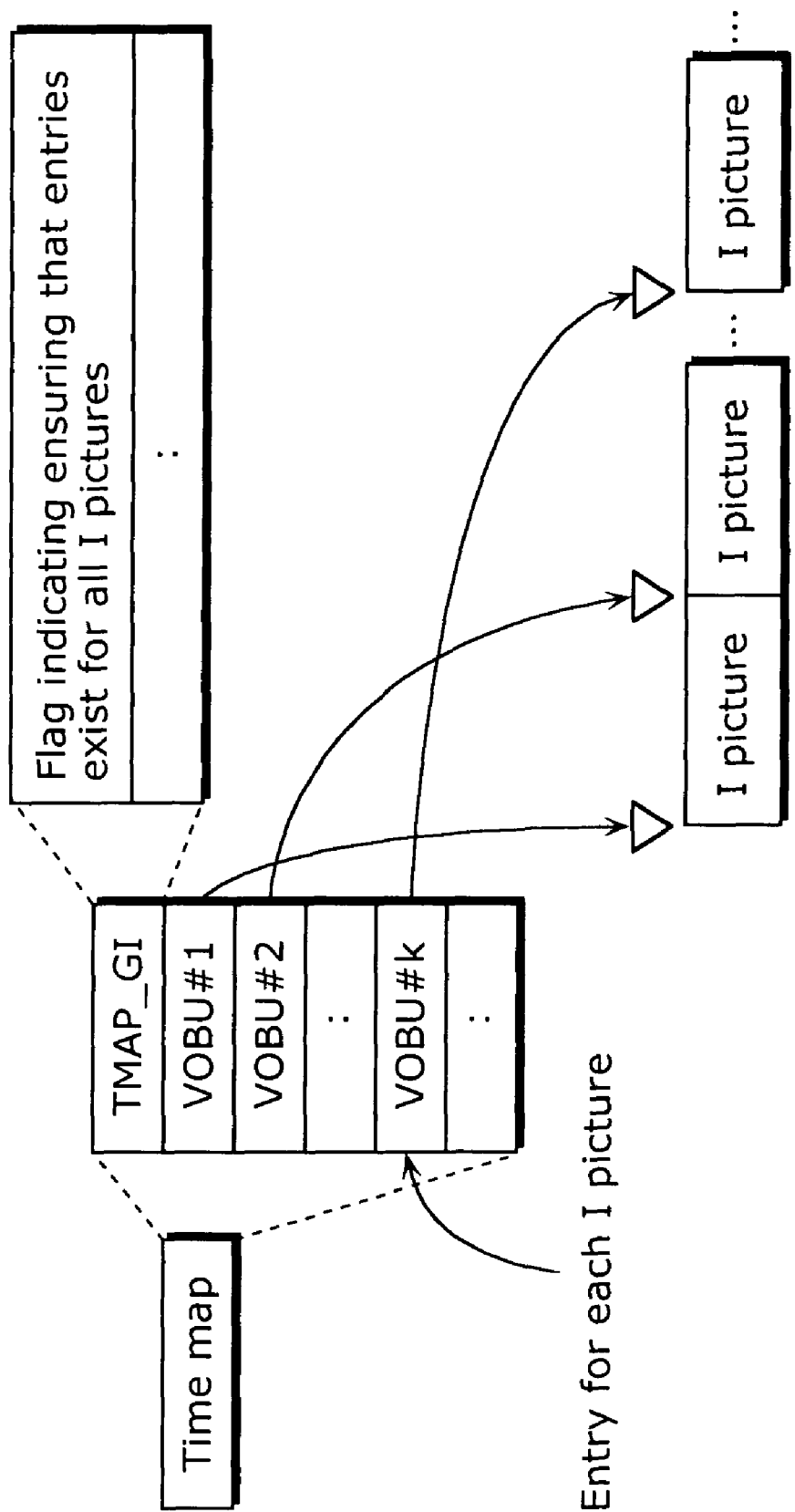

In view of this, by providing a flag indicating whether or not there is a guarantee that all I pictures are referred to from the time map as shown in FIG. 46, it becomes possible to identify whether or not the analysis of the forward and backward pictures in the stream is necessary by analyzing the static data, and thus such a flag is effective.

Note that such a flag is effective not only for a still image application such as a slideshow but also for a moving image application and that such a flag can serve to guarantee that reproduction can be started from any I picture.

Third Embodiment

The second embodiment has described that MPEG-4 AVC can be used as an encoding scheme to implement a still image application. Still images in compliance with the MPEG-4 AVC are specified as AVC Still Pictures not in MPEG-4 AVC standard itself but in an extension standard for MPEG-4 AVC in the MPEG-2 system (ISO/IEC13818-1Amendment3). However, since the MPEG-2 system standard does not specify a method for reproducing still images, it is necessary to additionally specify their reproducing method in order to use them in a still image application. The present embodiment describes a data structure of still images and a display method therefor for applying MPEG-4 AVC to a still image application.

Figure 47:
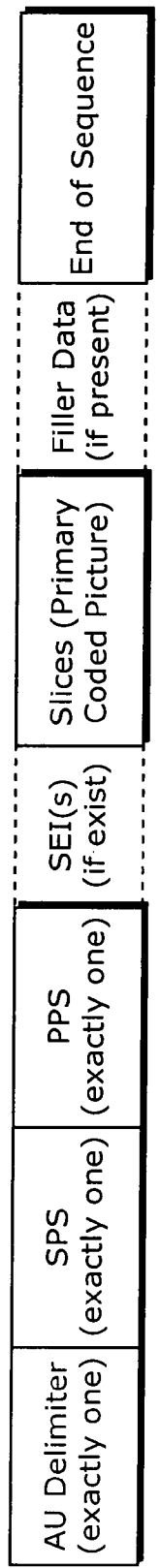
FIG. 47 is a diagram showing a data structure of a still image in compliance with MPEG-4 AVC according to a third embodiment.

It is specified that AVC Still Pictures in the MPEG-2 system standard include: an IDR picture; a Sequence Parameter Set (SPS) referred to by the IDR picture; and a Picture Parameter Set. FIG. 47 shows a data structure of a still image in compliance with MPEG-4 AVC (hereinafter referred to as an AVC still image) according to the present embodiment. Each box in the drawing shows a Network Abstraction Unit (NAL unit). The AVC still image shall include a NAL unit of END of Sequence without fail. Since End of Sequence is identification information which indicates the end of a sequence in MPEG-4 AVC, it is possible to define a unique display method for AVC still images, which is not defied by the MPEG-4 AVC standard, by placing a NAL Unit of End of Sequence that marks the end of the sequence. Here, it is assumed that the order in which each NAL unit appears is specified by the order defined by the MPEG-4 AVC standard.

Figure 48:
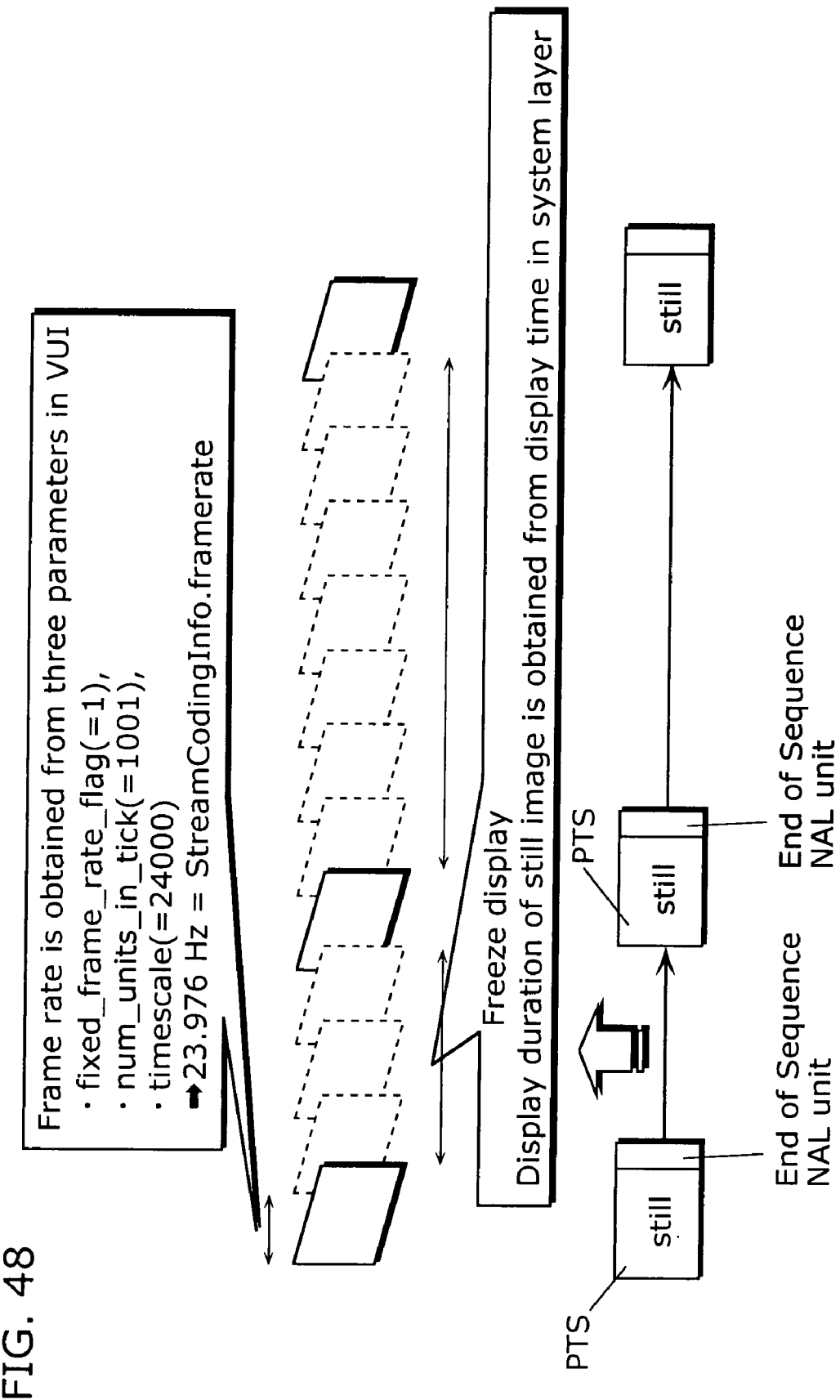
FIG. 48 is a diagram for describing a reproduction method for still images in compliance with MPEG-4 AVC.

Next, referring to FIG. 48, a method for displaying AVC still images is described. In a still image application, it is necessary to specify the display time of a still image and the display duration of a still image. The display time (Presentation Time Stamp: PTS) of an AVC still image is obtained from a time map or from the header of a Packetized Elementary Stream (PES) packet. Here, in the case where the display times of all still images are indicated in the time map, it is possible to obtain display times by reference only to the time map. During a period of time from the display time of the Nth AVC still image to the display time of the N+1th AVC still image, the display of the Nth AVC still image is frozen, or in other words, the Nth AVC still image is repeatedly displayed.

When AVC still images are reproduced, it is desirable to be able to obtain the frame rate from the data of the AVC still images. According to MPEG-4 AVC, it is possible to indicate the display rate of a moving image stream as Video Usability Information (VUI) in an SPS. More specifically, reference is made to the following three fields: num_units_in_tick, time_scale, and fixed_frame_rate_flag. Here, time_scale indicates a time scale. time_scale of a clock that operates at 30000 Hz can be represented, for example, as 30000. num_units_in_tick is a basic unit that indicates the time at which a clock operates. For example, assuming that num_units_in_tick of a clock whose time_scale is 30000 is 1001, it is possible to show that the fundamental period at which the clock operates is 29.97 Hz. Furthermore, by setting fixed_frame_rate_flag, it is possible to show that the frame rate is fixed. In MPEG-4 AVC, the use of these fields makes it possible to show a difference value between the display times of consecutive two pictures. In the present embodiment, these fields are used to show the frame rate at which an AVC still image is repeatedly displayed. First, by setting 1 to fixed_frame_rate_flag, that the frame rate is fixed is shown. Next, in the case of setting the frame rate to 23.976 Hz, num_units_in_tick is set to 1001, and time_scale is set to 24000, for example. In other words, both of these fields are set so that the frame rate=time_scale/num_units_in_tick. Furthermore, in order to ensure the existence of a VUI and the above three fields in the VUI, both vui_parameters_present_flag in the SPS and timing_info_present_flag in the VUI are set to 1. In the case where the Nth AVC still image is the last AVC still image, the display thereof shall be frozen until there is a user operation or the next operation or the like predetermined by a program starts. Note that a method for setting the frame rate is not limited to the use of time_scale/num_units_in_tick. In the case of a moving image stream in compliance with MPEG-4 AVC, for example, time_scale/num_units_in_tick indicates a field rate (parameter indicating intervals at which fields are displayed), and thus the frame rate is indicated by time_scale/num_units_in_tick/2. Thus, the frame rate of still images may be set as time_scale/num_units_in_tic/2.

The frame rate that is indicated according to the above method shall match the frame rate value indicated in the BD management information. More specifically, the frame rate shall match the value indicated by the frame_rate field in SteamCodingInfo.

Note that it is possible to obtain the display period at which an AVC still image is repeatedly displayed from the frame rate that is indicated according to the above method. Such display period may be set as an integral multiple of a frame grid or a field grid. This ensures synchronized reproduction with an other video source such as video and graphics. Here, the frame grid or field grid is generated based on the frame rate of a specified stream such as video. Furthermore, the difference value between the display times of the Nth AVC still image and the N+1th AVC still image may be set as an integral multiple of a frame grid or a field grid.

The time map of the second embodiment is used as a time map to be referred to at the time of reproducing AVC still images.

In addition, in the BD-ROM format and the like, these fields may be omitted by specifying the default values of num_units_in_tick, time_scale, and fixed_frame_rate_flag.

It is prohibited to change the resolution within a stream in the case of a video stream. However, in the case of a still image stream, it may be allowed to change the resolution within a stream since buffer management can be carried out in a decoding operation without any problems even if the resolution is changed. Here, the resolution is indicated in a field within the SPS.

Note that the data structure and the reproduction method of the present embodiment are applicable also to an encoding scheme other than that of MPEG-4 AVC in the case such encoding scheme employs a similar data structure.

Fourth Embodiment

The second embodiment and third embodiment have described that MPEG-4 AVC can be used as an encoding scheme for implementing a still image application. The fourth embodiment describes an information storage medium and a reproduction apparatus therefor which are capable of encoding a still image into a high-quality image while reducing the amount of processing to be performed at the time of reproducing a moving image in a package medium such as a BD-ROM.

First, a description is given of a conventional information storage medium. MPEG-4 AVC specifies the maximum value for the number of bits of a picture. An application specification such as that for BD uses, as the upper limit value of the number of bits of a picture, the value specified by MPEG-4 AVC or the value uniquely set in the application. It is possible to control the upper limit value using a parameter known as a Minimum Compression Ratio (MinCR) specified by the MPEG-4 AVC standard. MinCR is a parameter which indicates the lower limit of a compression ratio of an encoded picture with respect to the original image. For example, when MinCR is 2, it indicates that the number of bits of an encoded picture is half the size of the original image or smaller.

In the conventional information storage medium, the same MinCR values are used for both a moving image application and a still image application. The amount of processing to be performed at the time of decoding encoded data is large in the case of a moving image. Therefore, MinCR is determined so that an operation is ensured particularly in the worst case scenario where the amount of operations to be performed at the time of decoding one picture becomes the upper limit value specified by a standard. In the case of still images, on the other hand, image quality is of more importance than the amount of processing performed at the time of decoding since a display interval of still images is longer than that of a moving image. However, due to the fact that the number of bits increases as a result of encoding a still image into a high-quality image, there has been a problem with the conventional information storage medium, which uses the same MinCR values for still images and a moving image, the problem being that a sufficient number of bits cannot be assigned to a picture especially at the time of intra encoding.

The information storage medium of the fourth embodiment applies different MinCR values to a moving image and still images; a larger MinCR value is set for a moving image in consideration of the amount of processing performed at the time of decoding, and a MinCR value smaller than that for the moving image is set for still images in order to ensure that an encoded picture has the picture size which is sufficient as a high-quality picture.

Figure 49:
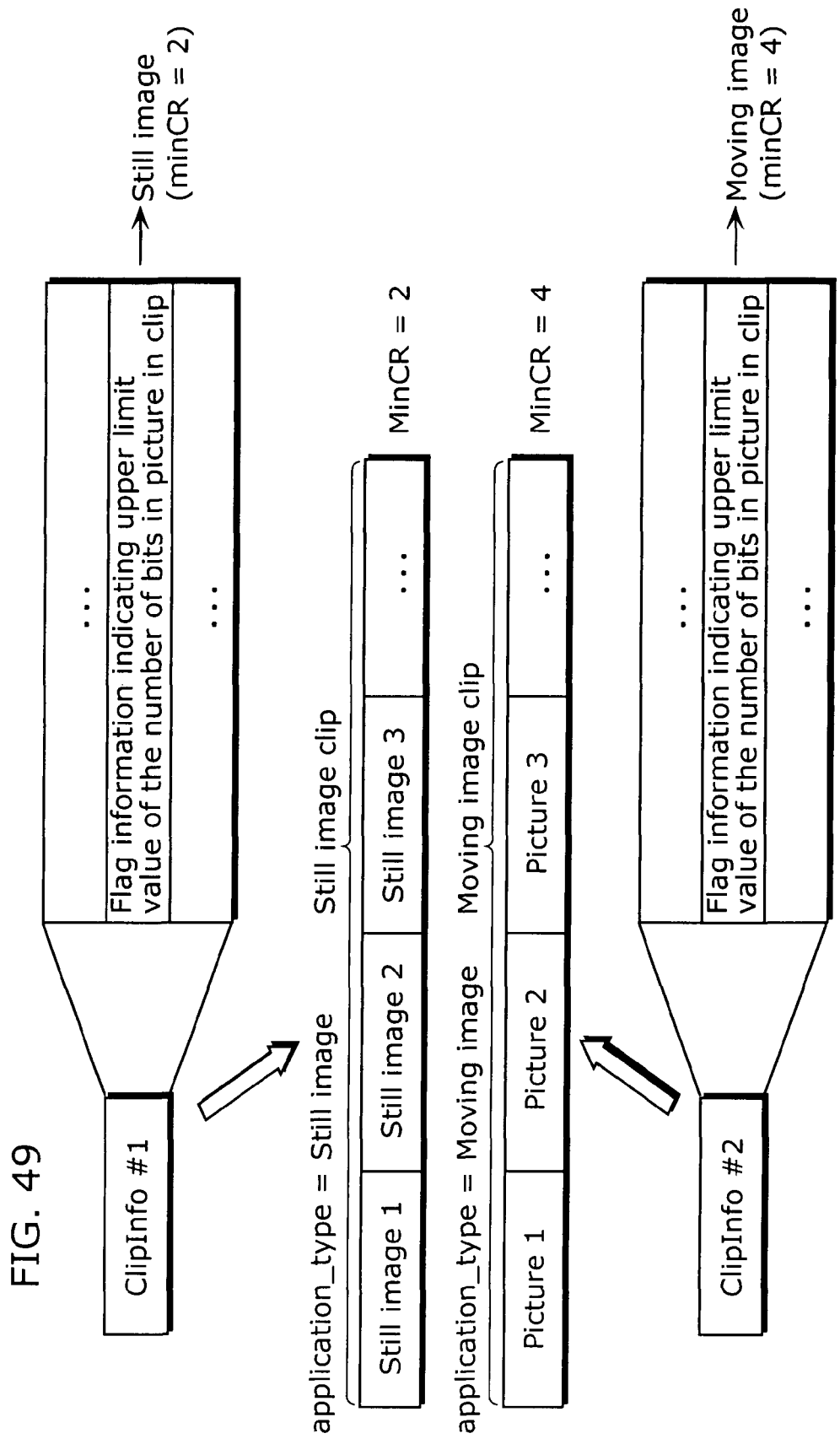
FIG. 49 is a diagram for describing a flag indicating that a specified MinCR value is applied to a clip as well as describing a data structure.

FIG. 49 shows an example data structure of the information storage medium of the fourth embodiment. In the stream management information in the BD management information, attribute information of a clip is indicated in a data object known as ClipInfo. Note that a clip refers to an AV data file. For example, one file storing an MPEG-4 AVC still image stream is one clip. In order to indicate that different MinCR values are applied to a moving image and still images, information indicating the MinCR value of each clip is required. Therefore, information indicating the MinCR value to be applied to a clip to be referred to, is added to ClipInfo. Here, the MinCR value to be applied to a clip is indicated by storing flag information that indicates whether a clip to be referred to is a moving image clip or a still image clip, on the assumption that MinCR values to be applied to a still image clip and a moving image clip are determined in advance. Referring to an example in FIG. 49, at least a still image clip and a moving image clip are stored on the disc, and these clips are referred to from ClipInfo#1 and ClipInfo#2, respectively. Here, flag information indicating that the clip is a still image clip is stored in ClipInfo#1 and flag information indicating that the clip is a moving image clip is stored in ClipInfo#2. By referring to such flag information, it is possible to obtain the MinCR value of pictures making up a clip. In an example shown in FIG. 49, it is possible to achieve both the improvement in the quality of still images and the reduction in the amount of processing performed at the time of decoding a moving image, by setting 2 as MinCR of the still image clip and setting 4 as MinCR of the moving image clip. Note that the MinCR values used here are only examples, and thus a combination of other values may be used. In an application which allows the reproduction apparatus to spend additional processing amount, the same MinCR value may be used for still images and a moving image. Furthermore, MinCR values may also be indicated by preparing plural combinations of MinCR values for still images and a moving image and by employing a parameter that indicates a specified one of the combinations. Moreover, in the case where it is indicated that a clip is a still image clip, it may be ensured that an interval at which two consecutive pictures are decoded or displayed is equal to or greater than a predetermined value. For example, in the case of still images, consecutive two pictures may be displayed at an interval of 0.5 seconds or greater. This can ensure the decoding of each picture even if the MinCR value is 2 and the number of bits per picture is large, since a long display interval of 0.5 seconds or greater is provided.

Note that there exists in ClipInfo a field known as application_type, which indicates the type of an application for reproducing a clip. This field can indicate whether the application is for a moving image or still images, and when the application is for still images, this field can indicate whether the application is a time-based application or a browsable application. Here, "time-based" indicates that still images are displayed at a predetermined interval, and "browsable" indicates that the user can determine the timing for displaying still images through this application. Therefore, in the case where the field value of application_type indicates time-based or browsable still image application, a MinCR value for still images may be applied, whereas in the case where the field value indicates a moving image application, a MinCR value for a moving image may be applied.

Note that MinCR values may be switched not only between a moving image and still images, but also between clips of different moving images. For example, in the case where main video and sub video are included, it is possible to set a smaller MinCR value for the main video so as to encode it into high-quality video, and to set a larger MinCR value for the sub video in consideration of the amount of processing. In this case, information indicating the MinCR values of the respective clips is used as information indicating the respective MinCR values, rather than using flag information indicating whether images are still images or a moving image.

Note that the parameter that indicates the upper limit of the number of bits of a moving image or a still image is not limited to MinCR, and thus an other parameter may be used such as by directly indicating the upper limit value for the number of bits as data size.

Also note that the information indicating the upper limit value of the number of bits of a picture in a clip may either be stored in BD management information other than ClipInfo or may be stored in encoded data. In the case of storing the information in encoded data, such information can be stored for each random access unit such as a Group Of Picture (GOP). In the case of MPEG-4 AVC, for example, it is possible to utilize a data unit of storing user data. The data unit for user data storage includes: a Network Abstraction Layer (NAL) unit with a specific type; a Supplemental Enhancement Information (SEI) message for storing user data; and the like. Furthermore, the upper limit value of the number of bits of a picture may be switchable in a unit other than a clip, such as a random access unit.

Also note that when it is determined, at the time of decoding a moving image, that the time required to decode the encoded data of one picture exceeds a predetermined length of time or a picture display interval, some data reproduction apparatuses skip the decoding of such picture and start decoding the next picture. Alternatively, even in the case where it is possible to support the worst case scenario at the time of decoding, the decoding of a still image is consequently skipped in some cases at the time of reproducing still images stored in the information storage medium of the present embodiment. This is because the upper limit of the number of bits of still images becomes larger than that of a moving image and the time required for decoding increases in relation to an increase in the number of bits. The display interval of still images is usually longer than that of a moving image. Therefore, even when decoding has not completed until a predetermined display start time, degradation in reproduction quality can be limited to small by displaying still images after the decoding thereof completes. Thus, at the time of decoding still images, even in the case where decoding thereof has not completed by a predetermined display start time, they only have to be displayed after decoding thereof completes, without skipping decoding thereof.

Note that although the above description is given for the BD, the same method can be used for an information storage medium as long as such information storage medium is capable of storing still images and moving images. Also, the encoding scheme is not limited to MPEG-4 AVC, and thus the present invention is applicable to another encoding scheme such as MPEG-2 Video.

Fifth Embodiment

Figure 50:
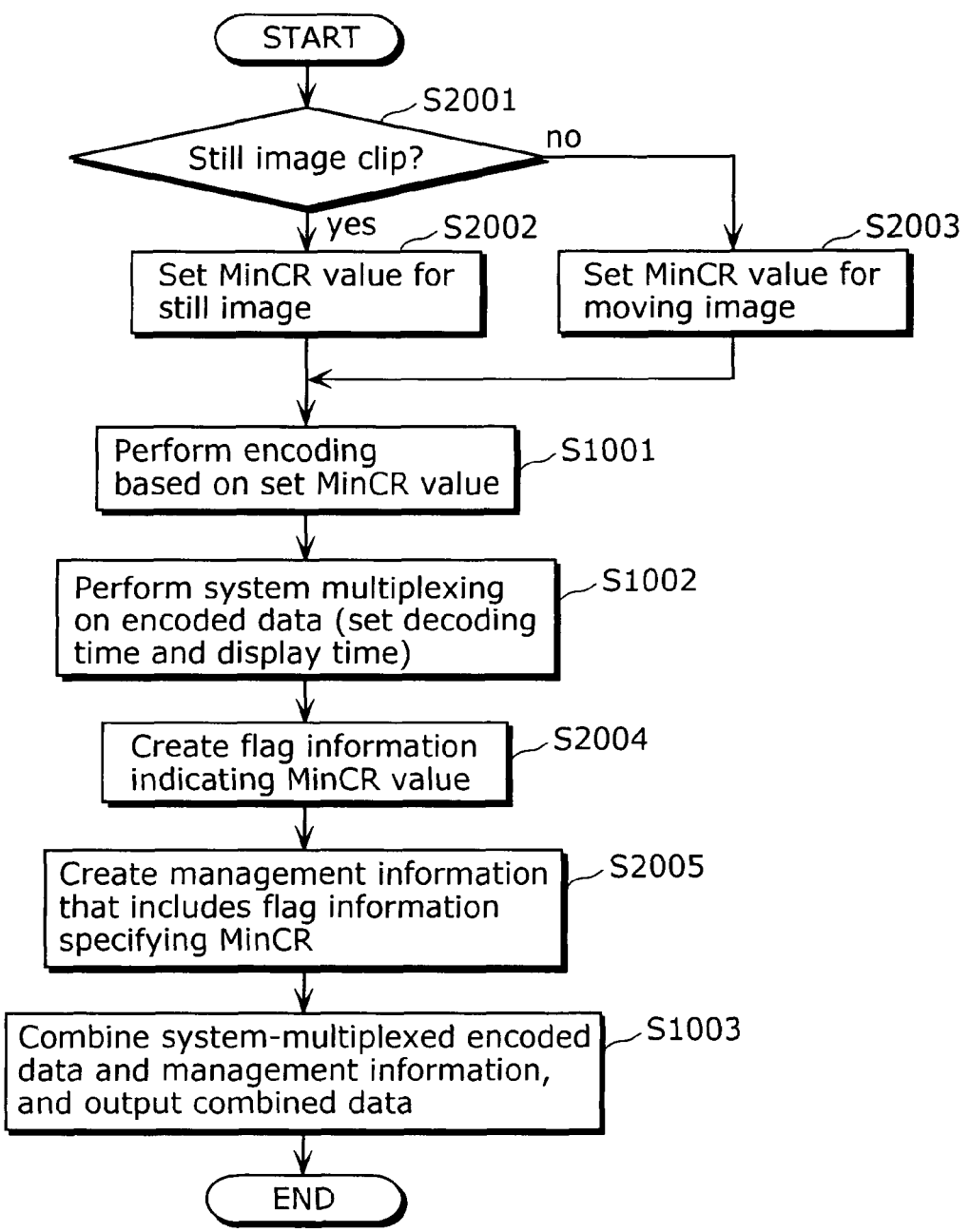
FIG. 50 is a flowchart showing operations of a multiplexing method of a fifth embodiment.

FIG. 50 is a flowchart showing a multiplexing method for creating data stored in the information storage medium of the fourth embodiment. The multiplexing method of the present embodiment is different from a conventional multiplexing method in that the multiplexing method of the present embodiment includes a step of switching between MinCR values depending on the type of a clip (Step S2001, Step S2002 and Step S2003) and a step of preparing flag information that identifies a MinCR value and incorporating it into management information (Step S2004 and Step S2005).

First, in Step S2001, it is determined whether a clip to be generated is a moving image clip or a still image clip. In the case where the clip is a still image clip, the process proceeds to Step S2002 so as to set a predetermined MinCR value for still image clip, whereas in the case where the clip is a moving image clip, the process proceeds to Step S2003, and a predetermined MinCR value for moving image clip is set. Next, in Step S1001, pictures making up the clip are encoded in a manner that the MinCR value set in Step S2002 or in Step S2003 is satisfied, and the process proceeds to Step S1002. In Step S1002, the data encoded in Step S1001 is system-multiplexed. In the BD, an MPEG-2 transport stream is used as a system multiplexing scheme. Next, in Step S2004, flag information is generated that identifies the MinCR value applied to the pictures making up the clip, and in Step S2005, management information is generated that includes the flag information generated in Step S2004. Finally, in Step S1003, the management information and the system-multiplexed encoded data are combined and the resultant data is outputted. The information that identifies the MinCR value may be other than the flag information, and thus it is possible to directly store the upper limit value of the number of bits of a picture Note that it is possible to multiplex data such as audio and graphics with a moving image or still images, but a description for it is not given here.

Figure 51:
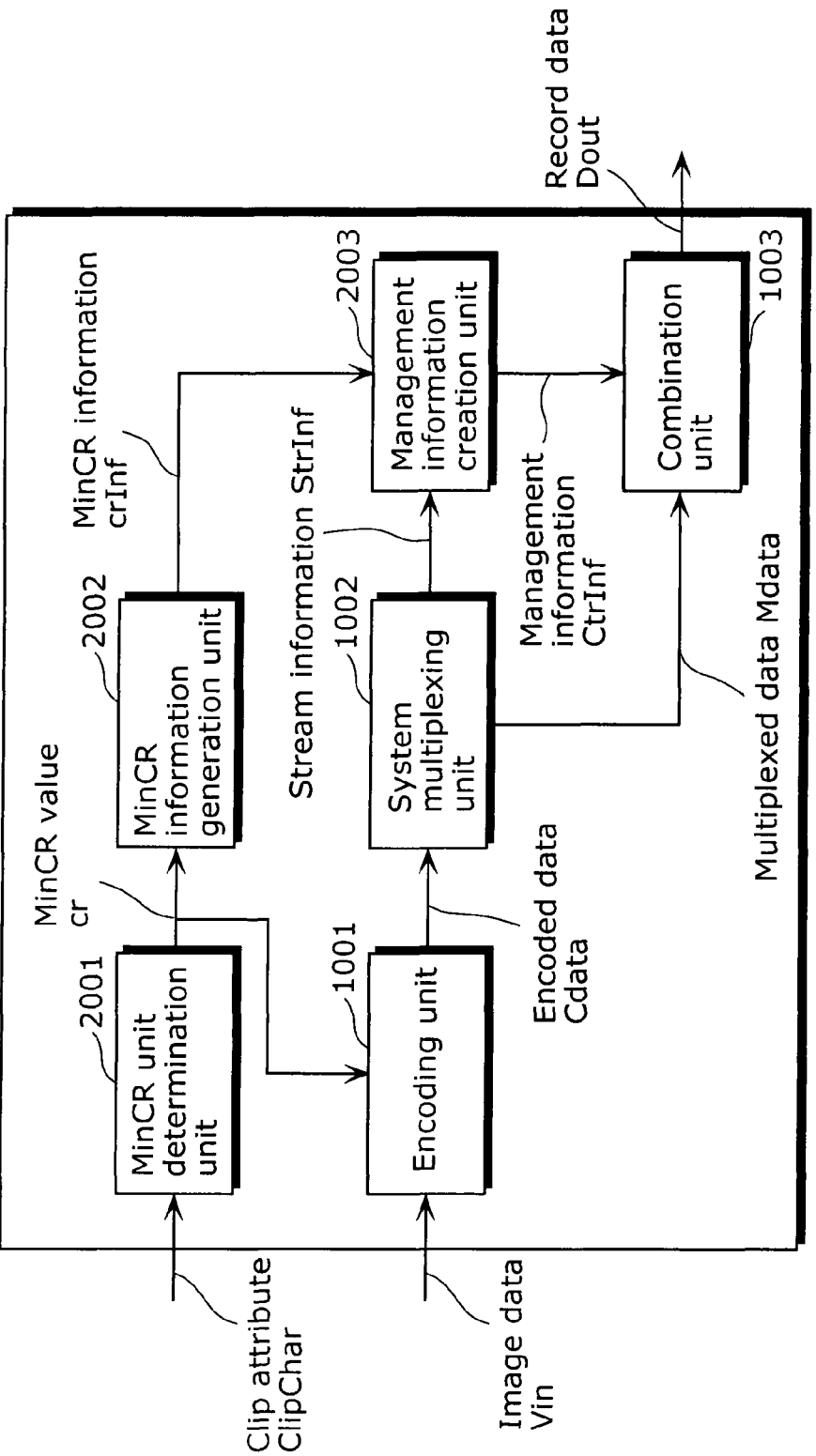
FIG. 51 is block diagram showing a structure of a multiplexing apparatus.

FIG. 51 is block diagram showing the structure of a multiplexing apparatus 2000 that realizes the multiplexing method of the fifth embodiment. The multiplexing apparatus 2000 includes a MinCR determination unit 2001, a MinCR information generation unit 2002, an encoding unit 1001, a system multiplexing unit 1002, a management information creation unit 2003, and a combination unit 1003. The multiplexing apparatus 2000 is different from a conventional multiplexing apparatus in that the multiplexing apparatus 2000 includes the MinCR determination unit 2001 and the MinCR information creation 2002, and in that the management information creation unit 2003 creates management information that includes flag information for identifying a MinCR value.

Next, a description is given of an operation of each of the units. The MinCR determination unit determines a MinCR value to be applied to pictures making up a clip, based on a clip attribute ClipChar indicating whether the clip is a moving image clip or a still image clip, and inputs the determined MinCR value cr into the encoding unit 1001 and the MinCR information generation unit 2002. The encoding unit 1001 encodes an input moving image or image data Vin based on the MinCR value cr determined by the MinCR determination unit, and inputs the encoded data Cdata into the system multiplexing unit 1002. The system multiplexing unit 1002 system-multiplexes the encoded data Cdata and inputs the resulting multiplexed data Mdata into the combination unit 1003. Meanwhile, the MinCR information creation unit creates MinCR information crInf, which is flag information for identifying the MinCR value applied to the pictures making up the clip, based on the MinCR value, and inputs the resulting information into the management information creation unit 2003. The management information creation unit obtains, from the system multiplexing unit 1002, stream information StrInf used to generate management information of the multiplexed data Mdata, creates the management information CtrInf that includes the MinCR information crInf, and outputs the created management information CtrInf to the combination unit 1003. The combination unit 1003 combines the management information CtrInf and the multiplexed data Mdata, and outputs the resulting data as record data Dout. Here, the encoding unit 1001 may set the lower limit of an interval at which consecutive two pictures are decoded or displayed, based on the type of the clip or the MinCR value.

The generation of encoded data, and the system multiplexing or the creation of management information are performed by separate apparatuses in the case of creating data by use of an authoring tool. Even in this case, however, the operations of the respective apparatuses may be designed to be the same as the respective units in the multiplexing apparatus 2000.

Sixth Embodiment

Furthermore, if a program for realizing the information storage medium as well as the reproduction method and storage medium therefor as presented in each of the aforementioned embodiments is stored on a storage medium such as a flexible disk, it becomes possible to easily perform the processes presented in the respective embodiments in an independent computer system.

Figure 52A:
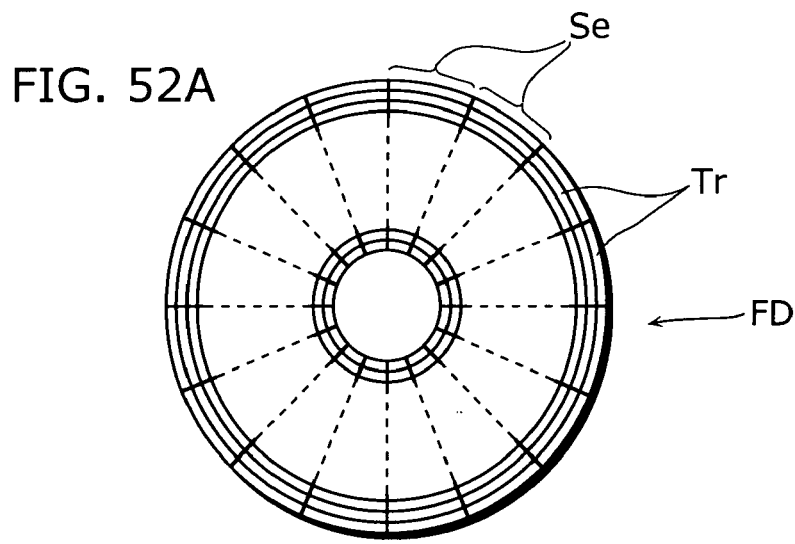
FIG. 52A shows an example physical format of a flexible disk as a storage medium itself of a sixth embodiment.
Figure 52B:
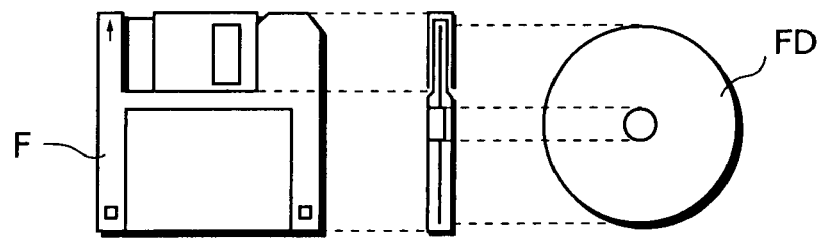
FIG. 52B shows an external view of the flexible disk viewed from the front, its schematic cross-sectional view, and the flexible disk itself.
Figure 52C:
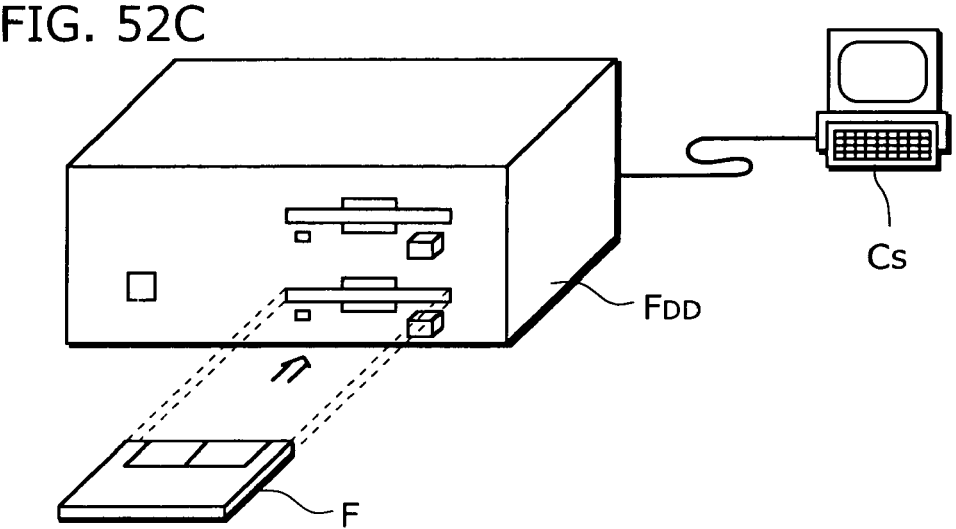
FIG. 52C shows a structure required for storing and reading out the program on and from the flexible disk FD.

FIG. 52A to FIG. 52C are diagrams illustrating the case where the reproduction method and storage method of each of the above embodiments are performed in a computer system, using a program stored on a storage medium such as a flexible disk.

FIG. 52B shows an external view of the flexible disk viewed from the front, its schematic cross-sectional view, and the flexible disk itself, while FIG. 52A illustrates an example physical format of the flexible disk as a storage medium itself. The flexible disk FD is contained in a case F, and a plurality of tracks Tr are formed concentrically on the surface of the flexible disk in the radius direction from the periphery, each track being divided into 16 sectors Se in the angular direction. Therefore, in the flexible disk storing the above-mentioned program, the above program is stored in an area allocated for it on the flexible disk FD.

Meanwhile, FIG. 52C shows the structure required for storing and reading out the program on and from the flexible disk FD. When the program realizing the reproduction method and storage method is to be stored onto the flexible disk FD, such program shall be written by the use of the computer system Cs via a flexible disk drive. Meanwhile, when the reproduction method and storage method realizing the reproduction method and storage method through the program stored in the flexible disk, is to be constructed in the computer system through the program in the flexible disk, the program shall be read out from the flexible disk via the flexible disk drive and then transferred to the computer system.

The above description has been given on the assumption that a storage medium is the flexible disk, but an optical disc may also be used. In addition, the storage medium is not limited to this, and any other media such as an IC card and a ROM cassette capable of storing a program may also be used.

Note that each functional block in the block diagram shown in the drawings including FIGS. 10, 18, 19, 23 and 51 can be realized typically as an LSI that is an integrated circuit. Such LSI may be incorporated in one or plural chip form (e.g., functional blocks other than memory may be incorporated into a single chip). Here, LSI is taken as an example, but it can be referred to as IC, system LSI, super LSI and ultra LSI depending on the integration degree.

The method of incorporating the functional blocks into an integrated circuit is not limited to the LSI, and it may be realized with a private line or a general processor. After manufacturing of LSI, a Field Programmable Gate Array (FPGA) that is programmable or a reconfigurable processor whose LSI allows reconfiguration of connection and setting of a circuit cell, may be utilized.

Furthermore, along with the arrival of technique for incorporating the functional blocks into an integrated circuit that replaces the LSI owing to a progress in semiconductor technology or another technique that has deviated from it, integration of the functional blocks may be carried out using the newly-arrived technology. Bio-technology may be cited as one of the examples.

Out of the functional blocks, only a unit which stores data may be constructed separately without being incorporated in a chip form, as in the case of the storage medium of the embodiments.

Note that in each functional block in the block diagrams such as those shown in FIGS. 10, 18, 19, 23, and 51 as well as in the flowcharts such as those shown in FIGS. 9, 11 to 15, 38 to 41, and 50, major parts may be implemented also as a processor or a program.

As described above, it is possible to use the image encoding method and image decoding method presented in the above-described embodiments in any of the apparatuses/systems described above, thereby achieving the effects described in the above-described embodiments.

The moving image encoding method according to the present invention is capable of eliminating delays at the time of decoding that are caused by switching between variable-length encoding schemes and capable of reducing processing load incurred by switching between buffer management methods, by employing a fixed variable-length encoding scheme for encoded data of a moving image in continuous reproduction units indicated by management information. Thus, the moving image encoding method according to the present invention is suited for use in a packaged medium and the like that stores multiplexed streams in which variable-length encoding schemes can be switched, such as a stream of MPEG-4 AVC.

The invention claimed is:

1. A moving image encoding method for encoding a moving image while switching between a context-adaptive variable-length coding scheme for adaptively coding according to a characteristic of the moving image, and a context-adaptive binary arithmetic coding scheme for adaptively coding according to a characteristic of the moving image, said method comprising:

determining, using a processor, a continuous unit of the moving image to be seamlessly and continuously reproduced without a gap, the determined continuous unit including reproduction segments;

generating, using the processor, a moving image stream by encoding, for each reproduction segment included in the determined continuous unit, the moving image according to one of the context-adaptive variable-length coding scheme and the context-adaptive binary arithmetic coding scheme;

generating, using the processor, management information that includes first flag information indicating, for each reproduction segment included in the determined continuous unit, whether one of the context-adaptive variable-length coding scheme and the context-adaptive binary arithmetic coding scheme has been used to encode the reproduction segments included in the continuous unit of the moving image; and outputting, using the processor, the moving image stream and the management information separately.

2. A moving image encoding apparatus that encodes a moving image while switching between a context-adaptive variable-length coding scheme for adaptively coding according to a characteristic of the moving image, and a context-adaptive binary arithmetic coding scheme for adaptively coding according to a characteristic of the moving image, said apparatus comprising:

a determination unit operable to determine a continuous unit of the moving image to be seamlessly and continuously reproduced without a gap, the determined continuous unit including reproduction segments;

an encoding unit operable to generate a moving image stream by encoding, for each reproduction segment included in the determined continuous unit, the moving image according to one of the context-adaptive variable-length coding scheme and the context-adaptive binary arithmetic coding scheme; and a generation unit operable to generate management information that includes first flag information indicating, for each reproduction segment included in the determined continuous unit, whether one of the context-adaptive variable-length coding scheme and the context-adaptive binary arithmetic coding scheme has been used to encode the reproduction segments included in the continuous unit of the moving image, and operable to output the moving image stream and the management information separately.

3. A moving image decoding method for decoding a moving image based on a moving image stream and management information, the moving image stream including other information and a moving image encoded while switching between a context-adaptive variable-length coding scheme for adaptively coding according to a characteristic of the moving image, and a context-adaptive binary arithmetic coding scheme for adaptively coding according to a characteristic of the moving image, said method comprising:

extracting, using a processor and from the management information for each reproduction segment of a continuous unit of the moving image to be seamlessly and continuously reproduced without a gap, first flag information indicating, for each reproduction segment included in the continuous unit of the moving image, whether one of the context-adaptive variable-length coding scheme and the context-adaptive binary arithmetic coding scheme has been used to encode the reproduction segments included in the continuous unit of the moving image, the management information being separate from the moving image stream;

determining, using the processor, to perform decoding using one of the context-adaptive variable-length coding scheme and the context-adaptive binary arithmetic coding scheme, when the first flag information is extracted by the extracting of the first flag information;

extracting, using the processor and from the moving image stream, second flag information indicating the one of the context-adaptive variable-length coding scheme and the context-adaptive binary arithmetic coding scheme according to which the reproduction segments included in the continuous unit of the moving image have been encoded; and seamlessly performing decoding without a gap, using the processor, at a connection between the reproduction segments of the continuous unit using the one of the context-adaptive variable-length coding scheme and the context-adaptive binary arithmetic coding scheme indicated by the second flag information, when the determining determines to perform decoding using one of the context-adaptive variable-length coding scheme and the context-adaptive binary arithmetic coding scheme.

4. A moving image decoding apparatus that decodes a moving image based on a moving image stream and management information, the moving image stream including other information and a moving image encoded while switching between a context-adaptive variable-length coding scheme for adaptively coding according to a characteristic of the moving image, and a context-adaptive binary arithmetic coding scheme for adaptively coding according to a characteristic of the moving image, said apparatus comprising:

a first extraction unit operable to extract, from the management information for each reproduction segment of a continuous unit of the moving image to be seamlessly and continuously reproduced without a gap, first flag information indicating, for each reproduction segment included in the continuous unit of the moving image, whether one of the context-adaptive variable-length coding scheme and the context-adaptive binary arithmetic coding scheme has been used to encode the reproduction segments included in the continuous unit of the moving image, the management information being separate from the moving image stream;

a determination unit operable to determine whether to perform decoding using one of the context-adaptive variable-length coding scheme and the context-adaptive binary arithmetic coding scheme, when the first flag information is extracted by the first extraction unit;

a second extraction unit operable to extract, from the moving image stream, second flag information indicating the one of the context-adaptive variable-length coding scheme and the context-adaptive binary arithmetic coding scheme according to which the reproduction segments included in the continuous unit of the moving image have been encoded; and a decoding unit operable to seamlessly perform decoding without a gap and at a connection between the reproduction segments of the continuous unit using the one of the context-adaptive variable-length coding scheme and the context-adaptive binary arithmetic coding scheme indicated by the second flag information, when the determination unit determines to seamlessly perform decoding using one of the context-adaptive variable-length coding scheme and the context-adaptive binary arithmetic coding scheme.

5. A recording method for recording separately (i) a moving image stream including a moving image encoded while switching between a context-adaptive variable-length coding scheme for adaptively coding according to a characteristic of the moving image, and a context-adaptive binary arithmetic coding scheme for adaptively coding according to a characteristic of the moving image and (ii) management information, in a computer-readable recording medium, said method comprising:

determining, using a processor, a continuous unit of the moving image to be seamlessly and continuously reproduced without a gap, the determined continuous unit including reproduction segments;

generating, using the processor, the moving image stream by encoding, for each reproduction segment included in the determined continuous unit, the moving image according to one of the context-adaptive variable-length coding scheme and the context-adaptive binary arithmetic coding scheme;

generating, using the processor, the management information including first flag information indicating, for each reproduction segment included in the determined continuous unit, whether one of the context-adaptive variable-length coding scheme and the context-adaptive binary arithmetic coding scheme has been used to encode the reproduction segments included in the continuous unit of the moving image; and recording, using the processor, the moving image stream and the management information in the recording medium separately.

6. A moving image decoding system, comprising:

a computer-readable recording medium having data recorded thereon, the data including (i) a moving image encoded while switching between a context-adaptive variable-length coding scheme for adaptively coding according to a characteristic of the moving image, and a context-adaptive binary arithmetic coding scheme for adaptively coding according to a characteristic of the moving image, (ii) a moving image stream including other information, and (iii) management information; and a moving image decoding apparatus which reads the data from the recording medium and performs decoding, wherein the data recorded in the recording medium includes:

the moving image;

the management information including first flag information indicating, for each reproduction segment included in a determined continuous unit of the moving image, whether one of the context-adaptive variable-length coding scheme and the context-adaptive binary arithmetic coding scheme has been used to encode reproduction segments included in the continuous unit of the moving image; and a moving image stream including second flag information indicating the one of the context-adaptive variable-length coding scheme and the context-adaptive binary arithmetic coding scheme according to which the reproduction segments included in the continuous unit of the moving image have been encoded, and wherein the moving image decoding apparatus includes:

a first extraction unit operable to extract, from the management information for each reproduction segment of the continuous unit of the moving image to be seamlessly and continuously reproduced without a gap, the first flag information indicating, for each reproduction segment included in the continuous unit of the moving image, whether one of the context-adaptive variable-length coding scheme and the context-adaptive binary arithmetic coding scheme has been used to encode the reproduction segments included in the continuous unit of the moving image, the management information being separate from the moving image stream;

a determination unit operable to determine whether to perform decoding using one of the context-adaptive variable-length coding scheme and the context-adaptive binary arithmetic coding scheme, when the first flag information is extracted by the first extraction unit;

a second extraction unit operable to extract, from the moving image stream, the second flag information indicating the one of the context-adaptive variable-length coding scheme and the context-adaptive binary arithmetic coding scheme according to which the reproduction segments included in the continuous unit of the moving image have been encoded; and a decoding unit operable to seamlessly perform decoding without a gap at a connection between the reproduction segments of the continuous unit using the one of the context-adaptive variable-length coding scheme and the context-adaptive binary arithmetic coding scheme indicated by the second flag information, when said determination unit determines to seamlessly perform decoding using one of the context-adaptive variable-length coding scheme and the context-adaptive binary arithmetic coding scheme.

* * * * *